(12) United States Patent
Kurotani et al.

(10) Patent No.: US 7,717,084 B2
(45) Date of Patent: May 18, 2010

(54) CONTROLLER OF INTERNAL COMBUSTION ENGINE

(75) Inventors: Tadashi Kurotani, Wako (JP); Takuya Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 12/153,683

(22) Filed: May 22, 2008

(65) Prior Publication Data

US 2008/0294325 A1 Nov. 27, 2008

(30) Foreign Application Priority Data

May 23, 2007 (JP) .............................. 2007-137248

(51) Int. Cl.
*F02B 17/00* (2006.01)
*F02B 5/00* (2006.01)
(52) U.S. Cl. .................. 123/295; 123/305; 123/406.52; 701/103
(58) Field of Classification Search ................. 123/295, 123/299, 305, 406.52, 406.26, 568.14; 701/102, 701/103, 104
See application file for complete search history.

(56) References Cited

U.S. PATENT DOCUMENTS

| | | | | |
|---|---|---|---|---|
| 7,082,898 B2* | 8/2006 | Kitamura et al. | ............... | 123/21 |
| 7,318,427 B2* | 1/2008 | Brachert et al. | ......... | 123/568.14 |
| 7,503,166 B2* | 3/2009 | Jankovic | ....................... | 60/285 |
| 7,506,536 B2* | 3/2009 | Cornwell et al. | .......... | 73/114.28 |
| 2004/0154581 A1* | 8/2004 | Yamaoka et al. | ............. | 123/299 |
| 2007/0240653 A1* | 10/2007 | Petridis | .................... | 123/90.16 |

FOREIGN PATENT DOCUMENTS

| JP | 2000-179368 A | 6/2000 |
|---|---|---|
| JP | 2006-97603 A | 4/2006 |
| JP | 2007-77919 A | 3/2007 |

\* cited by examiner

*Primary Examiner*—John T Kwon
(74) *Attorney, Agent, or Firm*—Birch, Stewart, Kolasch & Birch, LLP

(57) ABSTRACT

A controller includes a first intermediate mode which, when the operation mode of an internal combustion engine is shifted from a compression ignition operation mode to a spark ignition operation mode, is interposed between both the operation modes, and a second intermediate mode which, when the operation mode of the internal combustion engine is shifted from the spark ignition operation mode to the compression ignition operation mode, is interposed between both the operation modes. An air supply amount and a fuel supply amount to a combustion chamber is controlled so that the air-fuel ratio of an air-fuel mixture becomes rich gradually in the first intermediate mode, and the air supply amount and the fuel supply amount to the combustion chamber is controlled so that the air-fuel ratio of the air-fuel mixture becomes lean gradually in the second intermediate mode. As a result, when the operation mode of the internal combustion engine is switched between the compression ignition operation mode and the spark ignition operation mode, it becomes possible to suppress fluctuations in the output torque of the internal combustion engine, etc. and smoothly perform the switching.

10 Claims, 21 Drawing Sheets

CONTROLLER OF INTERNAL COMBUSTION ENGINE

BACKGROUND OF THE INVENTION

1. Field of the Invention

The present invention relates to a controller of an internal combustion engine which is operable in a compression ignition combustion operation mode in which an air-fuel mixture within a combustion chamber of a cylinder is compressed, and the fuel of the air-fuel mixture is thereby self-ignited and combusted, and a spark ignition combustion operation mode in which the fuel of the air-fuel mixture is ignited and combusted by spark ignition.

2. Description of the Related Art

Conventionally, as can be found in, for example, Japanese Patent Laid-Open Publication No. 2006-97603 (hereinafter referred to as "Patent Document 1"), and Japanese Patent Laid-Open Publication No. 2007-77919 (hereinafter referred to as "Patent Document 2"), an internal combustion engine (hereinafter referred to as "two-ignition-type internal combustion engine") which is made operable in a compression ignition operation mode (so-called an HCCI-type operation mode) in which fuel of an air-fuel mixture is self-ignited and combusted by compressing the air-fuel mixture charged into a combustion chamber of a cylinder, and a spark ignition operation mode (so-called SI-type operation mode) in which the fuel of the air-fuel mixture is ignited and combusted by spark ignition is known.

In the techniques seen in Patent Documents 1 and 2, basically, in a case where the rotational frequency and load of the internal combustion engine are in the state of a low-speed and low-load region, the operation of the internal combustion engine in the compression ignition operation mode is performed, and in a case where the rotational frequency and load are in the state of a high-speed and high-load region, the operation of the internal combustion engine in the spark ignition operation mode is performed.

In addition, in the techniques seen in these Patent Documents 1 and 2, a valve mechanism and a supercharger which can separately adjust the opening and closing timing or lift amount of intake valves in the compression ignition operation mode and the spark ignition operation mode is provided, thereby making it possible to properly-perform combustion of an air-fuel mixture in each operation mode.

Additionally, as an internal combustion engine which performs the HCCI-type operation, as seen in, for example, Japanese Patent Laid-Open Publication No. 2000-179368 (hereinafter referred to as "Patent Document 3"), one which is adapted to be able to independently supply two kinds of fuels whose octane values are different from each other to a combustion chamber of a cylinder, thereby adjusting the ratio of the supply amounts of the fuels according to the load of the internal combustion engine, thereby properly performing the combustion of the fuels, is known.

Meanwhile, in the two-ignition-type internal combustion engine, various requirements, such as the air-fuel ratio of an air-fuel mixture which is required to properly operate the internal combustion engine in each operation mode, are different, in addition to the fact that the ignition methods of the fuels in each operation mode are different. For example, although the air-fuel ratio of an air-fuel mixture suitable for the operation in the spark ignition operation mode is an air-fuel ratio near a theoretical air-fuel ratio, the air-fuel ratio of the air-fuel mixture suitable for the operation in the compression ignition operation mode is an air-fuel ratio significantly nearer to lean side than the theoretical air-fuel ratio. For this reason, at the time of the switching of those operation modes, the air-fuel ratio of the air-fuel mixture within the combustion chamber becomes unsuitable even for any operation mode. As a result, troubles are apt to occur such that the combustion of the air-fuel mixture in the combustion chamber becomes unstable, or fluctuations in output torque are caused.

Further, the air-fuel ratio of the air-fuel mixture suitable for the operation in the spark ignition operation mode is an air-fuel ratio nearer to the rich side than the air-fuel ratio of the air-fuel mixture suitable for the operation in the compression ignition operation mode. Therefore, at the time of the switching from the spark ignition operation mode to the compression ignition operation mode, the temperature within the cylinder and the temperature of the wall of the cylinder immediately after the switching, is apt to be a higher temperature than a temperature at the time of continuous operation in the compression ignition operation mode. For this reason, troubles may be caused such that, at the time of the operation of the internal combustion engine immediately after the switching from the spark ignition operation mode to the compression ignition operation mode, the ignition timing of an air-fuel mixture is made earlier than a suitable ignition timing, excessive combustion noises is generated, or knocking occurs.

However, in the control techniques of the two-way ignition internal combustion engine as seen in the above Patent Documents 1 and 2, a control technique which is suitable at the time of the switching of the operation mode is not provided. Thus, there is a possibility that troubles may be caused as described above. Further, since a drive mechanism of complicated intake valves is required in the techniques seen in Patent Documents 1 and 2, the configuration of the internal combustion engine is complicated, and the optimal control of the air-fuel ratio of an air-fuel mixture, etc. is difficult due to the delay of the operation of the drive mechanism of the intake valves, etc.

SUMMARY OF THE INVENTION

The invention is to provide a controller capable of, when the operation mode of a two-ignition-type internal combustion engine is switched between a compression ignition operation mode and a spark ignition operation mode, suppressing fluctuations in the output torque of the internal combustion engine, etc. and smoothly performing the switching, in view of such a situation.

In order to achieve the above object, the controller of an internal combustion engine of the invention is a controller of an internal combustion engine which is operable in a compression ignition operation mode in which an air-fuel mixture charged into a combustion chamber of a cylinder is compressed, and thereby, the fuel of the air-fuel mixture is self-ignited and combusted, and in a spark ignition operation mode in which the fuel of the air-fuel mixture is ignited and combusted by spark ignition. The controller includes a first intermediate mode which, in a case where the operation mode of the internal combustion engine is shifted from the compression ignition operation mode to the spark ignition operation mode, is interposed between both the operation modes, and a second intermediate mode which, in a case where the operation mode of the internal combustion engine is shifted from the spark ignition operation mode to the compression ignition operation mode, is interposed between both the operation modes. The controller includes an intermediate mode control means which controls an air supply amount and a fuel supply amount to the combustion chamber so that the air-fuel ratio of the air-fuel mixture becomes rich gradually in the first intermediate mode, and which controls the air supply amount and the fuel supply amount to the combustion chamber so that the air-fuel ratio of the air-fuel mixture becomes lean gradually in the second intermediate mode. (First Invention)

According to the first invention, the operation mode of an internal combustion engine includes the first intermediate mode and the second intermediate mode, in addition to the compression ignition operation mode and the spark ignition operation mode. Also, in the first intermediate mode, the intake air amount and air supply amount to the combustion chamber are controlled by the intermediate mode control means so that the air-fuel ratio of the air-fuel mixture becomes rich gradually. This can smoothly change the air-fuel ratio of the air-fuel mixture from an air-fuel ratio (an air-fuel ratio nearer to the lean side than a theoretical air-fuel ratio) suitable for the operation of the internal combustion engine in the compression ignition operation mode to an air-fuel ratio (an air-fuel ratio near a theoretical air-fuel ratio) suitable for the operation of the internal combustion engine in the spark ignition operation mode, in the first intermediate mode which, at the time of shifting from the compression ignition operation mode to the spark ignition operation mode, is interposed between the operation modes. Further, in the second intermediate mode, the intake air amount and air supply amount to the combustion chamber are controlled by the intermediate mode control means so that the air-fuel ratio of the air-fuel mixture becomes lean gradually. This can smoothly change the air-fuel ratio of the air-fuel mixture from an air-fuel ratio (an air-fuel ratio nearer to the lean side than a theoretical air-fuel ratio) suitable for the operation of the internal combustion engine in the spark ignition operation mode to an air-fuel ratio (an air-fuel ratio near a theoretical air-fuel ratio) suitable for the operation of the internal combustion engine in the compression ignition operation mode, in the second intermediate mode which, at the time of shifting from the spark ignition operation mode the compression ignition operation mode, is interposed between the operation modes.

As a result, at the time of switching of the operation mode between the compression ignition operation mode and the spark ignition operation mode, it becomes possible to suppress fluctuations in the output torque of the internal combustion engine, etc. and smoothly perform the switching.

In such a first invention, more specifically, preferably, the controller of an internal combustion engine includes: an intake-air controlling means which has a first target intake state quantity determining means which determines a first target value of an intake state quantity as a state quantity which specifies, according to the operation state of the internal combustion engine, an air supply amount required in a case where the internal combustion engine is operated in the compression ignition operation mode, a second target intake state quantity determining means which determines, according to the operation state of the internal combustion engine, a second target value of an intake state quantity required in a case where the internal combustion engine is operated in the spark ignition operation mode, and an intake state quantity detecting means which detects the intake state quantity, and which controls the opening degree of a throttle valve provided in an intake passage of the internal combustion engine according to a deviation between this first target value or the second target value, and the detected intake state quantity, so that the detected intake state quantity is brought close to the first target value at the time of the operation of the internal combustion engine in the compression ignition operation mode and the second intermediate mode, and so that the detected intake state quantity is brought close to the second target value at the time of the operation of the internal combustion engine in the spark ignition operation mode and the first intermediate mode; a control processing means for a compression ignition operation mode which determines, at least according to the operation state of the internal combustion engine, operational amounts for a compression ignition operation mode including at least operational amounts which specify the fuel supply amount and fuel supply timing to the combustion chamber in a case where the internal combustion engine is operated in the compression ignition operation mode; and a control processing means for a spark ignition operation mode which determines, at least according to the operation state of the internal combustion engine, operational amounts for a spark ignition operation mode including at least operational amounts which specify, the fuel supply amount and fuel supply timing to the combustion chamber in a case where the internal combustion engine is operated in the spark ignition operation mode. The first target intake state quantity determining means and the second target intake state quantity determining means are means which respectively determine the first target value and the second target value so that an air supply amount specified by the first target value becomes larger than an air supply amount specified by the second target value, at least in the operation state of the internal combustion engine where the operation mode is to be shifted between the compression ignition operation mode and the spark ignition compression ignition operation mode. The intermediate mode control means includes the intake-air controlling means as a means which controls the air supply amount at the time of the operation of the internal combustion engine in the first intermediate mode and the second intermediate mode. The means which controls the fuel supply amount at the time of the operation of the internal combustion engine in the first intermediate mode includes a means which determines a controlling operational amount which specifies an actual fuel supply amount to the combustion chamber, from an operational amount relating to the fuel supply amount among the operational amounts for a compression ignition operation mode determined by the control processing means for a compression ignition operation mode at the time of the completion of the compression ignition operation mode so that the controlling operational amount follows an operational amount relating to the fuel supply amount among the operational amounts for a spark ignition operation mode determined by the control processing means for a spark ignition operation mode during the operation of the internal combustion engine in the first intermediate mode while being changed in a first predetermined pattern, and which controls a fuel supply system provided in the internal combustion engine according to the determined controlling operational amount. The means which controls the fuel supply amount at the time of the operation of the internal combustion engine in the second intermediate mode includes a means which determines a controlling operational amount which specifies an actual fuel supply amount to the combustion chamber, from an operational amount relating to the fuel supply amount among the operational amounts for a spark ignition operation mode determined by the control processing means for a spark ignition operation mode at the time of the completion of the spark ignition operation mode so that the controlling operational amount follows an operational amount relating to the fuel supply amount among the operational amounts for a compression ignition operation mode determined by the control processing means for a compression ignition operation mode during the operation of the internal combustion engine in the second intermediate mode while being changed in a second predetermined pattern, and which controls the fuel supply system according to the determined controlling operational amount. (Second Invention)

The intake-air controlling means controls the air supply amount to the combustion chamber of the cylinder of the internal combustion engine so as to decrease gradually at the time of the operation of the internal combustion engine in the first intermediate mode, and controls the air supply amount to the combustion chamber of the cylinder of the internal combustion engine so as to increase gradually at the time of the operation of the internal combustion engine in the second intermediate mode. In addition, the intake state quantity includes the pressure within the intake passage on the downstream side of the throttle valve (so-called intake pressure), the flow rate of air in the intake passage, etc.

Also, in parallel with the control of the air supply amount by the intake-air controlling means, at the time of the operation of the internal combustion engine in each intermediate mode, the fuel supply system is controlled by the intermediate mode control means, and the fuel supply amount to the combustion chamber is adjusted. Furthermore, the air-fuel ratio of an air-fuel mixture within the combustion chamber is adjusted. At this time, at the time of the operation of the internal combustion engine in the first intermediate mode, a controlling operational amount which specifies an actual fuel supply amount to the combustion chamber is controlled from an operational amount relating to the fuel supply amount among the operational amounts for a compression ignition operation mode determined by the control processing means for a compression ignition operation mode at the time of the completion of the compression ignition operation mode so that the controlling operational amount follows an operational amount relating to the fuel supply amount among the operational amounts for a spark ignition operation mode determined by the control processing means for a spark ignition operation mode while being changed in a first predetermined pattern. Also, the fuel supply system is controlled according to the determined controlling operational amount. In this case, by properly setting the first predetermined pattern, at the time of the operation of the internal combustion engine in the first intermediate mode, the air-fuel ratio of an air-fuel mixture to be charged into the combustion chamber in each combustion cycle can be made rich gradually in a suitable form, and can finally be controlled to an air-fuel ratio suitable for the operation in the spark ignition operation mode.

Further, at the time of the operation of the internal combustion engine in the second intermediate mode, a controlling operational amount which specifies an actual fuel supply amount to the combustion chamber is controlled from an operational amount relating to the fuel supply amount among the operational amounts for a spark ignition operation mode determined by the control processing means for a spark ignition operation mode at the time of the completion of the spark ignition operation mode so that the controlling operational amount follows an operational amount relating to the fuel supply amount among the operational amounts for a compression ignition operation mode determined by the control processing means for a compression ignition operation mode while being changed in a second predetermined pattern. Also, the fuel supply system is controlled according to the determined controlling operational amount. In this case, by properly setting the second predetermined pattern, at the time of the operation of the internal combustion engine in the second intermediate mode, the air-fuel ratio of an air-fuel mixture to be charged into a combustion chamber in each combustion cycle can be made lean gradually in a suitable form, and can finally be controlled to an air-fuel ratio suitable for the operation in the compression ignition operation mode.

As a result, at the time of switching of the operation mode between the compression ignition operation mode and the spark ignition operation mode, preferably, it becomes possible to suppress fluctuations in the output torque of the internal combustion engine, etc. and smoothly perform the switching. Moreover, since the air-fuel ratio of an air-fuel mixture within the combustion chamber can be properly controlled by the control of the opening degree of the throttle valve as mentioned above, and by the above control of the fuel supply system as mentioned above, without requiring a complicated drive mechanism for the intake valve, the configuration of the internal combustion engine can be made simple.

Additionally, in the second invention, with respect to the fuel supply timing to the combustion chamber in the first intermediate mode, for example, the fuel supply timing by the fuel supply system may be controlled according to an operational amount relating to the fuel supply timing among the operational amounts for a spark ignition operation mode determined by the control means for a spark ignition operation mode at the time of the operation of the internal combustion engine in the first intermediate mode.

Further, with respect to the fuel supply timing to the combustion chamber in the second intermediate mode, for example, the fuel supply timing by the fuel supply system may be controlled according to an operational amount relating to the fuel supply timing among the operational amounts for a compression ignition operation mode determined by the control means for a compression ignition operation mode at the time of the operation of the internal combustion engine in the second intermediate mode.

Further, with respect to the control of the ignition timing in the each intermediate mode, for example, the operational amounts for a spark ignition operation mode further including an ignition timing operational amount which specifies the ignition timing of an air-fuel mixture within the combustion chamber in a case where the internal combustion engine is operated in the spark ignition operation mode are determined by the control processing means for a spark ignition operation mode. Also, preferably, at the time of the operation of the internal combustion engine in each intermediate mode, an ignition timing controlling operational amount which specifies the actual ignition timing of an air-fuel mixture within the combustion chamber is controlled from the ignition timing operational amount among the operational amounts for a spark ignition operation mode determined by the control processing means for a spark ignition operation mode during the operation of the internal combustion engine in the intermediate mode so as to follow the ignition timing operational amount while being changed in a predetermined third pattern, and an ignition plug provided in the internal combustion engine is provided according to the determined ignition timing controlling operational amount. In this case, it is desirable that the third pattern is separately set in the first intermediate mode and the second intermediate mode.

Further, at the time of the operation of the internal combustion engine in the compression ignition operation mode, the fuel supply system may be controlled according to the operational amounts for a compression ignition operation mode determined by the control processing means for a compression ignition operation mode. Moreover, at the time of the operation of the internal combustion engine in the spark ignition operation mode, the fuel supply system (or the fuel supply system and the ignition plug) may be controlled according to the operational amounts for a spark ignition operation mode determined by the control processing means for a spark ignition operation mode.

Meanwhile, since the fuel of the air-fuel mixture is self-ignited and combusted by the compression of the air-fuel mixture in the combustion chamber at the time of the operation of the internal combustion engine in the compression ignition operation mode, it is suitable to use fuel having comparatively high ignition performance. Further, since the fuel of the air-fuel mixture is forcibly ignited and combusted by spark ignition at the time of the operation of the internal combustion engine in the spark ignition operation mode, it is suitable to use fuel having a lower ignition performance than that at the time of the operation of the internal combustion engine in the compression ignition operation mode. Also, in a case where a plurality of kinds of fuels whose octane values are different from each other and whose supply amounts are adjustable is capable of being supplied to the combustion chamber, the ignition performance of a composite fuel composed of the plurality of kinds of fuels can be changed by adjusting the mutual ratio of the supply amounts of the fuels.

Thus, in the first invention, preferably, the fuel supplied to the combustion chamber is composed of a plurality of kinds of fuels whose octane values are different from each other, and whose supply amounts are adjustable, and the intermediate mode control means further includes a means which adjusts the mutual ratio of the supply amounts of the plurality of kinds of fuels so that the ratio of the supply amount of a higher-octane fuel increases gradually with respect to the total amount of the plurality of kinds of fuels supplied to the combustion chamber in the first intermediate mode, and adjusts the mutual ratio of the supply amounts of the plurality of kinds of fuels so that the ratio of the supply amount of a lower-octane fuel increases gradually with respect to the total amount of the plurality of kinds of fuels supplied to the combustion chamber in the second intermediate mode. (Third Invention)

According to the third invention, in the first intermediate mode, the mutual ratio of the supply amounts of the plurality of kinds of fuels is adjusted so that the ratio of the supply amount of a high-octane fuel increases gradually with respect to the total amount of the plurality of kinds of fuels supplied to the combustion chamber (the total amount of the supply amounts of the individual kinds of fuels). This can smoothly change the air-fuel ratio of an air-fuel mixture, i.e., the ignition performance of a composite fuel composed of the plurality of kinds of fuels, from an air-fuel ratio suitable for the operation of the internal combustion engine in the compression ignition operation mode to an air-fuel ratio suitable for the operation of the internal combustion engine in the spark ignition operation mode, in the first intermediate mode which, at the time of shifting from the compression ignition operation mode to the spark ignition operation mode, is interposed between the operation modes. Further, in the second intermediate mode, the mutual ratio of the supply amounts of the plurality of kinds of fuels is adjusted so that the ratio of the supply amount of a high-octane fuel increases gradually with respect to the total amount of the plurality of kinds of fuels supplied to the combustion chamber. This can smoothly change the ignition performance of a composite fuel of the air-fuel mixture, from an air-fuel ratio suitable for the operation of the internal combustion engine in the spark ignition operation mode to an air-fuel ratio suitable for the operation of the internal combustion engine in the compression ignition operation mode, in the second intermediate mode which, at the time of shifting from the spark ignition operation mode to the compression ignition operation mode, is interposed between the operation modes.

As a result, at the time of switching of the operation mode between the compression ignition operation mode and the spark ignition operation mode, it possible to enhance the effects of suppressing fluctuations in the output torque of the internal combustion engine, etc. and smoothly performing the switching.

Further, in the second invention, preferably, the fuel supply system is capable of supplying a plurality of kinds of fuels whose octane values are different from each other to the combustion chamber, and is capable of adjusting the supply amounts of the plurality of kinds of fuels. An operational amount relating to the fuel supply amount among the operational amounts for a compression ignition operation mode determined by the control processing means for a compression ignition operation mode, an operational amount relating to the fuel supply amount among the operational amounts for a spark ignition operation mode determined by the control processing means for a spark ignition operation mode, and a controlling operational amount relating to the fuel supply amount determined by the intermediate mode control means are respectively composed of an operational amount which specifies the supply amount of each kind of the fuel. The first predetermined pattern at the time of the operation of the internal combustion engine in the first intermediate mode is composed of a pattern separately set in advance for each kind of the fuel so that the ratio of a fuel supply amount specified by a controlling operational amount relating to a high-octane fuel increases gradually with respect to the total amount of the plurality of kinds of fuels specified by the controlling operational amounts relating to the fuel supply amounts of the plurality of kinds of fuels, respectively. The second predetermined pattern at the time of the operation of the internal combustion engine in the second intermediate mode is composed of a pattern separately set in advance for each kind of the fuel so that the ratio of a fuel supply amount specified by a controlling operational amount relating to a low-octane fuel increases gradually with respect to the total amount of the plurality of kinds of fuels specified by the controlling operational amounts relating to the fuel supply amounts of the plurality of kinds of fuels, respectively. (Fourth Invention)

According to the fourth invention, at the time of the operation of the internal combustion engine in the first intermediate mode, a controlling operational amount which specifies the actual fuel supply amount of each kind of the fuel to the combustion chamber is determined so as to follow an operational amount relating to the fuel supply amount of each kind of the fuel among the operational amounts for a spark ignition operation mode determined by the control processing means for a spark ignition operation mode while being changed in a separate pattern (first pattern). For this reason, by properly setting the first pattern of each kind of the fuel, at the time of the operation of the internal combustion engine in the first intermediate mode, the air-fuel ratio of an air-fuel mixture to be charged into the combustion chamber in each combustion cycle can be made rich gradually, and the ignition performance of the fuel (composite fuel) of the air-fuel mixture can be changed like the third invention.

Further, at the time of the operation of the internal combustion engine in the second intermediate mode, a controlling operational amount which specifies the actual fuel supply amount of each kind of the fuel to the combustion chamber is determined so as to follow an operational amount relating to the fuel supply amount of each kind of the fuel among the operational amounts for a compression ignition operation mode determined by the control processing means for a compression ignition operation mode while being changed in a separate pattern (second pattern). For this reason, by properly setting the second pattern of each kind of the fuel, at the time of the operation of the internal combustion engine in the second intermediate mode, the air-fuel ratio of an air-fuel mixture to be charged into the combustion chamber in each combustion cycle can be made lean gradually, and the ignition performance of the fuel (composite fuel) of the air-fuel mixture can be changed like the third invention.

As a result, according to the fourth invention, similarly to the third invention, at the time of switching of the operation mode between the compression ignition operation mode and the spark ignition operation mode, fluctuations in the output torque of the internal combustion engine, etc. can be suppressed, and the stability of the combustion state of the fuel in the combustion chamber can be enhanced.

In the fourth invention, preferably, the control processing means for a compression ignition operation mode includes a means which determines an operational amount group which is a set of the operational amounts relating to the plurality of kinds of fuels, among the operational amounts which specify the supply amounts of the plurality of kinds of fuels to the combustion chamber, at least by a first predetermined control rule according to the operation state of the internal combustion engine, at the time of the operation of the internal combustion engine in the compression ignition operation mode excluding a first predetermined period immediately after the switching from the second intermediate mode to the compression ignition operation mode, and a means which determines an operational amount group which is obtained by correcting at least one operational amount, among a normal operational amount group that is the operational amount group which is determined by the first predetermined control rule, at the time of the operation of the internal combustion engine in the compression ignition operation mode in the first predetermined period. The means which determines the correction operational amount group is a means which corrects the correction operational amount group so that the ratio of the supply amount of a high-octane fuel increases more than a ratio specified by a normal operational amount group determined by the first predetermined control value, with respect to the total amount of the plurality of kinds of fuels specified by the correction operational amount group. The fuel supply system is controlled according to the correction operational amount group determined by the control processing means for a compression ignition operation mode at the time of the operation of the internal combustion engine in the compression ignition operation mode in the first predetermined period, and the fuel supply system is controlled according to a normal operational amount group determined by the control processing means for a compression ignition operation mode at the time of the operation of the internal combustion engine in the compression ignition operation mode excluding the first predetermined period. (Fifth Invention)

That is, as described above, the temperature within the cylinder or the temperature of the wall of the cylinder at the time of the operation of the internal combustion engine in the spark ignition operation mode is apt to be higher than the temperature at the time of the operation of the internal combustion engine in the compression ignition operation mode. For this reason, the combustion timing of the fuel of an air-fuel mixture within the combustion chamber is apt to be earlier than a suitable combustion timing immediately after the operation mode is switched from the spark ignition operation mode via the second intermediate mode to the compression ignition operation mode.

In this case, according to the fifth invention, the operation of the internal combustion engine in the compression ignition operation mode in the first predetermined period immediately after switching from the second intermediate mode to the compression ignition operation mode and the operation of the internal combustion engine in the compression ignition operation mode excluding the first predetermined period are distinguished from each other. At the time of the former operation, the fuel supply system is controlled according to the correction operational amount group which is obtained by correcting at least one operational amount (operational amount which specifies a fuel supply amount relating to at least one kind of fuel) of a normal operational amount group determined by the first control rule. Further, at the time of the latter operation, the fuel supply system is controlled according to a normal operational amount group determined by the first control rule. Also, the correction operational amount group is determined so that the ratio of the supply amount of a high-octane fuel increases more than a ratio specified by a normal operational amount group determined by the first predetermined control value, with respect to the total amount of the plurality of kinds of fuels specified by the correction operational amount group.

For this reason, at the time of the operation of the internal combustion engine in the compression ignition operation mode in the first predetermined period, the ignition performance of the fuel (composite fuel) of an air-fuel mixture to be charged into the combustion chamber in every combustion cycle can be made lower than that of a normal case in which the fuel supply system is controlled according to the normal operational amount group. As a result, immediately after the operation mode is switched from the spark ignition operation mode via the second intermediate mode to the compression ignition operation mode, the early combustion timing of the fuel can be prevented, and thereby, the fuel (composite fuel) can be self-ignited and combusted with suitable combustion timing.

Further, in the first to fifth inventions described hitherto, the controller of an internal combustion engine preferably includes an ignition timing control means for a spark ignition operation mode which determines an ignition timing operational amount which specifies the ignition timing of the air-fuel mixture within the combustion chamber, by a second predetermined control rule at least according to the operation state of the internal combustion engine, thereby controlling an ignition plug provided in the internal combustion engine according to the correction ignition timing operational amount, at the time of the operation of the internal combustion engine in the spark ignition operation mode excluding a second predetermined period immediately after the switching from the first intermediate mode to the spark ignition operation mode, and which determines a correction ignition timing operational amount which is obtained by correcting a normal ignition timing operational amount which is an ignition timing operational amount determined by the second predetermined control rule, thereby control the ignition plug according to the ignition timing operational amount, at the time of the operation of the internal combustion engine in the spark ignition operation mode in the second predetermined period. The ignition timing control means for a spark ignition operation mode determines the correction ignition timing operational amount so that an ignition timing specified by the correction ignition timing operational amount becomes an ignition timing nearer to the retard side than an ignition timing specified by the normal ignition timing operational amount, at the time of the operation of the internal combustion engine in the spark ignition operation mode in the second predetermined period. (Sixth Invention)

That is, at the time of shifting from the compression ignition operation mode to the spark ignition operation mode, under the influence of the fuel which is supplied at the time of the operation of the internal combustion engine in the compression ignition operation mode, and which adhere to and remains at an intake port of the cylinder of the internal combustion engine, the air-fuel ratio of the air-fuel mixture to be charged into the combustion chamber is apt to be made richer than a theoretical air-fuel ratio, at the time of the operation of the internal combustion engine in the spark ignition operation mode immediately after switching from the first intermediate mode to the spark ignition operation mode. Furthermore, the output torque of the internal combustion engine is apt to become larger than a target torque.

In this case, according to the sixth invention, the operation of the internal combustion engine in the spark ignition operation mode in the second predetermined period immediately after switching from the first intermediate mode to the spark ignition operation mode and the operation of the internal combustion engine in the spark ignition operation mode excluding the second predetermined period are distinguished from each other. At the time of the former operation, the ignition plug is controlled according to a correction ignition timing operational amount which is obtained by correcting a normal ignition timing operational amount determined by the second control rule. Further, at the time of the latter operation, the ignition plug is controlled according to a normal ignition timing operational amount determined by the second control rule. Also, the correction ignition timing operational amount is determined so that an ignition timing specified by the correction ignition timing operational amount becomes an ignition timing nearer to the retard side than an ignition timing specified by a normal ignition timing operational amount. As a result, immediately after the operation mode is switched from the compression ignition operation mode via the first intermediate mode to the spark ignition operation mode, the output torque of the internal combustion engine can be prevented from increasing, thereby smoothly changing the output torque.

Further, as an aspect separate from the first invention, the controller of an internal combustion engine of the invention is a controller of an internal combustion engine which is operable in a compression ignition operation mode in which an air-fuel mixture charged into a combustion chamber of a cylinder is compressed, and thereby, the fuel of the air-fuel mixture is self-ignited and combusted, and in a spark ignition operation mode in which the fuel of the air-fuel mixture is ignited and combusted by spark ignition, and is capable of supplying a plurality of kinds of fuels whose octane values are different from each other to the combustion chamber. The controller includes a first intermediate mode which, in a case where the operation mode of the internal combustion engine is shifted from the compression ignition operation mode to the spark ignition operation mode, is interposed between both the operation modes, and a second intermediate mode which, in a case where the operation mode of the internal combustion engine is shifted from the spark ignition operation mode to the compression ignition operation mode, is interposed between both the operation modes. The controller includes an intermediate mode control means which adjusts the mutual ratio of the supply amounts of the plurality of kinds of fuels so that the ratio of the supply amount of a higher-octane fuel increases gradually with respect to the total amount of the plurality of kinds of fuels supplied to the combustion chamber in the first intermediate mode, and adjusts the mutual ratio of the supply amounts of the plurality of kinds of fuels so that the ratio of the supply amount of a lower-octane fuel increases gradually with respect to the total amount of the plurality of kinds of fuels supplied to the combustion chamber in the second intermediate mode. (Seventh Invention)

According to the seventh invention, the operation mode of an internal combustion engine includes the first intermediate mode and the second intermediate mode, in addition to the compression ignition operation mode and the spark ignition operation mode. Also, in the first intermediate mode, the mutual ratio of the supply amounts of the plurality of kinds of fuels is adjusted so that the ratio of the supply amount of a high-octane fuel increases gradually with respect to the total amount of the plurality of kinds of fuels supplied to the combustion chamber (the total amount of the supply amounts of the individual kinds of fuels). This can smoothly change the air-fuel ratio of an air-fuel mixture, i.e., the ignition performance of a composite fuel composed of the plurality of kinds of fuels, from an air-fuel ratio suitable for the operation of the internal combustion engine in the compression ignition operation mode to an air-fuel ratio suitable for the operation of the internal combustion engine in the spark ignition operation mode, in the first intermediate mode which, at the time of shifting from the compression ignition operation mode to the spark ignition operation mode, is interposed between the operation modes. Further, in the second intermediate mode, the mutual ratio of the supply amounts of the plurality of kinds of fuels is adjusted so that the ratio of the supply amount of a high-octane fuel increases gradually with respect to the total amount of the plurality of kinds of fuels supplied to the combustion chamber. This can smoothly change the ignition performance of a composite fuel of the air-fuel mixture, from an air-fuel ratio suitable for the operation of the internal combustion engine in the spark ignition operation mode to an air-fuel ratio suitable for the operation of the internal combustion engine in the compression ignition operation mode, in the second intermediate mode which, at the time of shifting from the spark ignition operation mode to the compression ignition operation mode, is interposed between the operation modes.

As a result, at the time of switching of the operation mode between the compression ignition operation mode and the spark ignition operation mode, it becomes possible to suppress fluctuations in the output torque of the internal combustion engine, etc. and smoothly perform the switching.

In the seventh invention, more specifically, the controller of an internal combustion engine preferably includes: a control processing means for a compression ignition operation mode which determines, at least according to the operation state of the internal combustion engine, operational amounts for a compression ignition operation mode including at least operational amounts which respectively specify the fuel supply amounts and fuel supply timings of the plurality of kinds of fuels to the combustion chamber in a case where the internal combustion engine is operated in the compression ignition operation mode; and a control processing means for a spark ignition operation mode which determines, at least according to the operation state of the internal combustion engine, operational amounts for a spark ignition operation mode including at least operational amounts which respectively specify the fuel supply amounts and fuel supply timings of the plurality of kinds of fuels to the combustion chamber in a case where the internal combustion engine is operated in the spark ignition operation mode. The intermediate mode control means includes a means which, at the time of the internal combustion engine in the first intermediate mode, controls a controlling operational amount which specify each of the actual fuel supply amounts of the plurality of kinds of fuels to the combustion chamber, separately for each kind of the fuel, from an operational amount relating to the fuel supply amount of each kind of the fuel among the operational amounts for a compression ignition operation mode determined by the control processing means for a compression ignition operation mode at the time of the completion of the compression ignition operation mode so that the controlling operational amount follows an operational amount relating to the fuel supply amount of each kind of the fuel among the operational amounts for a spark ignition operation mode determined by the control processing means for a spark ignition operation mode during the operation of the internal combustion engine in the first intermediate mode while being changed in a first predetermined pattern, and which controls a fuel supply system provided in the internal combustion engine according to the determined controlling operational amount, and a means which, at the time of the internal combustion engine in the second intermediate mode, controls a controlling operational amount which specify each of the actual fuel supply amounts of the plurality of kinds of fuels to the combustion chamber, separately for each kind of the fuel, from an operational amount relating to the fuel supply amount of each kind of the fuel among the operational amounts for a spark ignition operation mode determined by the control processing means for a spark ignition operation mode at the time of the completion of the spark ignition operation mode so that the controlling operational amount follows an operational amount relating to the fuel supply amount of each kind of the fuel among the operational amounts for a compression ignition operation mode determined by the control processing means for a compression ignition operation mode during the operation of the internal combustion engine in the second intermediate mode while being changed in a second predetermined pattern, and which controls a fuel supply system provided in the internal combustion engine according to the determined controlling operational amount. The first predetermined pattern at the time of the operation of the internal combustion engine in the first intermediate mode is composed of a pattern separately set in advance for each kind of the fuel so that the ratio of a fuel supply amount specified by a controlling operational amount relating to a higher-octane fuel increases gradually with respect to the total amount of the plurality of kinds of fuels specified by the controlling operational amounts relating to the fuel supply amounts of the plurality of kinds of fuels, respectively. The second predetermined pattern at the time of the operation of the internal combustion engine in the second intermediate mode is composed of a pattern separately set in advance for each kind of the fuel so that the ratio of a fuel supply amount specified by a controlling operational amount relating to a lower-octane fuel increases gradually with respect to the total amount of the plurality of kinds of fuels specified by the controlling operational amounts relating to the fuel supply amounts of the plurality of kinds of fuels, respectively. (Eighth Invention)

According to the eighth invention, at the time of the operation of the internal combustion engine in the first intermediate mode, a controlling operational amount which specifies the actual fuel supply amount of each kind of the fuel to the combustion chamber is determined from an operational amount relating to the fuel supply amount of each kind of the fuel among the operational amounts for a compression ignition operation mode determined by the control processing means for a compression ignition operation mode at the time of the completion of the compression ignition operation mode so that the controlling operational amount follows an operational amount relating to the fuel supply amount of each kind of the fuel among the operational amounts for a spark ignition operation mode determined by the control processing means for a spark ignition operation mode while being changed in a first predetermined pattern. Also, in this case, the first predetermined pattern is composed of a pattern separately set in advance for each kind of the fuel so that the ratio of a fuel supply amount specified by a controlling operational amount relating to a high-octane fuel increases gradually with respect to the total amount of the plurality of kinds of fuels specified by the controlling operational amounts relating to the fuel supply amounts of the plurality of kinds of fuels, respectively. By properly setting the first pattern of each kind of the fuel in this way, at the time of the operation of the internal combustion engine in the first intermediate mode, the ignition performance of the fuel (composite fuel) of an air-fuel mixture to be charged into the combustion chamber in each combustion cycle can be changed like the seventh invention.

Further, at the time of the operation of the internal combustion engine in the second intermediate mode, a controlling operational amount which specifies the actual fuel supply amount of each kind of the fuel to the combustion chamber is determined from an operational amount relating to the fuel supply amount of each kind of the fuel among the operational amounts for a spark ignition operation mode determined by the control processing means for a spark ignition operation mode at the time of the completion of the spark ignition operation mode so that the controlling operational amount follows an operational amount relating to the fuel supply amount of each kind of the fuel among the operational amounts for a compression ignition operation mode determined by the control processing means for a compression ignition operation mode while being changed in a second predetermined pattern. Also, in this case, the second predetermined pattern is composed of a pattern separately set in advance for each kind of the fuel so that the ratio of a fuel supply amount specified by a controlling operational amount relating to a low-octane fuel increases gradually with respect to the total amount of the plurality of kinds of fuels specified by the controlling operational amounts relating to the fuel supply amounts of the plurality of kinds of fuels, respectively. By properly setting the second pattern of each kind of the fuel in this way, at the time of the operation of the internal combustion engine in the second intermediate mode, the ignition performance of the fuel (composite fuel) of an air-fuel mixture to be charged into the combustion chamber in each combustion cycle can be changed like the seventh invention.

Additionally, in the eighth invention, with respect to the fuel supply timing to the combustion chamber in the first intermediate mode, for example, the fuel supply timing by the fuel supply system may be controlled according to an operational amount relating to the fuel supply timing among the operational amounts for a spark ignition operation mode determined by the control means for a spark ignition operation mode at the time of the operation of the internal combustion engine in the first intermediate mode.

Further, with respect to the fuel supply timing to the combustion chamber in the second intermediate mode, for example, the fuel supply timing by the fuel supply system may be controlled according to an operational amount relating to the fuel supply timing among the operational amounts for a compression ignition operation mode determined by the control means for a compression ignition operation mode at the time of the operation of the internal combustion engine in the second intermediate mode.

Further, with respect to the control of the ignition timing in the each intermediate mode, for example, the operational amounts for a spark ignition operation mode further including an ignition timing operational amount which specifies the ignition timing of an air-fuel mixture within the combustion chamber in a case where the internal combustion engine is operated in the spark ignition operation mode are determined by the control processing means for a spark ignition operation mode. Also, preferably, at the time of the operation of the internal combustion engine in each intermediate mode, an ignition timing controlling operational amount which specifies the actual ignition timing of an air-fuel mixture within the combustion chamber is controlled from the ignition timing operational amount among the operational amounts for a spark ignition operation mode determined by the control processing means for a spark ignition operation mode during the operation of the internal combustion engine in the intermediate mode so as to follow the ignition timing operational amount while being changed in a predetermined third pattern, and an ignition plug provided in the internal combustion engine is provided according to the determined ignition timing controlling operational amount. In this case, it is desirable that the third pattern is separately set in the first intermediate mode and the second intermediate mode.

Further, at the time of the operation of the internal combustion engine in the compression ignition operation mode, the fuel supply system may be controlled according to the operational amounts for a compression ignition operation mode determined by the control processing means for a compression ignition operation mode. Moreover, at the time of the operation of the internal combustion engine in the spark ignition operation mode, the fuel supply system (or the fuel supply system and the ignition plug) may be controlled according to the operational amounts for a spark ignition operation mode determined by the control processing means for a spark ignition operation mode.

In the eighth invention, for the same reason as the fifth invention, the control processing means for a compression ignition operation mode preferably includes a means which determines an operational amount group which is a set of the operational amounts relating to the plurality of kinds of fuels, among the operational amounts which specify the supply amounts of the plurality of kinds of fuels to the combustion chamber, at least by a first predetermined control rule according to the operation state of the internal combustion engine, at the time of the operation of the internal combustion engine in the compression ignition operation mode excluding a first predetermined period immediately after the switching from the second intermediate mode to the compression ignition operation mode, and a means which determines an operational amount group which is obtained by correcting at least one operational amount, among a normal operational amount group that is the operational amount group which is determined by the first predetermined control rule, at the time of the operation of the internal combustion engine in the compression ignition operation mode in the first predetermined period. The means which determines the correction operational amount group is a means which corrects the correction operational amount group so that the ratio of the supply amount of a higher-octane fuel increases more than a ratio specified by a normal operational amount group determined by the first predetermined control value, with respect to the total amount of the plurality of kinds of fuels specified by the correction operational amount group. The fuel supply system is controlled according to the correction operational amount group determined by the control processing means for a compression ignition operation mode at the time of the operation of the internal combustion engine in the compression ignition operation mode in the first predetermined period, and the fuel supply system is controlled according to a normal operational amount group determined by the control processing means for a compression ignition operation mode at the time of the operation of the internal combustion engine in the compression ignition operation mode excluding the first predetermined period. (Ninth Invention)

According to the ninth invention, similarly to the fifth invention, the operation of the internal combustion engine in the compression ignition operation mode in the first predetermined period immediately after switching from the second intermediate mode to the compression ignition operation mode and the operation of the internal combustion engine in the compression ignition operation mode excluding the first predetermined period are distinguished from each other. At the time of the former operation, the fuel supply system is controlled according to the correction operational amount group which is obtained by correcting at least one operational amount (operational amount which specifies a fuel supply amount relating to at least one kind of fuel) of a normal operational amount group determined by the first control rule. Further, at the time of the latter operation, the fuel supply system is controlled according to a normal operational amount group determined by the first control rule. Also, the correction operational amount group is determined so that the ratio of the supply amount of a high-octane fuel increases more than a ratio specified by a normal operational amount group determined by the first predetermined control value, with respect to the total amount of the plurality of kinds of fuels (the sum of the individual kinds of fuels) specified by the correction operational amount group.

For this reason, at the time of the operation of the internal combustion engine in the compression ignition operation mode in the first predetermined period, the ignition performance of the fuel (composite fuel) of an air-fuel mixture to be charged into the combustion chamber in every combustion cycle can be made lower than that of a normal case in which the fuel supply system is controlled according to the normal operational amount group. As a result, immediately after the operation mode is switched from the spark ignition operation mode via the second intermediate mode to the compression ignition operation mode, the early combustion timing of the fuel can be prevented, and thereby, the fuel (composite fuel) can be self-ignited and combusted with suitable combustion timing.

Further, in the seventh to ninth inventions described hitherto, for the same reason as the sixth invention, the controller of an internal combustion engine preferably includes an ignition timing control means for a spark ignition operation mode which determines an ignition timing operational amount which specifies the ignition timing of the air-fuel mixture within the combustion chamber, by a second predetermined control rule at least according to the operation state of the internal combustion engine, thereby controlling an ignition plug provided in the internal combustion engine according to the correction ignition timing operational amount, at the time of the operation of the internal combustion engine in the spark ignition operation mode excluding a second predetermined period immediately after the switching from the first intermediate mode to the spark ignition operation mode, and which determines a correction ignition timing operational amount which is obtained by correcting a normal ignition timing operational amount which is an ignition timing operational amount determined by the second predetermined control rule, thereby control the ignition plug according to the ignition timing operational amount, at the time of the operation of the internal combustion engine in the spark ignition operation mode in the second predetermined period. The ignition timing control means determines the correction ignition timing operational amount so that an ignition timing specified by the correction ignition timing operational amount becomes an ignition timing nearer to the retard side than an ignition timing specified by the normal ignition timing operational amount, at the time of the operation of the internal combustion engine in the spark ignition operation mode in the second predetermined period. (Tenth Invention)

According to the tenth invention, similarly to the sixth invention, the operation of the internal combustion engine in the spark ignition operation mode in the second predetermined period immediately after switching from the first intermediate mode to the spark ignition operation mode and the operation of the internal combustion engine in the spark ignition operation mode excluding the second predetermined period are distinguished from each other. At the time of the former operation, the ignition plug is controlled according to a correction ignition timing operational amount which is obtained by correcting a normal ignition timing operational amount determined by the second control rule. Further, at the time of the latter operation, the ignition plug is controlled according to a normal ignition timing operational amount determined by the second control rule. Also, the correction ignition timing operational amount is determined so that an ignition timing specified by the correction ignition timing operational amount becomes an ignition timing nearer to the retard side than an ignition timing specified by a normal ignition timing operational amount. As a result, immediately after the operation mode is switched from the compression ignition operation mode via the first intermediate mode to the spark ignition operation mode, the output torque of the internal combustion engine can be prevented from increasing, thereby smoothly changing the output torque.

In the invention, "the operation state of the internal combustion engine" which is used in the second invention to determine the first target value and second target value of the intake state quantity, the operational amounts for a compression ignition operation mode, and the operational amounts for a spark ignition operation mode, "the operation state of the internal combustion engine" which is used in the fifth invention to determine the normal operational amount group, and "the operation state of the internal combustion engine" which is used in the sixth invention to determine the normal ignition timing operational amount include, for example, the rotational frequency (rotational speed of an output shaft) of the internal combustion engine, or a target torque (more generally, an index representing the load of the internal combustion engine).

Similarly, "the operation state of the internal combustion engine" which is used in the eighth invention to determine the operational amounts for a compression ignition operation mode, and the operational amounts for a spark ignition operation mode, "the operation state of the internal combustion engine" used in the ninth invention to determine the normal operational amount group, or "the operation state of the internal combustion engine" which is used in the tenth invention to determine the normal ignition timing operational amount include, for example, the rotational frequency (rotational speed of an output shaft) of the internal combustion engine, or a target torque (more generally, an index representing the load of the internal combustion engine).

DESCRIPTION OF THE PREFERRED EMBODIMENTS

Figure 1:
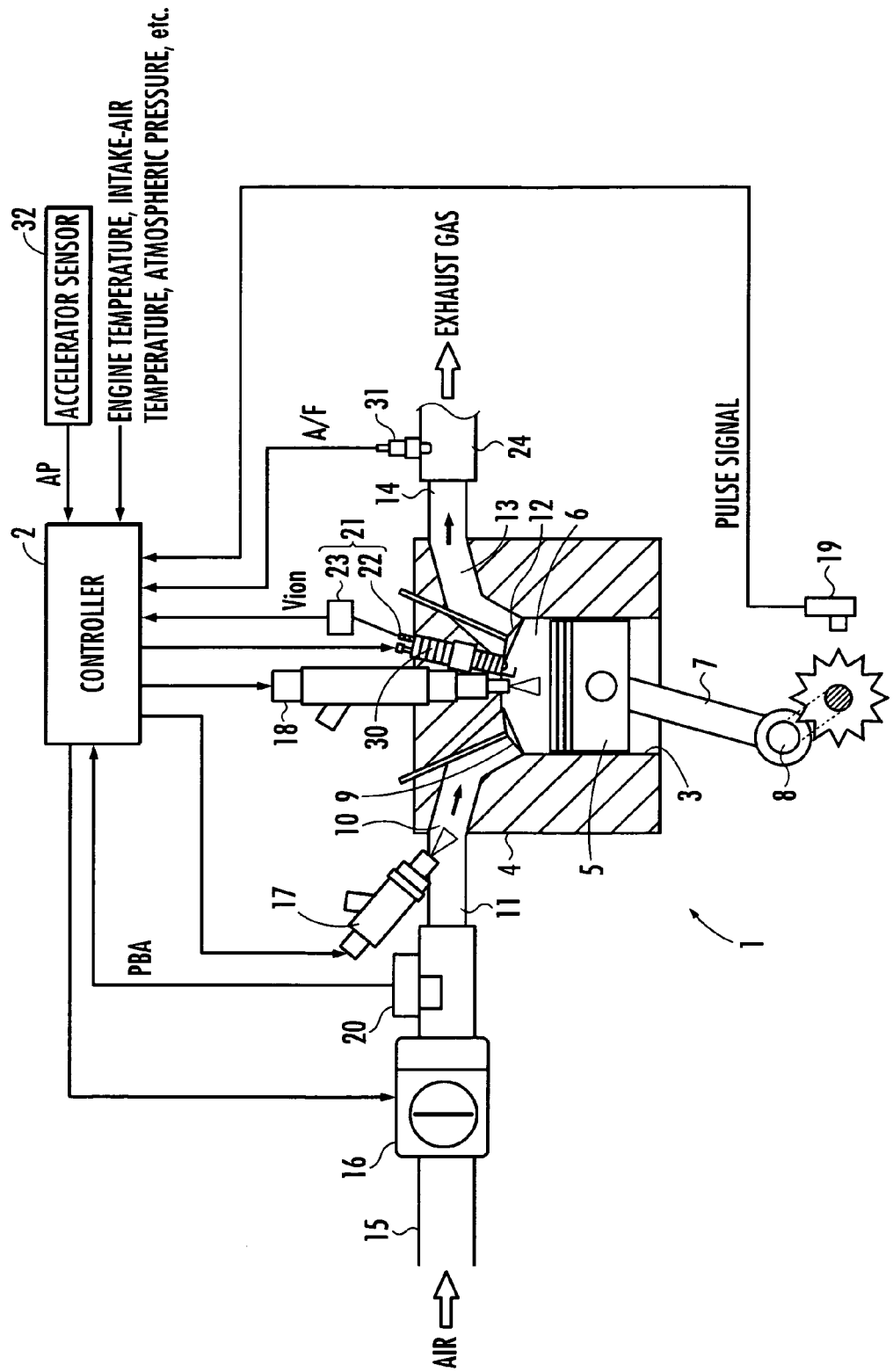
FIG. 1 is a view showing the outline of a system configuration of a controller of a homogeneous charge compression ignition engine in an embodiment of the invention.

One embodiment of the invention will be explained with reference to FIGS. 1 to 30. First, with reference to FIG. 1, an overall system configuration of a controller of a homogeneous charge compression ignition engine of this embodiment will be explained. FIG. 1 is a view showing the outline of the system configuration.

In FIG. 1, reference numeral 1 represents an internal combustion engine, and reference numeral 2 represents a controller. The internal combustion engine 1 is an internal combustion engine which has a plurality of cylinders 3, for example, a four-cylinder internal combustion engine. In addition, in FIG. 1, only the schematic structure for one cylinder of the internal combustion engine 1 is typically shown.

The internal combustion engine 1 is an internal combustion engine which is operable in a compression ignition combustion operation mode in which an air-fuel mixture within a combustion chamber of each cylinder 3 is compressed, and the fuel of the air-fuel mixture is thereby self-ignited and combusted, and a spark ignition combustion operation mode in which the fuel of the air-fuel mixture is ignited and combusted by spark ignition. In this embodiment, the internal combustion engine 1 is mounted on a vehicle (whose illustration is omitted) as a driving force generating source of the vehicle.

Each cylinder 3 is formed in an engine base 4 composed of a cylinder block, a cylinder head, etc. A piston 5 which is reciprocable in the axial direction of the cylinder 3 is accommodated within each cylinder 3, and an upper (cylinder-head-side) space of the piston 5 is formed as a combustion chamber 6. Each piston 5 is connected with a crankshaft 8 which is an output shaft of the internal combustion engine 1 via a connecting rod 7, and the crankshaft 8 rotates with the reciprocation of the piston 5 of each cylinder 3.

The combustion chamber 6 of each cylinder 3 communicates with an intake manifold 11 via an intake port 10 that is opened and closed by an intake valve 9, and communicates with an exhaust manifold 14 via an exhaust port 13 that is opened and closed by an exhaust valve 12. In this embodiment, opening and closing of the intake valve 9 and the exhaust valve 12 are driven via a valve drive mechanism (whose illustration is omitted) having a cam shaft which interlocks with the rotation of the crankshaft 8.

The intake manifold 11 corresponding to each cylinder 3 merges into an intake passage 15 common to all the cylinders 3. The intake passage 15 is provided with an electrically-operated throttle valve 16, and the intake air amount (air supply amount) of the air to each cylinder 3 is operated by controlling the opening degree of the throttle valve 16.

The exhaust manifold 14 corresponding to each cylinder 3 merges into an exhaust passage 24 common to all the cylinders 3, and the exhaust gas generated in each cylinder 3 is exhausted via a purifying catalyst (whose illustration is omitted) provided in the exhaust passage 24.

Further, in the internal combustion engine 1, every cylinder 3 includes two fuel injectors 17 and 18. In this embodiment, a fuel supply system in the invention is constituted by the fuel injectors 17 and 18. In this embodiment, the fuel to be combusted in the combustion chamber 6 of each cylinder 3 is a composite fuel composed of two kinds of fuels whose octane values differ from each other (and consequently, whose ignition performances differ from each other), i.e., a low-octane fuel, and a high-octane fuel. Also, the fuel injector 17 is a fuel injector for a low-octane fuel, and the fuel injector 18 is a fuel injector for a high-octane fuel. In this case, the fuel injector 17, which is a port-injection-type injector, is mounted on the intake manifold 11 so that a low-octane fuel is injected toward the intake port 10 corresponding to each cylinder 3. Further, the fuel injector 18, which is a direct-injection-type injector, is mounted on the engine base 4 (a portion of the cylinder head) so that a high-octane fuel is directly injected to the combustion chamber 6 of each cylinder 3.

A low-octane fuel and a high-octane fuel are respectively pumped to the fuel injectors 17 and 18 from fuel tanks whose illustration is omitted. Also, the fuel injectors 17 and 18 are adapted to be able to control the injection times (the valve opening times of injection valves) of individual fuels, and adapted to be able to adjust the supply amounts (supply amount per one combustion cycle) of individual kinds of fuels to each cylinder 3 by the control of the injection time. Accordingly, the fuel injectors 17 and 18 for every cylinder 3 are adapted to be able to supply two kinds of fuels (a low-octane fuel and a high-octane fuel) whose octane values differ from each other to the combustion chamber 6 of each cylinder 3 for every cylinder 3 and for every kind of fuel, and are adapted to be able to adjust the supply amounts of the two kinds of fuels for every cylinder 3 and for every kind of fuel. In addition, the fuel injectors 17 and 18 are also able to control the fuel injection timings of individual kinds of fuels.

Further, the internal combustion engine 1 includes an ignition plug 30 for every cylinder 3. The ignition plug 30 is mounted on the engine base 4 (a portion of the cylinder head) while its electrode is made to face the combustion chamber 6.

In the internal combustion engine 1 constructed as described above, in the compression ignition operation mode (hereinafter referred to as "HCCI mode"), the two kinds of fuels are supplied to the combustion chamber 6 of each cylinder 3 by injecting a low-octane fuel and a high-octane fuel with required timing of each combustion cycle of each cylinder 3 from the respective fuel injectors 17 and 18 corresponding to the cylinder 3. Then, an air-fuel mixture of a composite fuel composed of the two kinds of fuels and the air charged into the combustion chamber 6 in an intake stroke of the cylinder 3 is compressed in a compression stroke of the cylinder 3. By the compression, the air-fuel mixture is elevated in temperature, and consequently, self-ignition and combustion of a composite fuel is performed. In addition, in the HCCI mode, the air-fuel ratio of the air-fuel mixture of each cylinder 3 is an air-fuel ratio which becomes leaner than a theoretical air-fuel ratio.

Further, in the spark ignition operation mode (hereinafter referred to as "SI mode"), the air-fuel mixture in the combustion chamber 6 of each cylinder 3 is compressed in the compression stroke of the cylinder 3 similarly to the above. Then, the fuel (composite fuel) of the compressed air-fuel mixture is ignited and combusted by an ignition spark emitted from the ignition plug 30. In addition, in the SI mode, the air-fuel ratio of the air-fuel mixture of each cylinder 3 is an air-fuel ratio near a theoretical air-fuel ratio.

Additionally, the ignition performance of a low-octane fuel is higher than that of a high-octane fuel. Thus, by increasing the ratio of the supply amount (injection amount) of a low-octane fuel to the total amount of both the fuels to be supplied to each cylinder 3, the ignition performance of the fuel (composite fuel) of the air-fuel mixture in the cylinder 3 will be enhanced. Further, the ignition performance of a high-octane fuel is lower than that of a low-octane fuel. Thus, by increasing the ratio of the supply amount (injection amount) of a high-octane fuel to the total amount of both the fuels to be supplied to each cylinder 3, the ignition performance of the fuel (composite fuel) of the air-fuel mixture in the cylinder 3 will be degraded. Accordingly, at the time of the operation of the internal combustion engine 1 in the HCCI mode, it is possible to adjust the ratio of the supply amount of a high-octane fuel and the supply amount of a low-octane fuel to the combustion chamber 6 of each cylinder 3, thereby adjusting the combustion timing of the air-fuel mixture in the cylinder 3 for every cylinder 3.

In addition, in this embodiment, ethanol is used as a high-octane fuel. Further, in this embodiment, gasoline or diethyl-ether is used as a low-octane fuel.

Further, in addition to the aforementioned components, the internal combustion engine 1 includes a crank angle sensor 19 which outputs a pulse signal according to the angle of rotation of the crankshaft 8, an intake pressure sensor 20 which detects the intake pressure PBA (absolute pressure) of the internal combustion engine 1, an ion current sensor 21 which detects an ion current which flows at the time of the combustion of an air-fuel mixture in the combustion chamber 6 of each cylinder 3, and an air-fuel ratio sensor 31 which detects the air-fuel ratio of the air-fuel mixture combusted in each cylinder 3.

The crank angle sensor 19 is a sensor which outputs a pulse signal to the controller 2 whenever the crankshaft 8 rotates at every predetermined angle. The pulse signal is used in the controller 2 in order to detect the angle of rotation (the angle of rotation from a certain reference position, which is hereinafter referred to as "crank angle") of the crankshaft 8, or the rotational frequency (rotational speed) of the crankshaft 8.

The intake pressure sensor 20 is mounted on the intake passage 15 on the downstream side (near a merging place of the intake manifold 11) of the throttle valve 16, and detects the pressure PBA (absolute pressure) within the intake passage 15 in the place as the intake pressure of the internal combustion engine 1 to output the detection signal to the controller 2.

Additionally, the intake pressure PBA detected by the intake pressure sensor 20 has a meaning as an intake state quantity (a state quantity which specifies the air supply amount to the combustion chamber 6 of each cylinder 3) in the invention. Accordingly, the intake pressure sensor 20 functions as an intake state quantity detecting means in the invention. In addition, instead of the intake pressure sensor 20, an air flow sensor may be used, and an air flow rate detected by the air flow sensor may be used as the intake state quantity.

The ion current sensor 21 is provided for every cylinder 3, and is composed of a conductive probe 22 whose tip is made to protrude into the combustion chamber 6 of each cylinder 3 in a state where it is electrically insulated from the engine base 4, and a signal generating unit 23 connected to the probe 22. In this embodiment, the probe 22 is provided integrally with the ignition plug 30. Also, the signal generating unit 23 is adapted to output a voltage signal Vion according to a current flowing to the probe 22 by the ions generated at the time of the combustion of an air-fuel mixture in the combustion chamber 6 of each cylinder 3, to the controller 2 as a detection signal of an ion current. In addition, the electrode of the ignition plug 30 may be used instead of the probe 22.

Here, the waveform of an ion current detected by the ion current sensor 21 at the time of the combustion of an air-fuel mixture in the combustion chamber 6 of each cylinder 3 becomes a waveform which has a peak (maximum value) at a certain crank angle, and the crank angle (hereinafter referred to as "ion current peak crank angle CA_ionmax") in the peak has the specified correlativity with the actual combustion timing of the air-fuel mixture. That is, a linear relationship is established between the crank angle at which a heat generation rate at the time of the combustion of an air-fuel mixture (generated amount of heat per unit crank angle) becomes the greatest, and the ion current peak crank angle CA_ionmax. Thus, in this embodiment, the ion current peak crank angle CA_ionmax at which the ion current detected by the ion current sensor 21 has a maximum value is used an index showing actual combustion timing. Also, the output of the ion current sensor 21 is used in the controller 2 in order to detect the above ion current peak crank angle CA_ionmax.

Additionally, what can be used as an index showing combustion timing is not limited to the ion current peak crank angle CA_ionmax. For example, a crank angle or timing when the crank angle exceeds a predetermined value, a crank angle or timing when the pressure (cylinder pressure) within the cylinder 3 has a peak value, or a crank angle or timing when the cylinder pressure exceeds a predetermined value may be used as the index showing combustion timing. Further, the combustion timing can also be estimated using laser, for example.

The air-fuel ratio sensor 31 is mounted on the exhaust passage 24 near a merging place of the exhaust manifold 14 for every cylinder 3 of the internal combustion engine 1. The air-fuel ratio sensor 31 senses the oxygen concentration in an exhaust gas, and outputs a detection signal according to an air-fuel ratio A/F (this corresponds to the air-fuel ratio of an air-fuel mixture combusted in the combustion chamber 6 of each cylinder 3) expressed by the oxygen concentration. In this embodiment, the air-fuel ratio sensor 31, which is a so-called wide-area air-fuel ratio sensor, has output characteristics that are almost linear with respect to a change in air-fuel ratio.

The controller 2 is an electronic circuit unit including a CPU, a RAM, a ROM, etc. As well as the outputs of the crank angle sensor 19, the intake pressure sensor 20, the ion current sensor 21, and the air-fuel ratio sensor 31 are input to the controller 2, the output of the accelerator sensor 32 which detects the operational amount AP (stepping amount) of an accelerator pedal (whose illustration is omitted) of a vehicle on which the internal combustion engine 1 is mounted is input to the controller. Further, detection signals, such as the engine temperature (cooling water temperature or oil temperature) of the internal combustion engine 1, intake-air temperature (the temperature of air introduced into the intake passage 15), atmospheric pressure, are input to the controller from various sensors whose illustration are omitted.

Figure 2:
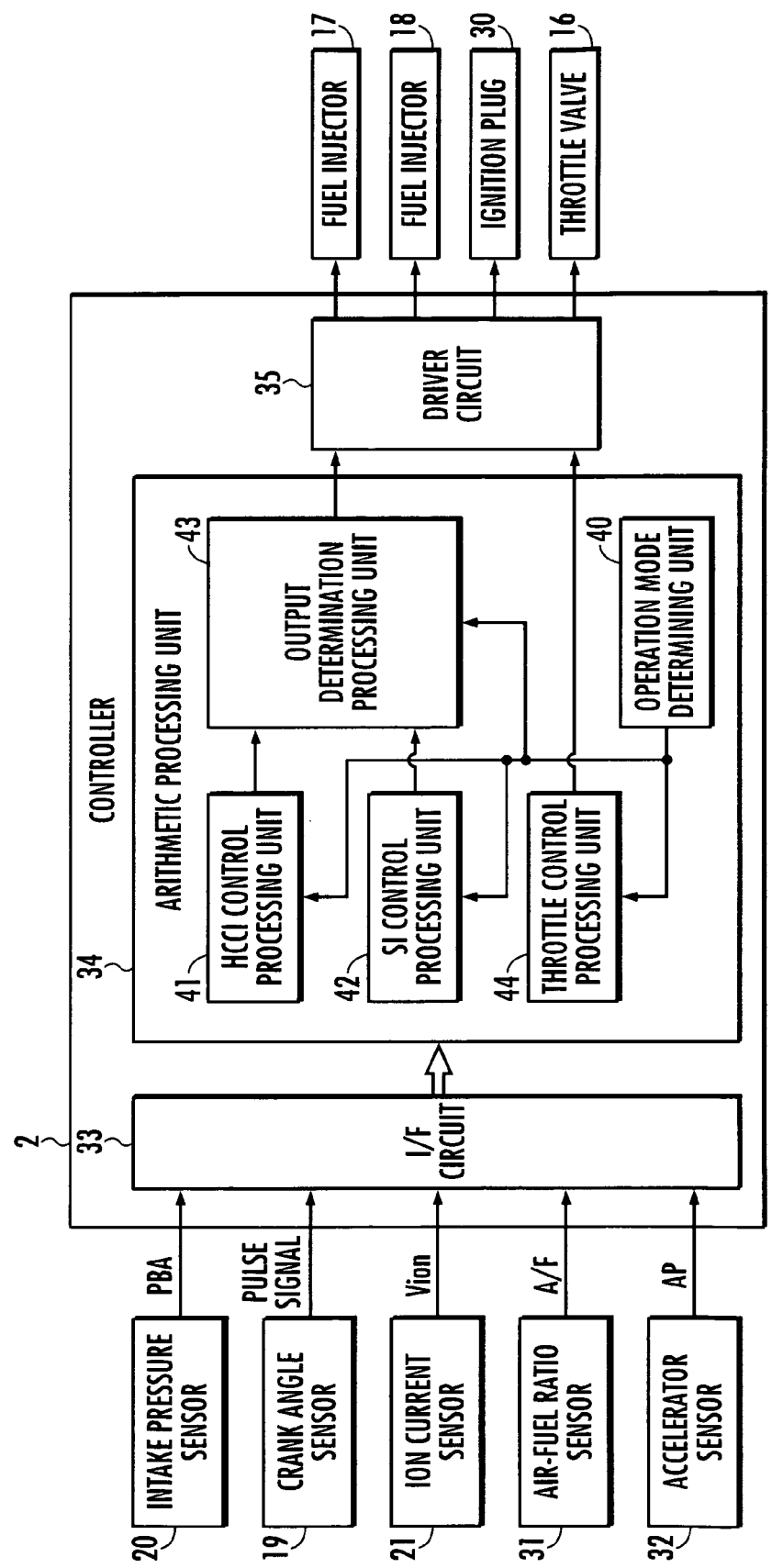
FIG. 2 is a block diagram showing a schematic configuration of the controller of the embodiment.

FIG. 2 is a block diagram showing a schematic configuration of the controller 2. As shown in this drawing, the controller 2 has an interface circuit 33, an arithmetic processing unit 34, and a driver circuit 35.

The output of each sensor, such as the above crank angle sensor 19, is taken into the controller 2 via the interface circuit (I/F circuit) 33, and is specified to the arithmetic processing unit 34.

The arithmetic processing unit 34 is constituted by a microcomputer having a CPU, a RAM, and a ROM, and determines an operational amount (control amount input) which specifies the operation (operations relating on fuel injection amount and fuel injection timing) of the fuel injectors 17 and 18 for every cylinder 3, the operation (operations relating on the occurrence timing of spark discharge and current application amount) of the ignition plug 30, and the operation (an operation relating to the opening degree of the throttle valve 16) of the throttle valve 16, on the basis of input data from the interface circuit 33, and programs and reference data (maps, tables, etc.) which are stored and held in advance in the ROM.

Also, the controller 2 is adapted to control the operation of each of the fuel injectors 17 and 18, operation of the ignition plug 30, and the operation of the throttle valve 16 via the driver circuit 35 depending on its operational amount. In addition, practically, the driver circuit 35 of FIG. 2 is composed of a plurality of driver circuits corresponding to each of the fuel injectors 17 and 18, each spark plug 30, and the throttle valve 16.

The arithmetic processing unit 34 includes an operation mode determining unit 40, an HCCI control processing unit 41, an SI control processing unit 42, an output determination processing unit 43, and a throttle control processing unit 44, as main processing functions realized by programs, etc.

The operation mode determining unit 40 executes the processing which determines the operation mode of the internal combustion engine 1 according to the operation state of the internal combustion engine 1. Here, in this embodiment, the operation mode of the internal combustion engine 1 to be determined by the operation mode determining unit 40 will be explained below in detail. However, the operation mode has a first intermediate mode that is temporarily interposed between these operation modes at the time of shifting from the HCCI mode to the SI mode, and a second intermediate mode that is temporarily interposed between these operation modes at the time of shifting from the SI mode to the HCCI mode, in addition to the HCCI mode and the SI mode.

The HCCI control processing unit 41 executes the processing which determines an operational amount (control input) for an HCCI mode which is an operational amount (control input) in a case where the internal combustion engine 1 is operated in the HCCI mode according to the operation state of the internal combustion engine 1, etc. The operational amount for an HCCI mode is composed of a plurality of operational amount which specifies the operation of each of the fuel injectors 17 and 18.

The SI control processing unit 42 executes the processing which determines an operational amount (control input) for an SI mode which is an operational amount (control input) in a case where the internal combustion engine 1 is operated in the SI mode according to the operation state of the internal combustion engine 1, etc. The operational amount for an SI mode is composed of a plurality of operational amount which specifies the operations of the fuel injectors 17 and 18 and the operation of the ignition plug 30 for every cylinder 3.

The output determination processing unit 43 executes the processing which determines a controlling operational amount to be used in order to actually control the operation of the internal combustion engine 1, on the basis of the operational amount for an HCCI mode determined in the HCCI control processing unit 41, the operational amount for an SI mode determined in the SI control processing unit 42, and the operation mode determined in the operation mode determining unit 40. The controlling operational amount is composed of a plurality of operational amounts which specify the operations of the fuel injectors 17 and 18, and the operation of the ignition plug 30. In this embodiment, the output determination processing unit 43 determines the operational amount for an HCCI mode as the controlling operational amount as it is when the operation mode is the HCCI mode, and determines the operational amount for an SI mode as the controlling operational amount when the operation mode is the SI mode. Further, the output determination processing unit 43 determines the controlling operational amount from the operational amount for an HCCI mode and the operational amount for an SI mode when the operation mode is the first intermediate mode or the second intermediate mode.

The throttle control processing unit 44 executes the processing which determines a controlling operational amount to be used in order to control the operation of the throttle valve 16, according to the operation mode determined in the operation mode determining unit 40, and the operation state of the internal combustion engine 1.

Accordingly, the controller 2 controls the operation the fuel injectors 17 and 18 and the operation of the ignition plug 30 for every cylinder 3, depending on the controlling operational amount determined in the output determination processing unit 43. Moreover, the controller 2 controls the operation of the throttle valve 16 depending on the controlling operational amount determined in the throttle control processing unit 44.

In addition, the arithmetic processing unit 34 of the controller 2 also executes the processing which sequentially detects the crank angle on the basis of the output (pulse signal) of the crank angle sensor 19 and the processing which detects the rotational frequency NE of the crankshaft 8, for the control processing thereof. Further, the arithmetic processing unit 34 also executes the processing which detects the ion current peak crank angle CA_ionmax for every cylinder 3 on the basis of the detected crank angle and the output of the ion current sensor 21. In this case, CA_ionmax have only to be detected by the following processing. That is, at the time of the combustion of an air-fuel mixture in each cylinder 3, the arithmetic processing unit sequentially fetches and time-serially stores and holds a set of values of the crank angle detected from the output of the crank angle sensor 19 and values of the ion current detected from the output of the ion current sensor 21. Then, the ion current peak crank angle CA_ionmax is detected from the time-serial values.

Moreover, the arithmetic processing unit 34 also executes the processing which determines a target torque Td which is a target value of an output torque of the internal combustion engine 1 on the basis of the output of the accelerator sensor 32, etc. In addition, the target torque Td has a meaning as an index showing the load of the internal combustion engine 1.

Next, the control processing function of the arithmetic processing unit 34 of the controller 2 will be explained in detail with reference to FIGS. 3 to 28.

Figure 3:
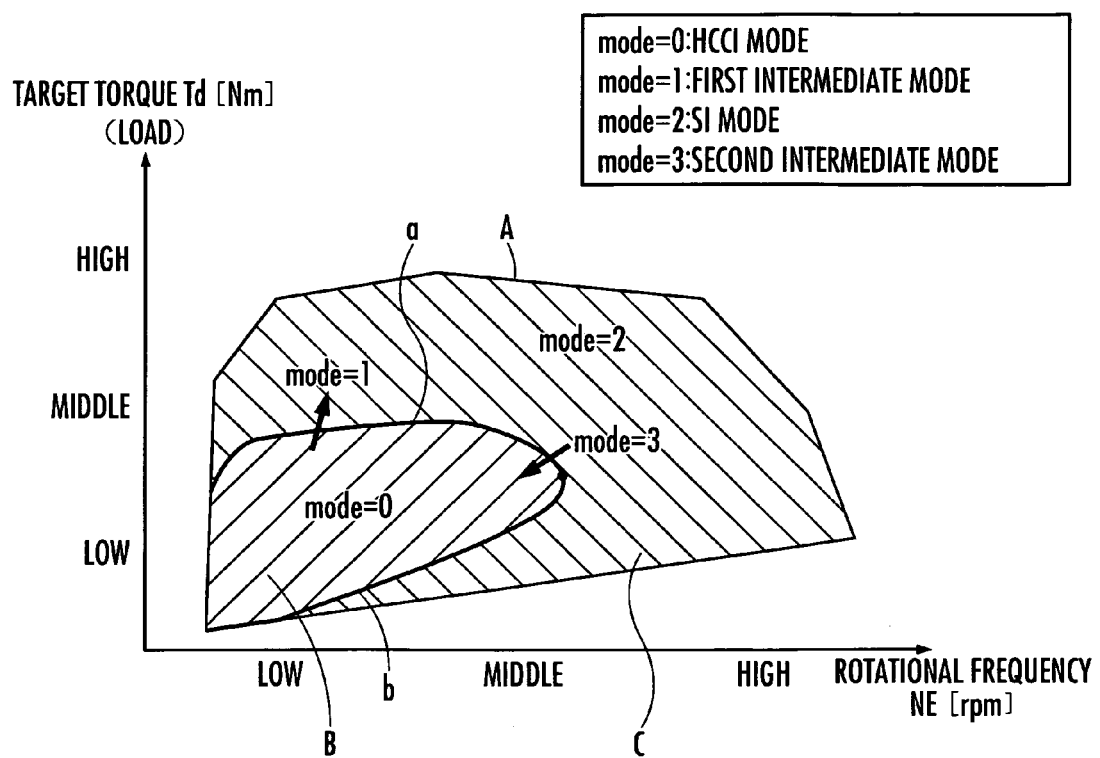
FIG. 3 is a view for explaining a method of determining an operation mode by an operation mode determining unit shown in FIG. 2.

FIG. 3 is a view for explaining a method of determining the operation mode by the operation mode determining unit 40. The rotational frequency NE (latest value) of the internal combustion engine 1 detected in the controller 2 and the target torque Td (latest value) determined in the controller 2 are sequentially input to the operation mode determining unit 40 as indexes showing the operation state of the internal combustion engine 1. Then, the operation mode determining unit 40 determines the operation mode according to the set of the rotational frequency NE and the target torque Td.

With reference to FIG. 3, in this embodiment, the operation of the internal combustion engine 1 is performed in a state where the set of the rotational frequency NE (detection value) and target torque Td of the internal combustion engine 1 exist within an outer frame A in the drawing. Also, the operation mode determining unit 40 basically determines the operation mode as the HCCI mode (this is defined as mode=0 in FIG. 3), in the operation state of the internal combustion engine 1 where the set of the rotational frequency NE and the target torque Td exist within a region B set to a portion surrounded by an upper boundary line a, a lower boundary line b, and the outer frame A, within the outer frame A. The region A is an example of a region that is experimentally set in advance so as to satisfy such conditions that the self-ignition and combustion by the compression of an air-fuel mixture of the combustion chamber 6 of each cylinder 3 can be stably performed, an excessive combustion noise is not generated, the amount of nitrogen oxides (NO$_x$) in an exhaust gas becomes sufficiently small, or the like, in a case where the internal combustion engine 1 is operated in the HCCI mode. In this case, the boundary lines a and b indicate a limit on the side of a high load (the side where the target torque Td becomes a high torque), and a limit on the side of a low load (the side where the target torque Td becomes a low torque), respectively, in a case where the rotational frequency NE is kept constant at the time of the operation in the HCCI mode.

Also, the operation mode determining unit 40 basically determines the operation mode as the SI mode (this is defined as mode=2 in FIG. 3), in the operation state of the internal combustion engine 1 where the set of the rotational frequency NE and the target torque Td exist within a region C within the outer frame A, outside the region B.

However, when the set of the rotational frequency NE and the target torque Td has changed from the region B to the region C, the operation mode determining unit 40 temporarily determines the operation mode as the first intermediate mode (this is defined as mode=1 in FIG. 3), and makes the operation mode transit from the HCCI mode to the SI mode via the first intermediate mode. Further, when the set of the rotational frequency NE and the target torque Td has changed from the region C to the region B contrary to the above, the operation mode determining unit 40 temporarily determines the operation mode as the second intermediate mode (this is defined as mode=3 in FIG. 3), and makes the operation mode transit from the SI mode to the HCCI mode via the second intermediate mode.

In addition, in this embodiment the operation mode determining unit 40 performs switching of the operation mode from the first intermediate mode to the SI mode or switching of the operation mode from the second intermediate mode to the HCCI mode when a difference between a target intake pressure determined in the throttle control processing unit 44 which will be explained below in detail, and the intake pressure PBA detected in the intake pressure sensor 20 becomes below a predetermined setting value (when the difference becomes about 0), in the first intermediate mode and the second intermediate mode.

This means that the operation mode is switched from each intermediate mode to the SI mode or HCCI mode, in a state where an actual intake air amount (air supply amount) to the combustion chamber 6 of each cylinder 3 almost coincides with a targeted intake air amount when the operation of the internal combustion engine 1 in the SI mode or HCCI mode which is an operation mode subsequent to each intermediate mode.

However, the timing with which the switching of the operation mode from the first intermediate mode to the SI mode, or the switching of the operation mode from the second intermediate mode to the HCCI mode can also be determined on the basis of the output of the ion current sensor 21, and the output of the sensor (cylinder pressure sensor) which detects the pressure within the combustion chamber 6 of each cylinder 3.

Additionally, it is desirable the region B is set to a region having a margin with respect to an actual limit in which the operation of the internal combustion engine 1 in the HCCI mode can be stably performed, in other words, a region in which the operation of the internal combustion engine 1 in the HCCI mode can be stably performed even if it slightly deviating from the region. Further, at the time of the operation of the internal combustion engine 1 near the boundary of the region B, hysteresis characteristics may be specified to the boundary lines a and b of the region B in order to prevent the operation mode from being frequently switched. Otherwise, when the operation mode has been switched, the switching of the operation mode may be prohibited during a certain specified time. Otherwise, the target torque Td may not be rapidly changed by making the target torque Td follow a required torque according to the stepping amount of the accelerator pedal with a delay.

Figure 4:
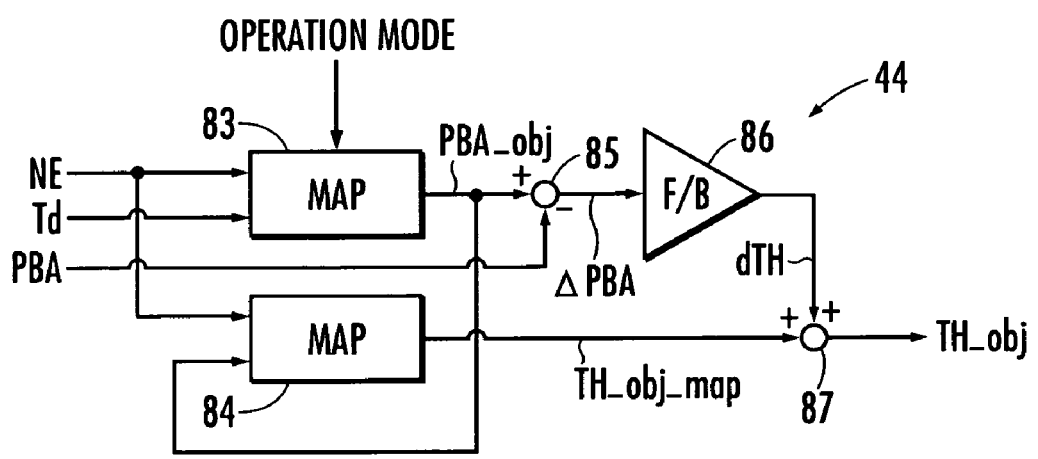
FIG. 4 is a functional block diagram showing a control processing function of a throttle control processing unit shown in FIG. 2.

FIG. 4 is a functional block diagram showing the control processing function of the throttle control processing unit 44. The control processing of the throttle control processing unit 44 is sequentially executed at a predetermined angle of rotation of the crankshaft 8. The detection value (latest value) of the rotational frequency NE of the internal combustion engine 1, the target torque Td (latest value), the intake pressure PBA (latest value) detected in the intake pressure sensor 20, and the operation mode determined in the operation mode determining unit 40 are sequentially input to the throttle control processing unit 44.

Also, the throttle control processing unit 44 first determines a first target intake pressure PBA_obj which is the target value of the intake pressure of the internal combustion engine 1, by a processing unit 83, from the input NE and Td (these are indexes showing the operation state of the internal combustion engine 1). In this case, the processing unit 83 selects a map illustrated in FIG. 5 or 6 according to the input operation mode, and determines PBA_obj, from the input NE and Td (in other words, according to the current operation state of the internal combustion engine 1) on the basis of the selected map.

Figure 5:
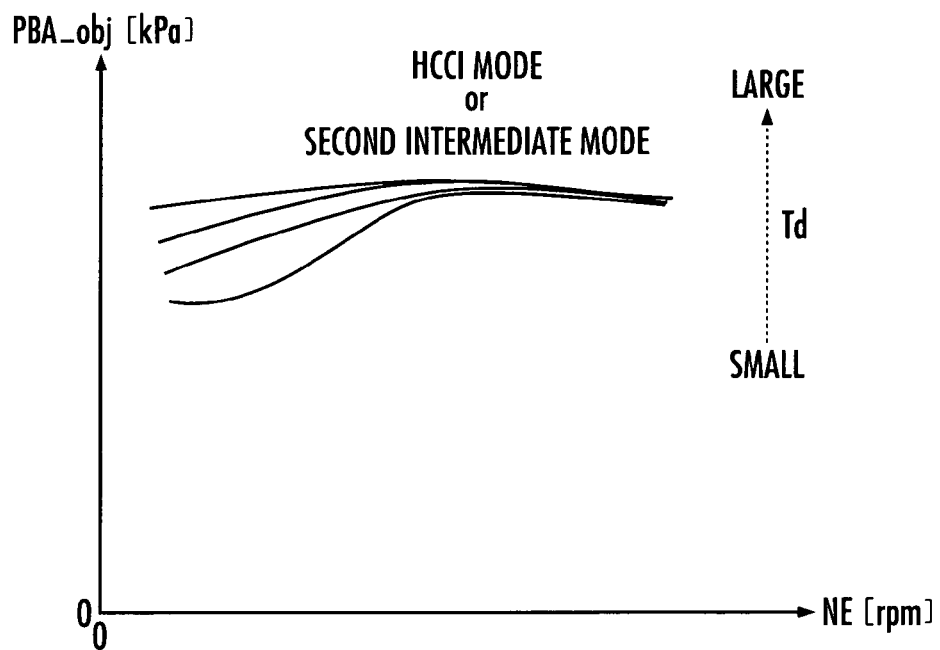
FIG. 5 is a view showing a map to be used in a processing unit 83 shown in FIG. 4.
Figure 6:
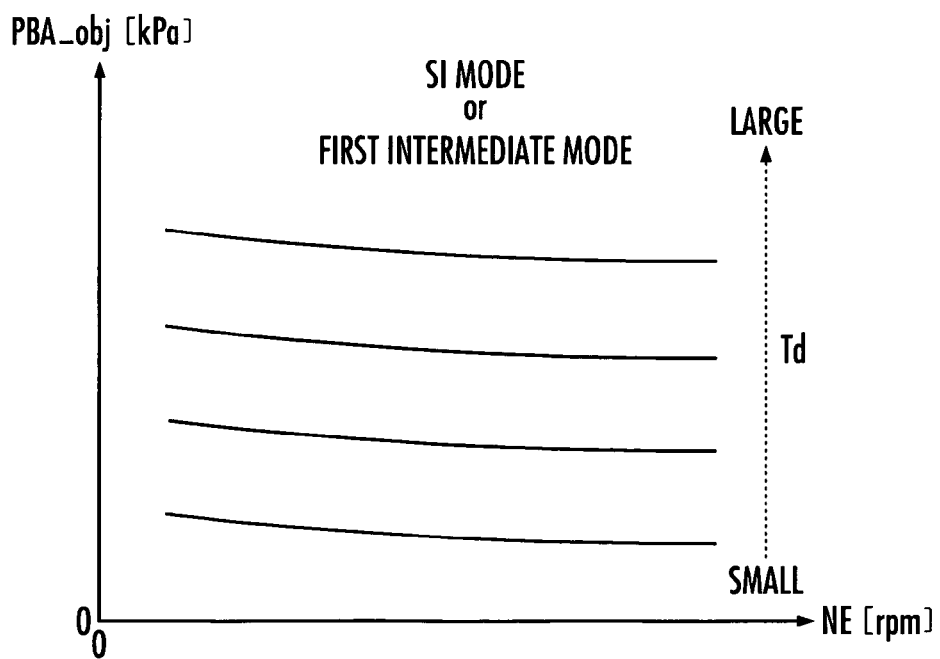
FIG. 6 is a view showing a map to be used in the processing unit 83 shown in FIG. 4.

In this case, the processing unit 83 uses the map of FIG. 5 in a case where the input operation mode is the HCCI mode or the second intermediate mode, or uses the map of FIG. 6 in a case where the input operation mode is the SI mode or the first intermediate mode. The map of FIG. 5 is a map which is experimentally set so that the operation state of the internal combustion engine 1 becomes an optimal operation state (such an operation state that the combustion of an air-fuel mixture in each cylinder 3 is performed with high stability and at high efficiency), in a normal operation state where the rotational frequency NE or the like becomes constant, in a case where the internal combustion engine 1 in the HCCI mode is operated. Further, the map of FIG. 6 is a map which is experimentally set so that the operation state of the internal combustion engine 1 becomes an optimal operation state, in the normal operation state, in a case where the internal combustion engine 1 in the SI mode is operated.

In addition, these maps are set so that the target intake pressure PBA_obj that is determined when the current operation state (a set of the input NE and Td) of the internal combustion engine 1 is an operation state corresponding to the HCCI mode or an operation state (operation state near the boundary lines a and b of the FIG. 3) corresponding to the boundary between the HCCI mode and the SI mode becomes a higher intake pressure (in other words, so that the intake air amount (air supply amount) to the combustion chamber 6 of each cylinder 3 becomes larger) in a case where the map of FIG. 5 is used (a case where the operation mode is the HCCI mode or the second intermediate mode) than a case where the map of FIG. 6 is used (a case where the operation mode is SI mode or the first intermediate mode). For this reason, when the operation mode has been switched from the HCCI mode to the first intermediate mode, the target intake pressure PBA_obj becomes small (this means that a targeted intake air amount is reduced), and when the operation mode has been switched from the SI mode to the second intermediate mode, the target intake pressure PBA_obj becomes large (this means that a targeted intake air amount is increased).

Additionally, the maps of FIGS. 5 and 6 are examples, and those maps generally vary depending on the kinds of a low-octane fuel and a high-octane fuel, the specification of the internal combustion engine 1, etc.

Further, the target intake pressure PBA_obj determined on the basis of the map of FIG. 5 and the target intake pressure PBA_obj determined on the basis of the map of FIG. 6 respectively correspond to the first target value and second target value of the intake state quantity in the invention. Accordingly, the processing unit 83 has a function as the first target intake state quantity determining means and second target intake state quantity determining means in the invention.

Figure 7:
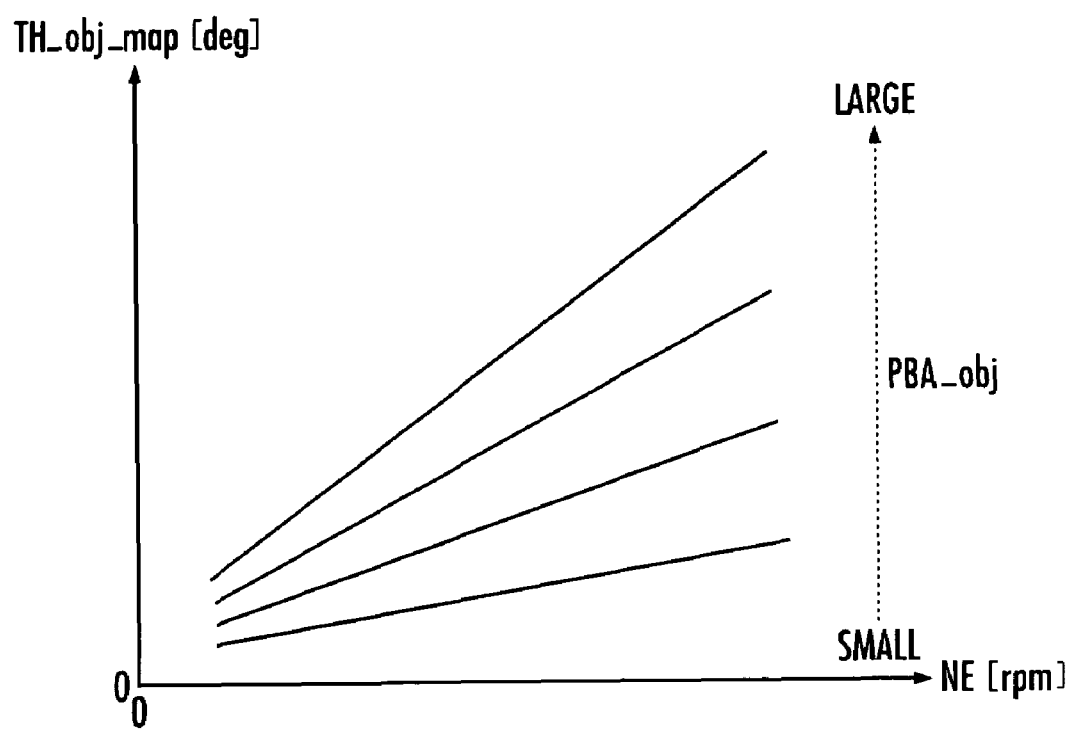
FIG. 7 is a view showing a map to be used in the processing unit 84 shown in FIG. 4.

The throttle-valve control processing unit 44 further determines a basic opening degree TH_obj_map which is a basic value of the opening degree of the throttle valve 16, by a processing unit 84, from the detection value of the input rotational frequency NE, and the target intake pressure PBA_obj determined as described above. In this case, the processing unit 84 determines the TH_obj_map on the basis of a map set in advance as illustrated in FIG. 7, from the input NE and PBA_obj. In this map, the basic opening degree TH_obj_map is determined to be a large value as the rotational frequency NE becomes higher or as the target air pressure PBA_obj becomes larger.

The map of the above processing unit 84 is experimentally set so that the actual intake pressure PBA detected by the intake pressure sensor 20 coincide with the target intake pressure PBA_obj in a normal operation state where the rotational frequency NE and target intake pressure PBA_obj are kept constant.

Further, the throttle control processing unit 44 calculates a deviation ΔPBA (=PBA_obj−PBA) between the target intake pressure PBA_obj determined in the processing unit 83 and the detection value of the input intake pressure PBA, by an arithmetic unit 85. Also, the throttle control processing unit 44 calculates a feedback request operational amount dTH for bringing the deviation ΔPBA close to "0", by an F/B arithmetic unit 86, from the deviation ΔPBA. The feedback request operational amount dTH is a corrective operational amount for correcting the basic opening degree TH_obj_map so that the deviation ΔPBA is brought close to "0". In this case, the F/B arithmetic unit 86 calculates the feedback request operational amount dTH from deviation ΔPBA by feedback control rules, such as a proportion rule and a PID rule.

Next, the throttle control processing unit 44 adds the feedback request operational amount dTH obtained in the F/B arithmetic unit 86 to the basic opening degree TH_obj_map determined in the processing unit 84, by the arithmetic unit 87, thereby determining a target opening degree TH_obj of the throttle valve 16.

In addition, the target opening degree TH_obj is output to an actuator (whose illustration is omitted) of the throttle valve 16 via the driver circuit 35. Then, the actual opening degree of the throttle valve 16 is controlled to the target opening degree TH_obj by the actuator.

By the processing of the throttle control processing unit 44 described above, the response delay of an intake pressure according to the opening degree operation of the throttle valve 16 is compensated, and the target opening degree TH_obj of the throttle valve 16 is determined so that the actual intake pressure PBA of the internal combustion engine 1 becomes the target intake pressure PBA_obj suitable for the operation (operation in the HCCI mode or SI mode) of the internal combustion engine 1. Furthermore, the target opening degree TH_obj of the throttle valve 16 is determined so that the intake air amount (air supply amount) to the combustion chamber 6 of each cylinder 3 of the internal combustion engine 1 becomes a target value equivalent to the target intake pressure PBA_obj. In this case, the map to be used in the processing unit 83 is set as described above, and the opening degree or intake air amount of the throttle valve 16 do not change instantaneously. Thus, when the operation mode has been switched from the HCCI mode to the first intermediate mode, the intake air amount (air supply amount) to the combustion chamber 6 of each cylinder 3 decreases gradually. Further, when the operation mode has been switched from the SI mode to the second intermediate mode, the intake air amount (air supply amount) to the combustion chamber 6 of each cylinder 3 increases gradually.

These are the details of the control processing of the throttle control processing unit 44. Additionally, this throttle control processing unit 44 constitutes the intake-air controlling means in the invention, in conjunction with the intake pressure sensor 20.

Figure 8:
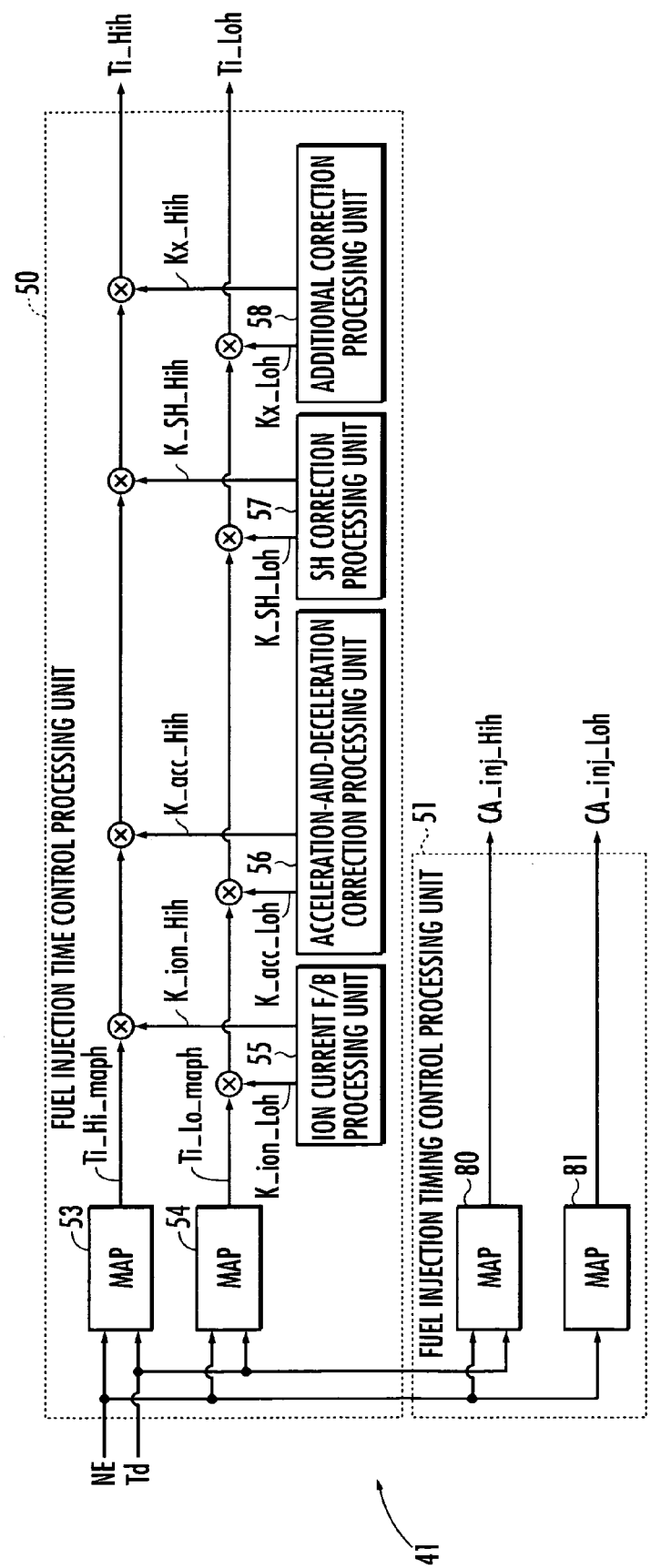
FIG. 8 is a functional block diagram showing a control processing function of a HCCI control processing unit shown in FIG. 2.

FIG. 8 is a functional block diagram showing the control processing function of the HCCI control processing unit 41. Referring to this drawing, in this embodiment, the HCCI control processing unit 41 is constituted by a fuel injection time control processing unit 50 which determines respective fuel injection times Ti_Loh and Ti_Hih of the fuel injector 17 for a low-octane fuel and the fuel injector 18 for a high-octane fuel for every cylinder 3, and a fuel injection timing control processing unit 51 which determine respective fuel injection timings CA_inj_Loh and CA_inj_Hih of the fuel injector 17 for a low-octane fuel and the fuel injector 18 for a high-octane fuel for every cylinder 3. In addition, although the fuel injection time control processing unit 50 and the fuel injection timing control processing unit 51 are separately provided for every cylinder 3, only those relating to one cylinder 3 are typically shown in FIG. 3.

Here, the fuel injection times Ti_Loh and Ti_Hih have a meaning as operational amounts (control inputs) which specify the supply amounts (injection amounts) of two kinds of fuels to the combustion chamber 6 of each cylinder 3 by the fuel injectors 17 and 18 for every cylinder 3 in a case where the operation of the internal combustion engine 1 is performed in the HCCI mode. Here, the fuel injection timings CA_inj_Loh and CA_inj_Hih (these are timings at a crank angle) have a meaning as operational amounts (control inputs) which specify the supply timings (injection timings) of two kinds of fuels to the combustion chamber 6 of each cylinder 3 by the fuel injectors 17 and 18 for every cylinder 3 in a case where the operation of the internal combustion engine 1 is performed in the HCCI mode. The operational amount for an HCCI mode determined in the HCCI control processing unit 41 is an operational amount group composed of the fuel injection times Ti_Loh and Ti_Hih and the fuel injection timings CA_inj_Loh and CA_inj_Hih, and has a meaning as an operational amount which specifies the operations of the fuel injectors 17 and 18 for every cylinder 3.

In addition, the fuel supply amount (injection amount) may be determined instead of the fuel injection times Ti_Loh and Ti_Hih. Further, the fuel injection timings CA_inj_Loh and CA_inj_Hih are not necessarily determined in the dimension of the crank angle, and may be determined in the dimension of a time (time instant).

Additionally, the HCCI control processing unit 41 has a function as a control processing means for a compression ignition operation mode in the invention.

The control processing of the fuel injection time control processing unit 50 for every cylinder 3 is performed as follows with predetermined timing synchronized with the combustion cycle (two rotations of the crankshaft 8) of the cylinder 3 corresponding to the fuel injection time control processing unit 50. In addition, from now on, attention will now be paid to one arbitrary cylinder 3 among a plurality of cylinders 3 which the internal combustion engine 1 has, and the cylinder 3 will be denoted using reference numeral 3x. Also, the subsequent explanation of the HCCI control processing units 41 is an explanation relating to the one arbitrary cylinder 3x to which attention is paid unless particularly denied. This is the same even in the explanation of the SI control processing unit 42 which will be made below.

The fuel injection time control processing unit 50 includes a processing unit 53 which determines a basic injection time Ti_Hi_maph of a high-octane fuel, a processing unit 54 which determines a basic injection time Ti_Lo_maph of a low-octane fuel, an ion current F/B processing unit 55 which determines first corrective operation amounts K_ion_Hih and K_ion_Loh, second corrective operation amounts K_acc_Hih and K_acc_Loh, third corrective operation amounts K_SH_Hih and K_SH_Loh, and fourth corrective operation amounts Kx_Hih and Kx_Loh for correcting the basic injection times Ti_Hi_maph and Ti_Lo_maph, respectively, an acceleration-and-deceleration correction processing unit 56, an SH correction processing unit 57, and an additional correction processing unit 58.

Also, the fuel injection time control processing unit 50 corrects the basic injection time Ti_Hi_maph of a high-octane fuel by the respective corrective operation amounts K_ion_Hih, K_acc_Hih, K_SH_Hih, and Kx_Hih corresponding to a high-octane fuel, thereby determining a fuel injection time Ti_Hih for every combustion cycle of the cylinder 3x. In this case, in this embodiment, the correction of the basic injection time Ti_Hi_maph is performed by multiplying Ti_Hi_maph by K_ion_Hih, K_acc_Hih, K_SH_Hih, and Kx_Hih. Similarly, the fuel injection time control processing unit 50 corrects the basic injection time Ti_Lo_maph of a low-octane fuel by the respective corrective operation amounts K_ion_Loh, K_acc_Loh, K_SH_Loh, and Kx_Loh corresponding to a low-octane fuel, thereby determining a fuel injection time Ti_Loh for every combustion cycle of the cylinder 3x. In this case, in this embodiment, the correction of the basic injection time Ti_Lo_maph is performed by multiplying Ti_Lo_maph by K_ion_Loh, K_acc_Loh, K_SH_Loh, and Kx_Loh.

In addition, each of the corrective operation amounts K_ion_Hih, K_acc_Hih, K_SH_Hih, and Kx_Hih corresponding to a high-octane fuel functions to increase the fuel injection time Ti_Hih of a high-octane fuel more than the basic injection time Ti_Hi_maph (and thus further increase the supply amount of a high-octane fuel to the cylinder 3x) when the value thereof is larger than "1". On the contrary, each of the corrective operation amounts K_ion_Hih, K_acc_Hih, K_SH_Hih, and Kx_Hih function to the fuel injection time Ti_Hih of a high-octane fuel less than the basic injection time Ti_Hi_maph (and thus further decrease the supply amount of a high-octane fuel to the cylinder 3x) when the value thereof is smaller than "1". Similarly, each of the corrective operation amounts K_ion_Loh, K_acc_Loh, K_SH_Loh, and Kx_Loh corresponding to a low-octane fuel functions to increase the fuel injection time Ti_Loh of a low-octane fuel more than the basic injection time Ti_Lo_maph (and thus further increase the supply amount of a low-octane fuel to the cylinder 3x) when the value thereof is larger than "1". On the contrary, each of the corrective operation amounts K_ion_Loh, K_acc_Loh, K_SH_Loh, and Kx_Loh function to the fuel injection time Ti_Loh of a low-octane fuel less than the basic injection time Ti_Lo_maph (and thus further decrease the supply amount of a low-octane fuel to the cylinder 3x) when the value thereof is smaller than "1".

Hereinafter, the processing of the processing units 53-58 will be concretely explained. First, the basic injection times Ti_Hi_maph and Ti_Lo_maph which are determined in the processing units 53 and 54, respectively, are basic operational amounts which specify the supply amounts (injection amounts) of fuels to the cylinder 3x in a normal operation state (normal operation state in the HCCI mode) where the operation state of the internal combustion engine 1, such as the rotational frequency NE or the target torque Td, is kept constant. In this embodiment, the basic injection times Ti_Hi_maph and Ti_Lo_maph are feed-forward operational amounts that are obtained by maps set in advance from the rotational frequency NE and the target torque Td representing the operation state of the internal combustion engine 1 in the HCCI mode.

Figure 9:
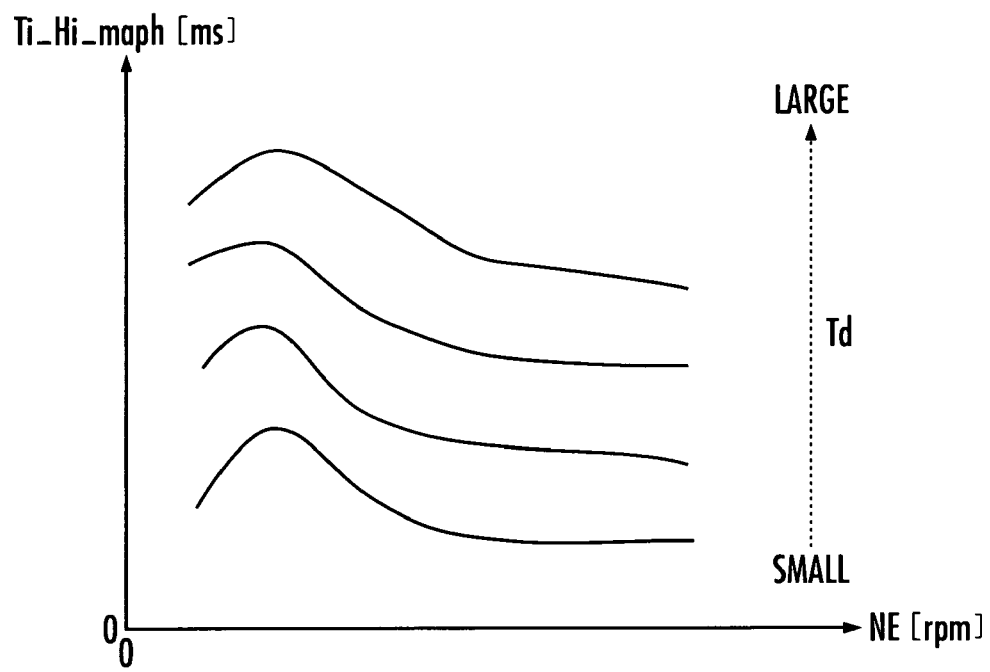
FIG. 9 is a view showing a map to be used in a processing unit 53 shown in FIG. 8.
Figure 10:
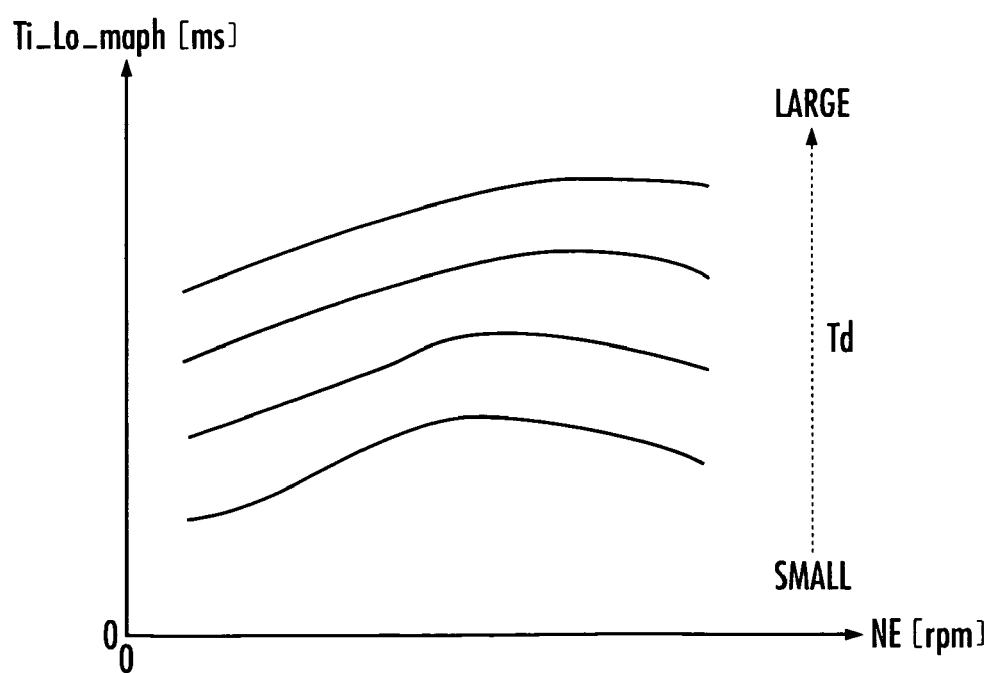
FIG. 10 is a view showing a map to be used in the processing unit 54 shown in FIG. 8.

More specifically, the detection value (latest value) of the rotational frequency NE of the internal combustion engine 1 and the target torque Td (latest value) are input to the processing units 53 and 54, respectively. Also, the processing units 53 and 54 determine the basic injection times Ti_Hi_maph and Ti_Lo_maph from the rotational frequency NE and the target torque Td which are input, respectively, on the basis of the maps set in advance as shown in FIGS. 9 and 10. These maps are those which are experimentally set so that the operation state of the internal combustion engine 1 becomes an optimal operation state, in a normal operation state (more exactly a normal operation state in a case where operational environmental conditions, such as the engine temperature of the internal combustion engine 1, and intake temperature, and atmospheric pressure, are certain fixed standard conditions) where the rotational frequency NE and the target torque Td are kept constant. In this embodiment, these maps are the same in all the cylinders 3. However, these maps may be separately provided for every cylinder 3. In addition, the maps of FIGS. 9 and 10 are examples, and those maps generally vary depending on the kinds of a low-octane fuel and a high-octane fuel, the specification of the internal combustion engine 1, etc.

The first corrective operation amounts K_ion_Hih and K_ion_Loh which are determined in the ion current F/B processing unit 55 are feedback operational amounts for adjusting the ratio of the supply amount of a low-octane fuel and the supply amount of a high-octane fuel to the cylinder 3x so that the combustion timing of an air-fuel mixture in the cylinder 3x is made to coincide with a required target value. In this embodiment, in the processing of the ion current F/B processing unit 55, the first corrective operation amounts K_ion_Hih and K_ion_Loh are determined so that the ion current peak crank angle CA_ionmax in the cylinder 3x is made to coincide with a target value (hereinafter referred to as "target ion current peak crank angle CA_ionmax_obj") corresponding to a targeted combustion timing (so that the deviation between CA_ionmax_obj and CA_ionmax is brought close to 0). In this case, the first corrective operation amounts K_ion_Hih and K_ion_Loh are determined by the correction of the basic injection times Ti_Hi_maph and Ti_Lo_maph according thereto so that the gross calorific value of the high-octane and low-octane fuels (fuels injected by the cylinder 3x) do not change.

Figure 11:
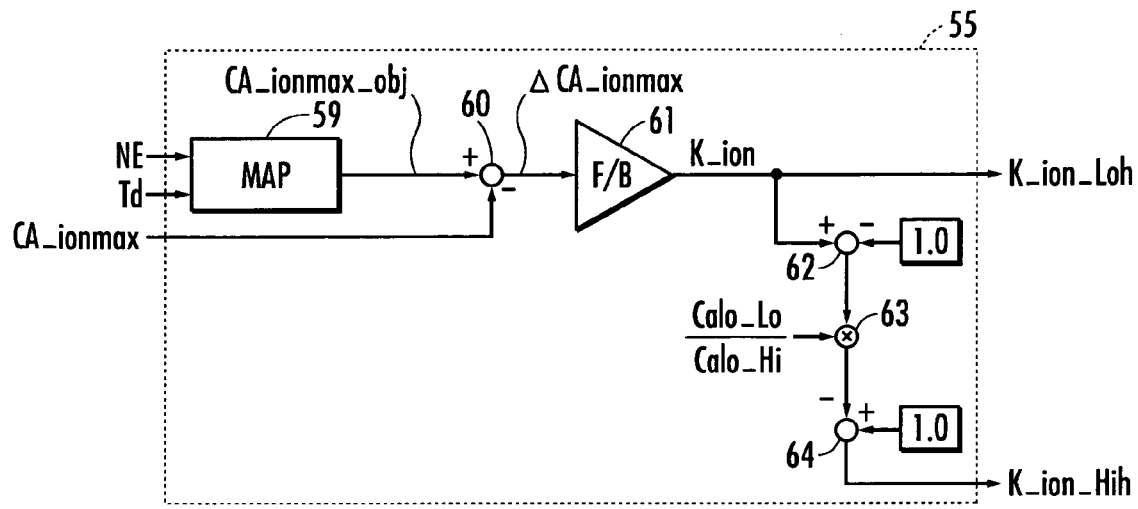
FIG. 11 is a functional block diagram showing a processing function of an ion current F/B processing unit 55 shown in FIG. 8.
Figure 12:
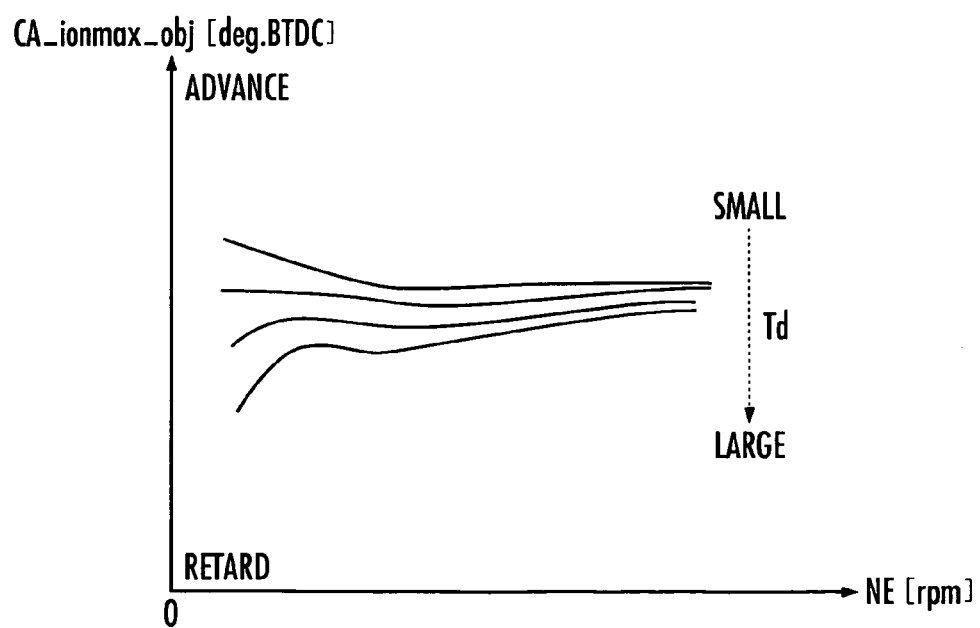
FIG. 12 is a view showing a map to be used in the ion current F/B processing unit 55.

FIG. 11 is a functional block diagram showing the concrete processing function of the ion current F/B processing unit 55. The detection value (latest value) of the rotational frequency NE of the internal combustion engine 1, the target torque Td (latest value), and the detection value (latest value) of the ion current peak crank angle CA_ionmax are input to the ion current F/B processing unit 55. In addition, the ion current peak crank angle CA_ionmax is detected by the controller 2 from the detection value of a crank angle, and the output of the ion current sensor 21 as described above. Also, the ion current F/B processing unit 55 first determines the target ion current peak crank angle CA_ionmax_obj by a target ion current determining unit 59 from the input rotational frequency NE and target torque Td. In this case, the target ion current determining unit 59 determines CA_ionmax_obj from the input NE and Td, on the basis of a map set in advance as illustrated in, for example, FIG. 12. Similarly to the maps of FIGS. 9 and 10, this map is experimentally set so that the optimal operation of the internal combustion engine 1 is performed, in a normal operation state where the rotational frequency NE and the target torque Td are kept constant. Although this map is the same in all the cylinders 3, it may be separately provided for every cylinder 3. In addition, determining CA_ionmax_obj is substantially equivalent to determining the target value of the combustion timing. Further, the map of FIG. 12 is an example, and this map generally varies depending on the kinds of a low-octane fuel and a high-octane fuel, the specification of the internal combustion engine 1, etc.

Next, the ion current F/B processing unit 55 calculates the deviation ΔCA_ionmax (=CA_ionmax_obj−CA_ionmax) between CA_ionmax_obj which is determined as described above, and the detection value of the input ion current peak crank angle CA_ionmax is calculated by an arithmetic unit 60. Moreover, the ion current F/B processing unit 55 calculates a feedback request operational amount K_ion for bringing the deviation ΔCA_ionmax close to "0", by an F/B arithmetic unit 61, from the deviation ΔCA_ionmax. In this case, in this embodiment, for example, a proportion rule is used as a feedback control rule for obtaining K_ion. That is, the F/B arithmetic unit 61 multiplies ΔCA_ionmax by a predetermined gain (proportional gain), and adds the result by "1", thereby obtaining K_ion. In addition, adding "1" to the result obtained by multiplying ΔCA_ionmax by a predetermined gain (proportional gain) is performed in order to set the value of K_ion to "1" when ΔCA_ionmax is "0." Further, the feedback control rule is not limited to the proportion rule, and may other control rules, such as a PID rule, may be used.

In this embodiment, one of the first corrective operation amounts K_ion_Hih and K_ion_Loh, for example, the first corrective operational amount K_ion_Loh relating to a low-octane fuel is defined as a main feedback operational amount for bringing ΔCA_ionmax close to "0". Thus, the ion current F/B processing unit 55 determines the feedback request operational amount K_ion obtained as described above as the first corrective operational amount K_ion_Loh relating to a low-octane fuel as it is. In this case, the gain of the F/B arithmetic unit 61 is set so that, when the detection value of the ion current peak crank angle CA_ionmax is retarded with respect to the target ion current peak crank angle CA_ionmax_obj (when an actual combustion timing is later than a targeted combustion timing), the first corrective operational amount K_ion_Loh becomes larger than "1", and when the detection value of CA_ionmax is advanced with respect to CA_ionmax obj (when an actual combustion timing is earlier than a targeted combustion timing), the first corrective operational amount K_ion_Loh becomes smaller than "1".

Accordingly, in a case where an actual combustion timing is later than a targeted combustion timing, the first corrective operational amount K_ion_Loh is determined so that the supply amount of a low-octane fuel whose ignition performance is higher, to the cylinder 3x, is increased more than the supply amount of a low-octane fuel which is specified according to the basic injection time Ti_Lo_maph. On the contrary, in a case where an actual combustion timing is earlier than a targeted combustion timing, the first corrective operational amount K_ion_Loh is determined so that the supply amount of a low-octane fuel whose ignition performance is higher, to the cylinder 3x, is reduced more than the supply amount of a low-octane fuel which is specified according to the basic injection time Ti_Lo_maph.

Here, if only the basic injection time Ti_Lo_maph relating to a low-octane fuel is corrected by the first corrective operational amount K_ion_Loh, the gross calorific value when a low-octane fuel of a amount specified according to the injection time after the correction, and a high-octane fuel of a supply amount specified according to the basic injection time Ti_Hi_maph is combusted, the gross calorific value (gross calorific value which is originally predetermined) when a low-octane fuel and a high-octane fuel with supply amounts which are specified according to the basic injection times Ti_Lo_maph and Ti_Hi_maph, respectively, will change. Thus, in this embodiment, the ion current F/B processing unit 55 determines the first corrective operational amount K_ion_Hih relating to a high-octane fuel so that the gross calorific value at the time of the combustion of a low-octane fuel and a high-octane fuel in the cylinder 3x is changed, in cases where the basic injection times Ti_Hi_maph and Ti_Lo_maph are corrected and are not corrected by the first corrective operation amounts K_ion_Hih and K_ion_Loh, respectively.

Specifically, after the ion current F/B processing unit 55 determines the first corrective operational amount K_ion_Loh (=K_ion) as described above, a difference (K_ion_Loh-1) between this K_ion_Loh and "1" is obtained by the arithmetic unit 62. Also, the ion current F/B processing unit 55 multiplies the above difference (K_ion_Loh−1) by a ratio (Calo_Lo/Calo_Hi) of a calorific value Calo_Lo (a calorific value at the time of the combustion of a low-octane fuel supplied to the cylinder 3x according to the basic injection time Ti_Lo_maph) of a low-octane fuel calculated in correspondence with the basic injection time Ti_Lo_maph, and a calorific value Calo_Hi (calorific value at the time of the combustion of a high-octane fuel supplied to the cylinder 3x according to basic injection time Ti_Hi_maph) of a high-octane fuel calculated in correspondence with the basic injection time Ti_Hi_maph, by the arithmetic unit 63. In this case, Calo_Lo is a value which is calculated from the characteristic values (lower calorific value and density) of a low-octane fuel, and the injection amount (supply amount to the cylinder 3x) of a low-octane fuel specified by the basic injection time Ti_Lo_maph, and which is proportional to Ti_Lo_maph. Similarly, Calo_Hi is a value which is calculated from the characteristic values (lower calorific value and density) of a high-octane fuel, and the injection amount (supply amount to the cylinder 3x) of a high-octane fuel specified by the basic injection time Ti_Hi_maph, and which is proportional to Ti_Hi_maph.

Next, the ion current F/B processing unit 55 obtains a value which is obtained by subtracting the operation result of the above arithmetic unit 63 from "1" by the arithmetic unit 64, and determines the obtained value as the first corrective operational amount K_ion_Hih relating to a high-octane fuel.

Additionally, the whole arithmetic processing of the arithmetic units 62 to 64 is to perform the following operation: K_ion_Hih=1−(K_ion_Loh−1)·Calo_Lo/Calo_Hi.

K_ion_Hih determined in this way is determined to be a value smaller than "1" in the case of K_ion_Loh>1, and is determined to be a larger value than "1" in the case of K_ion_Loh<1. Accordingly, in a case where an actual combustion timing is later than a targeted combustion timing, the first corrective operational amount K_ion_Hih is determined so that the supply amount of a high-octane fuel whose ignition performance is lower, to the cylinder $3x$, is reduced more than the supply amount of the high-octane fuel which is specified according to the basic injection time Ti_Hi_maph. On the contrary, in a case where an actual combustion timing is earlier than a targeted combustion timing, the first corrective operational amount K_ion_Hih is determined so that the supply amount of a high-octane fuel whose ignition performance is lower, to the cylinder $3x$, is reduced more than the supply amount of a high-octane fuel which is specified according to the basic injection time Ti_Hi_maph.

The first corrective operational amounts K_ion_Loh and K_ion_Hih as feedback operational amounts for bringing the deviation ΔCA_ionmax close to 0 are determined by the processing of the ion current F/B processing unit 55 described above. In this case, the first corrective operational amounts K_ion_Loh and K_ion_Hih are determined so that the ratio of the supply amount of a low-octane fuel to the supply amount of a high-octane fuel after the correction by the first corrective operational amounts K_ion_Loh and K_ion_Hih is increased more than the ratio of the supply amount of a low-octane fuel to the supply amount of a high-octane fuel according to the basic injection times Ti_Lo_maph and Ti_Hi_maph, in a case where an actual combustion timing is later than a targeted combustion timing, (in a case where the detection value of CA_ionmax is retarded with respect to CA_ionmax_obj). Further, the first corrective operational amounts are determined so that the ratio of the supply amount of a low-octane fuel to the supply amount of a high-octane fuel after the correction by the first corrective operational amounts K_ion_Loh and K_ion_Hih is increased more than the ratio of the supply amount of a low-octane fuel to the supply amount of a high-octane fuel according to the basic injection times Ti_Lo_maph and Ti_Hi_maph, in a case where an actual combustion timing is earlier than a targeted combustion timing, (in a case where the detection value of CA_ionmax is advanced with respect to CA_ionmax_obj).

Further, the first corrective operational amounts K_ion_Loh and K_ion_Hih are determined so that a total (gross calorific value) of the calorific value (=Calo_Lo*K_ion_Loh) of a low-octane fuel with a supply amount according to an injection time which is obtained by correcting the basic injection time Ti_Lo_maph by the first corrective operational amount K_ion_Loh, and the calorific value (=Calo_Hi* K_ion_Hih) of a high-octane fuel with a supply amount according to an injection time which is obtained by correcting the basic injection time Ti_Hi_maph by the first corrective operational amount K_ion_Hih is maintained at a total (gross calorific value) of Calo_Lo and Calo_Hi.

In addition, in this embodiment, the feedback request operational amount K_ion is determined to be the first corrective operational amount K_ion_Loh relating to a low-octane fuel as it is. However, K_ion may be determined to be the first corrective operational amount K_ion_Hih relating to a high-octane fuel as it is. In this case, the gain of the F/B arithmetic unit 61 is set so that, when the detection value of CA_ionmax is retarded with respect to CA_ionmax_obj (when an actual combustion timing is later than a targeted combustion timing), the first corrective operational amount K_ion_Hih becomes smaller than "1", and when the detection value of CA_ionmax is advanced with respect to CA_ionmax_obj (when an actual combustion timing is earlier than a targeted combustion timing), the first corrective operational amount K_ion_Hih becomes larger than "1". Moreover, the first corrective operational amount K_ion_Loh relating to a low-octane fuel has only to be determined by the following operation: K_ion_Loh=1−(K_ion_Hih−1)·Calo_Hi/Calo_Lo.

Further, in a case where K_ion is sufficiently close to "1", K_ion may be determined to be the value of any one of the first corrective operational amounts K_ion_Loh and K_ion_Hih as it is, and the value of the other one may be set to "1." n other words, the basic injection time may be corrected according to the feedback request operational amount K_ion, only about any one of a low-octane fuel and a high-octane fuel.

The second corrective operational amounts K_acc_Hih and K_acc_Loh which are determined in the acceleration-and-deceleration correction processing unit 56 are operational amounts which adjusts the ratio of the supply amount of a low-octane fuel and the supply amount of a high-octane fuel to the cylinder $3x$ in order to adjust the combustion timing of an air-fuel mixture in the cylinder $3x$ in a transient operation state where the operation state (and specifically the rotational speed NE or target torque Td) of the internal combustion engine 1 changes, like at the time of acceleration and deceleration of a vehicle c on which the internal combustion engine 1 is mounted. Here, the basic injection times Ti_Hi_maph and Ti_Lo_maph are determined so that the optimal operation of the internal combustion engine 1 is performed in a normal operation state where the rotational frequency NE and target torque Td of the internal combustion engine 1 are kept constant. Further, a deviation for one combustion cycle is caused between the time when the processing of the fuel injection time control processing unit 50 including the processing of the processing units 53 and 54 is executed, and the time when actual fuel injection to the cylinder $3x$ is performed according to the fuel injection times Ti_Hih and Ti_Lo which are finally determined by the processing of the fuel injection time control processing unit 50. For this reason, in the transient operation state of the internal combustion engine 1, the rotational frequency NE or target torque Td of the internal combustion engine 1 at the time when actual fuel injection to the cylinder $3x$ is performed does not completely coincide with the rotational frequency NE or the target torque Td when the basic injection times Ti_Hi_maph and Ti_Lo_maph relating to the actual fuel injection are determined. Furthermore, the amounts of individual kinds of fuels actually supplied to the cylinder $3x$ will not match the operation state of the internal combustion engine 1 at the time of the combustion of the fuel, but the actual combustion timing will deviate from suitable timing. As a result, there is a possibility that the output torque of the internal combustion engine 1 may be greatly changed at the time of the acceleration or deceleration of a vehicle on which the internal combustion engine 1 is mounted, or knocking or combustion noises may occur.

Thus, in this embodiment, by the second corrective operational amounts K_acc_Hih, and K_acc_Loh, the ratio of the supply amount of a low-octane fuel and the supply amount of a high-octane fuel to the cylinder $3x$ is adjusted, and any deviation of the combustion timing in the cylinder $3x$ in the transient operation state of the internal combustion engine 1 is compensated. In this case, in this embodiment the acceleration-and-deceleration correction processing unit 56, similarly to the processing of the ion current F/B processing unit 55, determines the second corrective operational amounts K_acc_Hih and K_acc_Loh by the correction of the basic injection times Ti_Hi_maph and Ti_Lo_maph by the second corrective operational amounts K_acc_Hih and K_acc_Loh so that the gross calorific value of a high-octane fuel and a low-octane fuel does not change.

Figure 13:
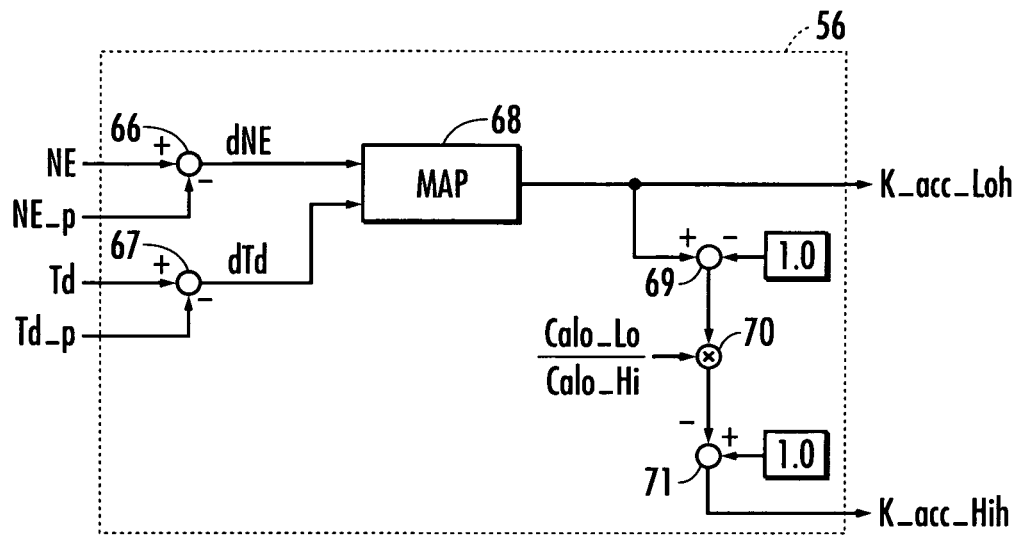
FIG. 13 is a functional block diagram showing a processing function of an acceleration-and-deceleration correction processing unit 56 shown in FIG. 8.

FIG. 13 is a functional block diagram showing the concrete processing function of the acceleration-and-deceleration correction processing unit 56. A detection value (latest value) of the rotational frequency NE of the internal combustion engine 1, a past value NE_p of the rotational frequency NE, a latest value of the target torque Td, and a past value Td_p of the target torque Td are input to the acceleration-and-deceleration correction processing unit 56. In this case, the past value NE_p of the rotational frequency NE is, for example, a value at a predetermined point of time of a previous combustion cycle, or an average value in a previous combustion cycle. Similarly, the past value Td_p of the target torque Td is, for example, a value at a predetermined point of time of a previous combustion cycle, or an average value in a previous combustion cycle. These past values NE_p and Td_p are stored and held a memory which is not shown, and are updated for every combustion cycle of the cylinder 3x.

Also, the acceleration-and-deceleration correction processing unit 56 calculates a difference (NE−NE_p) between the detection value of the rotational frequency NE of the internal combustion engine 1 (latest value), and the past value NE_p as an estimated variation dNE (hereinafter referred to as "estimated rotational frequency variation dNE") of the rotational frequency NE during a period ranging from the combustion timing of an air-fuel mixture in a current combustion cycle of the cylinder 3x to the combustion timing of an air-fuel mixture in the next combustion cycle, by the arithmetic unit 66. Further, the acceleration-and-deceleration correction processing unit 56 calculates a difference (Td−Td_p) between the latest value of the target torque Td, and the past value Td_p as an estimated variation dTd (hereinafter referred to as "estimated torque variation dTd") of the target torque Td during a period ranging from the combustion timing of an air-fuel mixture in a current combustion cycle of the cylinder 3x to the combustion timing of an air-fuel mixture in the next combustion cycle, by the arithmetic unit 67.

In addition, the estimated rotational frequency variation dNE may be obtained by arithmetic interpolation, etc. from the past time-serial data of the rotational frequency NE. Similarly, the estimated torque variation dTd may be obtained by arithmetic interpolation, etc. from the past time-serial data of the target torque Td.

Next, the acceleration-and-deceleration correction processing unit 56 determines any one of the second corrective operational amounts K_acc_Hih and K_acc_Loh, for example, the second corrective operational amount K_acc_Loh relating to a low-octane fuel, by an acceleration-and-deceleration corrective operational amount determining unit 68, from the estimated rotational frequency variation dNE and estimated torque variation dTd which are obtained as described above. In this case, the acceleration-and-deceleration corrective operational amount determining unit 68 determines K_acc_Loh on the basis of a map set in advance as shown, for example, in FIG. 14, from the input dNE and dTd. This map is experimentally determined. In this case, in this map, the value of K_acc_Loh is set according to dNE and dTd so that the injection time which is obtained by correcting the basic injection time Ti_Lo_maph relating to a low-octane fuel by K_acc_Loh becomes a value near the value of the basic injection time obtained by the map of the FIG. 10, when the rotational frequency and target torque of the internal combustion engine 1 are NE+dNE and Td+dTd, respectively. Further, when dNE=dTd=0 is satisfied, the value of K_acc_Loh is set to "1." Further, when DNE>0 and dTd>0 are satisfied, the value of K_acc_Loh is set to a larger value than "1." Further, when DNE<0 and dTd≦0, the value of K_acc_Loh is set to a value smaller than "1."

Figure 14:
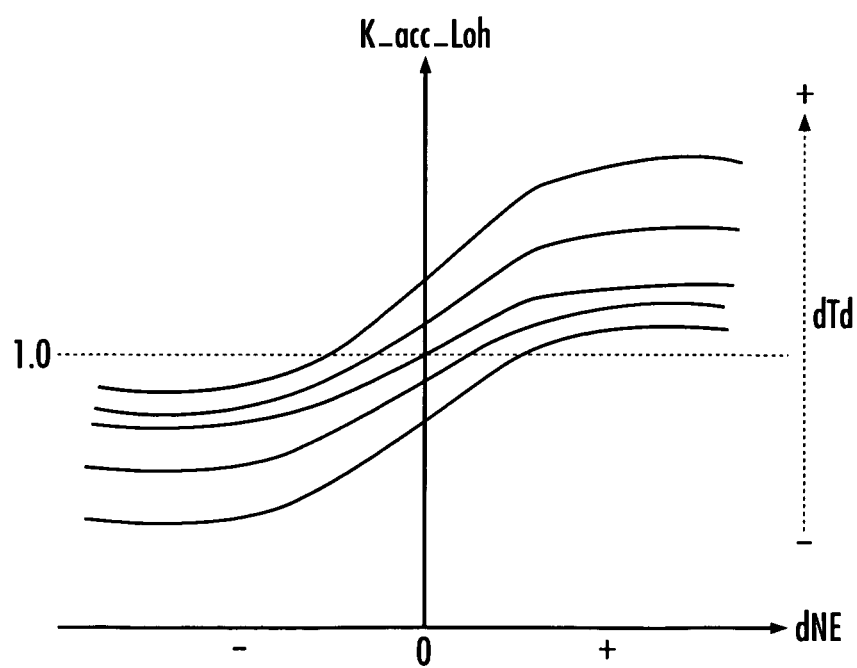
FIG. 14 is a view showing a map to be used in the acceleration-and-deceleration correction processing unit 56.

In addition, the map of FIG. 14 is an example, and this map generally varies depending on the kinds of a low-octane fuel and a high-octane fuel, the specification of the internal combustion engine 1, etc.

The acceleration-and-deceleration correction processing unit 56 executes the processing which obtains the second corrective operational amount K_acc_Hih relating to a high-octane fuel so that the gross calorific value of a high-octane fuel and a low-octane fuel to be supplied to the cylinder 3x does not change, after it has determined the second corrective operational amount K_acc_Loh relating to a low-octane fuel as described above. This processing is the same as the processing in the ion current F/B processing unit 55. Specifically, the acceleration-and-deceleration correction processing unit 56 obtains the difference (K_acc_Loh−1) between the second corrective operational amount K_acc_Loh relating to a low-octane fuel determined as described above, and "1", by an arithmetic unit 69. Also, the acceleration-and-deceleration correction processing unit 56 multiplies the above difference (K_acc_Loh−1) by a ratio Calo_Lo/Calo_Hi) between the calorific value Calo_Lo of a low-octane fuel calculated in correspondence with the basic injection time Ti_Lo_maph, and the calorific value Calo_Hi of a high-octane fuel calculated in correspondence with the basic injection time Ti_Hi_maph, by the arithmetic unit 70. Next, the acceleration-and-deceleration correction processing unit 56 obtains a value which is obtained by subtracting the operation result of the above arithmetic unit 70 from "1" by the arithmetic unit 71, and determines the obtained value as the second corrective operational amount K_acc_Hih relating to a high-octane fuel. Accordingly, the acceleration-and-deceleration correction processing unit 55 determines K_acc_Hih by the following operation: K_acc_Hih=1−(K_acc_Loh−1)·Calo_Lo/Calo_Hi. K_acc_Hih determined in this way is determined to be a value smaller than "1" in the case of K_acc_Loh>1, and is determined to be a larger value than "1" in the case of K_acc_Loh<1.

The second corrective operational amounts K_acc_Loh and K_acc_Hih are determined so as to compensate the influence which the change of the rotational frequency NE or the target torque Td in the transient operation state of the internal combustion engine 1 exerts on the combustion timing of an air-fuel mixture in the cylinder 3x by the processing of the acceleration-and-deceleration correction processing unit 56 described above. In this case, the second corrective operational amounts are determined so that a total of the calorific value of a low-octane fuel according to an injection timing which is obtained by correcting the basic injection time Ti_Lo_maph by the second corrective operational amount K_acc_Loh (=Calo_Lo*K_acc_Loh), and the calorific value (=Calo_Hi*K_acc_Hih) of a high-octane fuel according to an injection time which is obtained by correcting the basic injection time Ti_Hi_maph by the second corrective operational amount K_acc_Hih is kept at a total of Calo_Lo and Calo_Hi. Also, by correcting the basic injection times Ti_Lo_maph and Ti_Hi_maph by the second corrective operational amounts K_acc_Loh and K_acc_Hih, the ratio of the supply amount of a low-octane fuel and the supply amount of a high-octane fuel to the cylinder 3x is adjusted so that the above compensation is made.

In this case, the second corrective operational amounts K_acc_Loh and K_acc_Hih are determined so that the ratio of the supply amount of a low-octane fuel to the supply amount of a high-octane fuel after the correction by the second corrective operational amounts K_acc_Loh and K_acc_Hih is increased more than the ratio of the supply amount of a low-octane fuel to the supply amount of a high-octane fuel according to the basic injection times Ti_Lo_maph and Ti_Hi_maph, in a situation where dNE>0 and dTd>0 are satisfied, i.e., in an accelerating operation state where the rotational frequency NE and the target torque Td of the internal combustion engine 1 increases. Further, the second corrective operational amounts are determined so that the ratio of the supply amount of a high-octane fuel to the supply amount of a low-octane fuel after the correction by the second corrective operational amounts K_acc_Loh and K_acc_Hih is increases more than the ratio of the supply amount of a high-octane fuel to the supply amount of a low-octane fuel according to the basic injection times Ti_Lo_maph and Ti_Hi_maph, in a situation where dNE<0 and dTd≦0 are satisfied, i.e., in a decelerating operation state where the target torque Td of the internal combustion engine 1 decreases or is kept at 0, and the rotational frequency NE decreases.

In addition, in this embodiment, the second corrective operational amount K_acc_Loh relating to a low-octane fuel is determined from the estimated rotational frequency variation dNE and the estimated torque variation dTd. However, the second corrective operational amount K_acc_Hih relating to a high-octane fuel may be determined from dNE and dTd. In this case, the second corrective operational amount K_acc_Loh relating to a low-octane fuel has only to be determined by the following operation: K_acc_Loh=1−(K_acc_Hih−1)·Calo_Hi/Calo_Lo. Further, in a case where the second corrective operational amount K_acc_Loh or K_acc_Hih determined from dNE and dTD is sufficiently close to "1", the other second corrective operational amount K_acc_Hih or K_acc_Loh may be set to "1." In other words, the correction of basic injection time for compensating the influence of changes in the rotational frequency NE and the target torque Td in the transient operation state of the internal combustion engine 1 may be performed only about any one of a low-octane fuel and a high-octane fuel.

The third corrective operational amounts K_SH_Hih and K_SH_Loh which are determined in the SH correction processing unit 57 are operational amounts for adjusting at least the combustion timing immediately after the operation mode of the internal combustion engine 1 has shifted from the SI mode via the second intermediate mode to the HCCI mode.

As mentioned above, in the operation state of the internal combustion engine 1 in the HCCI mode, the air-fuel ratio of an air-fuel mixture of each cylinder 3 is an air-fuel ratio near a theoretical air-fuel ratio. In contrast, in the operation state of the internal combustion engine 1 in the SI mode, the air-fuel ratio of an air-fuel mixture is an air-fuel ratio nearer to the lean side. Further, the operation of the internal combustion engine 1 in the SI mode basically is performed in a high load region where the target torque Td is relatively large. For this reason, immediately after the operation mode of the internal combustion engine 1 has been switched from the SI mode via the second intermediate mode to the HCCI mode, the temperature of the inside of each cylinder 3 and the temperature of a cylinder tends to be higher than a normal temperature at the time of the continuous operation of the internal combustion engine 1 in the HCCI mode. For this reason, there is possible that, immediately after the operation mode has been switched to the HCCI mode, the ignition timing of the fuel (composite fuel) of an air-fuel mixture of the combustion chamber 6 of each cylinder 3 is apt to be earlier than a suitable ignition timing, excessive combustion noises are generated, or knocking occurs.

Thus, in this embodiment, the stability of combustion immediately after the operation mode has been switched to the HCCI mode is secured so that the ratio of the supply amount of a low-octane fuel and the supply amount of a high-octane fuel to the cylinder 3x is adjusted by the third corrective operational amounts K_SH_Hih and K_SH_Loh, at least in a predetermined period immediately after switching to the HCCI mode at the time of shifting of the operation mode from the SI mode to the HCCI mode.

Figure 15:
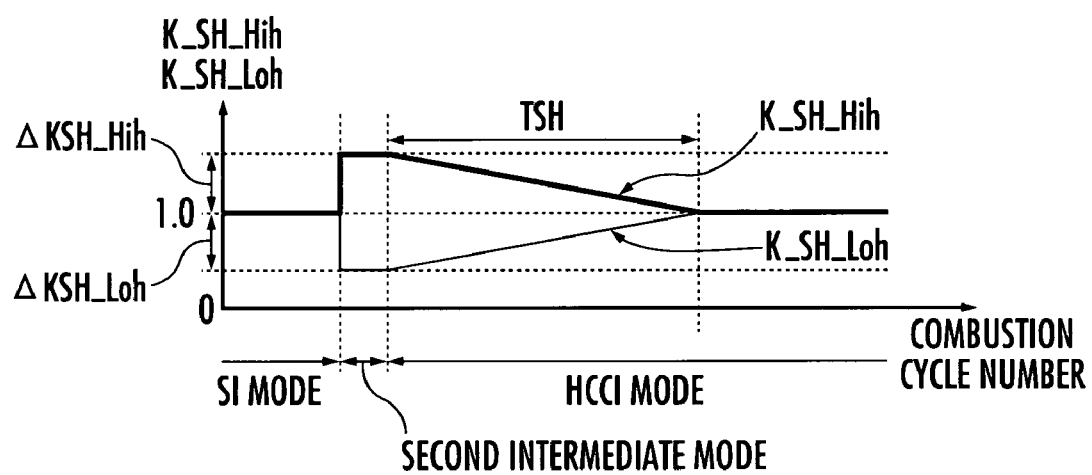
FIG. 15 is a graph showing a method of determining a third corrective operational amount by an SH correction processing unit 57 shown in FIG. 8.

FIG. 15 is a graph showing a method of determining the third corrective operational amounts K_SH_Hih and K_SH_Loh by the SH correction processing unit 57. In addition, the number of combustion cycles on the abscissa axis of the graph of FIG. 15 is the number of combustion cycles of the cylinder 3x.

As shown in this drawing, in this embodiment, with the timing of switching from the SI mode to the HCCI mode (more exactly, in a combustion cycle where switching from the SI mode to the second intermediate mode) is made, the third corrective operational amount K_SH_Hih relating to a high-octane fuel is determined to be a value (initial value) larger than "1" by a predetermined adjustment amount ΔKSH_Hi (>0), and the third corrective operational amount K_SH_Loh relating to a low-octane fuel is determined to be a value (initial value) smaller than "1" by a predetermined adjustment amount ΔKSH_Lo (>0). Also, the third corrective operational amounts K_SH_Hih and K_SH_Loh are held at the initial values of the adjustment amounts ΔKSH_Hi and ΔKSH_Lo, respectively, in the second intermediate mode. Moreover, the third corrective operational amounts K_SH_Hih and K_SH_Loh are determined for every combustion cycle of the cylinder 3x so as to gradually approach "1" from the above initial values in a predetermined time immediately after switching from the second intermediate mode to the HCCI mode, or in a period TSH (hereinafter referred to as "SH correction period TSH") having a predetermined number of combustion cycles. Moreover, after the lapse of the SH correction period TSH, the third corrective operational amounts K_SH_Hih and K_SH_Loh are held at "1."

In addition, the SH correction period TSH is a period during which the temperature within the cylinder 3x and the temperature of the wall of the cylinder is required to rise to a normal temperature at the time of the continuous operation of the internal combustion engine 1 in the HCCI mode, within this period. Although the SH correction period TSH may be a specified time or the period of a specified number of combustion cycles, it may be set according to the operation time of the internal combustion engine 1 in the SI mode immediately before the HCCI mode, or the number of combustion cycles at the time of the operation time. Further, the values of the third corrective operational amount K_SH_Hih and K_SH_Loh in the SI mode are held at "1."

As described above, when the operation mode shifts from the SI mode to the HCCI mode by determining the third corrective operational amounts K_SH_Hih and K_SH_Loh, in the SH correction period TSH immediately after switching from the second intermediate mode to the HCCI mode, the third corrective operational amount K_SH_Hih relating to a high-octane fuel is determined to be a larger value than "1", and simultaneously, the third corrective operational amount K_SH_Loh relating to a low-octane fuel is determined to be a value smaller than "1." That is, the third corrective operational amounts K_SH_Hih and K_SH_Loh are determined so that the ratio of the supply amount of a high-octane fuel to the supply amount of a low-octane fuel after the correction by the third corrective operational amounts K_SH_Hih and K_SH_Loh is increased more than the ratio of the supply amount of a high-octane fuel to the supply amount of a low-octane fuel in a case where K_SH_Hih=K_SH_Loh=1 are satisfied (in a case where the correction by the third corrective operational amounts K_SH_Hih and K_SH_Loh is omitted).

Also, the third corrective operational amounts K_SH_Hih and K_SH_Loh are gradually brought close to "1" within the SH correction period TSH.

In addition, the initial values of the third corrective operational amounts K_SH_Hih and K_SH_Loh in the SH correction period TSH are set according the operation time of the internal combustion engine 1 in the SI mode immediately before the HCCI mode, and the number of combustion cycles at the time of the operation time. Further, in the example of FIG. 15, the third corrective operational amounts K_SH_Hih and K_SH_Loh are linearly changed and brought close to "1" in the SH correction period TSH. However, the third corrective operational amounts may be brought close to "1" while they are curvedly changed, like the shape of an exponential function, etc. Further, the third corrective operational amounts K_SH_Hih and K_SH_Loh may be determined so as not to change the gross calorific value of a composite fuel, similarly to the case where the first corrective operation amounts K_ion_Hih and K_ion_Loh are determined.

Returning to FIG. 8, the fourth corrective operational amounts Kx_Hih and Kx_Loh which are determined in the additional correction processing unit 58 correct the basic injection times Ti_Hi_maph and Ti_Lo_maph according to operational environmental conditions, such as the engine temperature (cooling water temperature or oil temperature) of the internal combustion engine 1, intake-air temperature, and atmospheric pressure, which are detected by sensors which is not shown. That is, it is premised in this embodiment that the basic injection times Ti_Hi_maph and Ti_Lo_maph are fixed standard conditions with operational environmental conditions, such as engine temperature of the internal combustion engine 1, intake-air temperature, and atmospheric pressure, as described above. Also, the fuel injection time for performing the optimal operation of the internal combustion engine 1 slightly changes according to the operational environmental conditions.

Thus, in this embodiment, the basic injection times Ti_Hi_maph and Ti_Lo_maph are corrected by the fourth corrective operational amounts Kx_Hih and Kx_Loh. In this case, detection values, such as engine temperature (cooling water temperature or oil temperature), intake-air temperature, and atmospheric pressure, are input to the additional correction processing unit 58 from sensors which are not shown. Also, the additional correction processing unit 58 determines the fourth corrective operational amounts Kx_Hih and Kx_Loh by maps, tables, or operation expressions that are set in advance from the input values. In addition, the fourth corrective operational amounts Kx_Hih and Kx_Loh generally are different from each other even if the operational environmental conditions are the same.

In addition, in the processing units 53 and 54, the basic injection times Ti_Hi_maph and Ti_Lo_maph may be determined, for example, using multi-dimensional maps, and using the detection values of engine temperature, intake-air temperature, and atmospheric pressure as well as the rotational frequency NE and target torque Td of the internal combustion engine 1. In this case, the additional correction processing unit 58 is unnecessary.

Here, to supplement the SH correction processing unit 57, in this embodiment, a set of fuel injection times Ti_Hih (=Ti_Hi_maph*K_ion_Hih*K_acc_Hih*Kx_Hih) and Ti_Loh (=Ti_Lo_maph*K_ion_Loh*K_acc_Loh*Kx_Loh) that are finally determined by the fuel injection time control processing unit 50 in a situation where both the third corrective operational amounts K_SH_Loh and K_SH_Hih are set to "1," that is, at the time of the operation of the internal combustion engine 1 in the HCCI mode other than the SH correction period TSH, in a case where the operation mode of the internal combustion engine 1 is the HCCI mode, corresponds to a normal operational amount group in the invention. That is, the amounts obtained by correcting the set of basic injection times Ti_Hi_map and Ti_Lo_map by the corrective operational amounts that are determined by the ion current F/B processing unit 55, the acceleration-and-deceleration correction processing unit 56, and the additional correction processing unit 58, respectively, generally corresponds to an operational amount group. Accordingly, the first predetermined control rule in the invention is configured by the control processing of the processing units 53 and 54, the ion current F/B processing unit 55, the acceleration-and-deceleration correction processing unit 56, and the additional correction processing unit 58, and the processing which corrects the basic injection times Ti_Hi_map and Ti_Lo_map by the corrective operational amounts respectively determined by the ion current F/B processing unit 55, the acceleration-and-deceleration correction processing unit 56, and the additional correction processing unit 58 (multiplying the corrective operational amounts).

Further, the SH correction period TSH corresponds to a first predetermined period in the invention. Also, a set of fuel injection times Ti_Hi (=Ti_Hi_maph*K_ion_Hih*K_acc_Hih*K_SH_Hih*Kx_Hih) and Ti_Loh=Ti_Lo_maph*K_ion_Loh*K_acc_Loh*K_SH_Loh*Kx_Loh) that are finally determined by the fuel injection time control processing unit 50 at the time of the operation of the internal combustion engine 1 in the compression ignition operation mode in the first predetermined period corresponds to a correction operational amount group in the invention. Accordingly, it can be said that the correction operational amount group is a group which is obtained by correcting a normal operational amount group, which is obtained by correcting the set of basic injection times Ti_Hi_maph and Ti_Lo_maph by the corrective operational amounts respectively determined by the ion current F/B processing unit 55, the acceleration-and-deceleration correction processing unit 56, and the additional correction processing unit 58, by the third corrective operational amounts K_SH_Hih and K_SH_Loh which are determined in the SH correction processing unit 57.

These are the details of the control processing of the fuel injection time control processing unit 50.

Next, the control processing of the fuel injection timing control processing unit 51 will be explained with reference to FIG. 8. The control processing is performed as follows in synchronization with the combustion cycle of the cylinder 3x (every two rotations of the crankshaft 8). The fuel injection timing control processing unit 51 is composed of a processing unit 80 which determines a fuel injection timing CA_inj_Hih relating to the fuel injector 18 for a high-octane fuel, and a processing unit 81 which determines a fuel injection timing CA_inj_Loh relating to the fuel injector 17 for a low-octane fuel.

In this case, CA_inj_Hih which is determined in the processing unit 80 is a feed-forward operational amount, and the detection value (latest value) of the rotational frequency NE of the internal combustion engine 1 and the target torque Td (latest value) are input to the processing unit 80 as indexes showing the operation state of the internal combustion engine 1. Also, the processing unit 80 determines CA_inj_Hih from the input NE and Td on the basis of a map set in advance as shown in FIG. 16.

Figure 17:
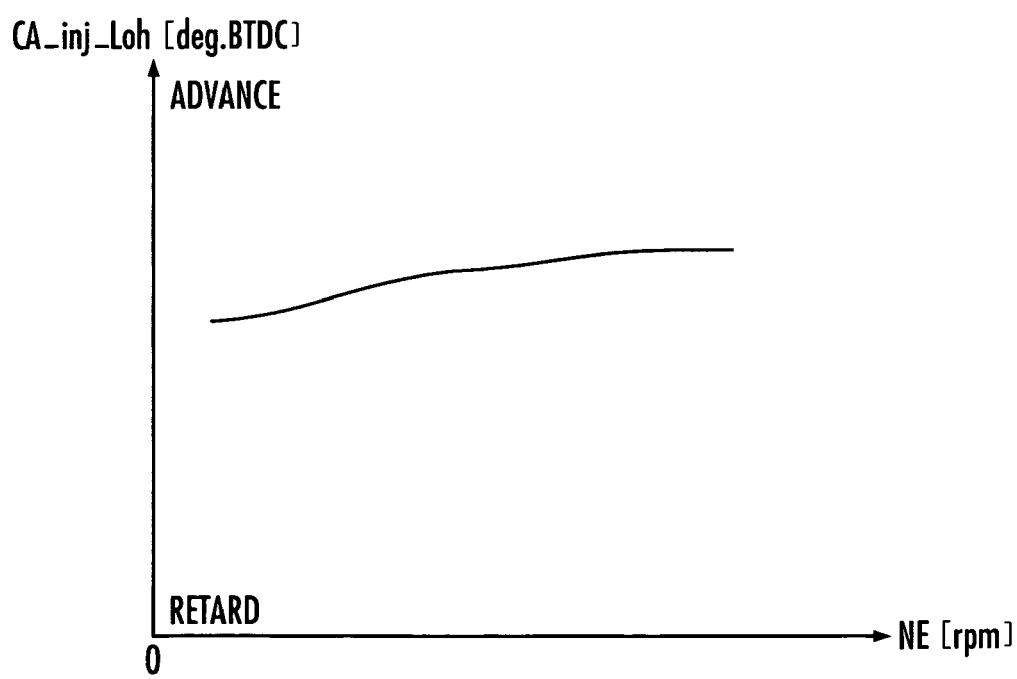
FIG. 17 is a view showing a map to be used in a processing unit 81 shown in FIG. 8.

Further, CA_inj_Loh which is determined in the processing unit 81 is also a feed-forward operational amount, and the detection value (latest value) of the rotational frequency NE of the internal combustion engine 1 is input to the processing unit 81 as an index showing the operation state of the internal combustion engine 1. Also, the processing unit 81 determines CA_inj_Loh from the input NE on the basis of a table set in advance as shown in FIG. 17. In this case, in this table, CA_inj_Loh is not dependent on the target torque Td (load of the internal combustion engine 1). In this embodiment, this is because the fuel injector 17 for a low-octane fuel injects a fuel to the intake port 10 of the cylinder 3x, and the suitable fuel injection timing of a low-octane fuel is hardly influenced by the target torque Td of the internal combustion engine 1.

Figure 16:
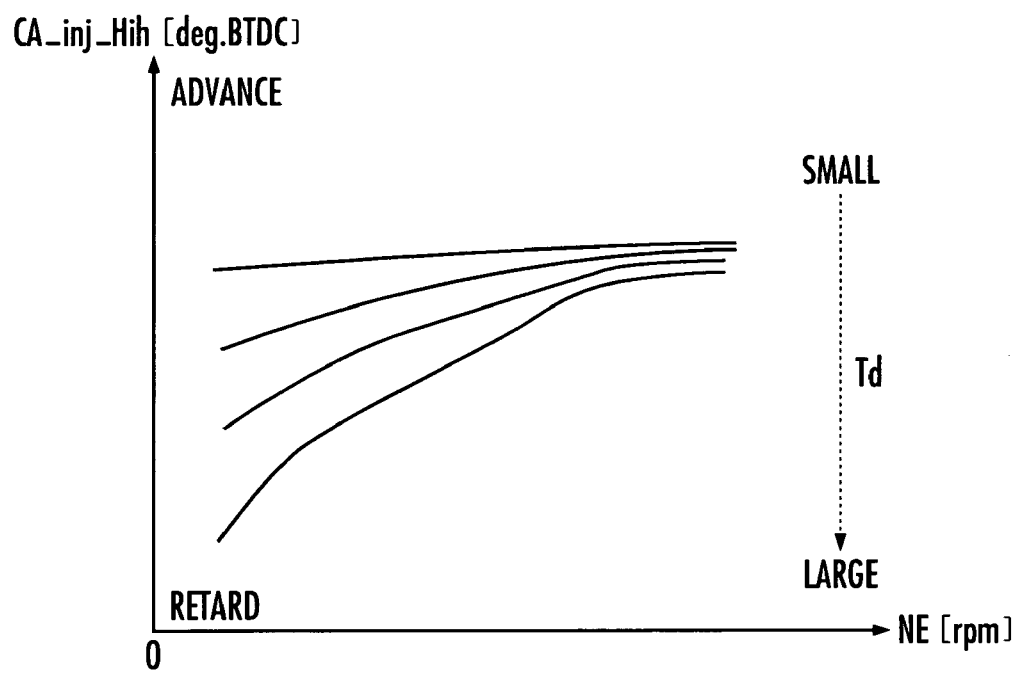
FIG. 16 is a view showing a map to be used in a processing unit 80 shown in FIG. 8.

Similarly to the maps of FIGS. 9 and 10, the map of FIG. 16 and the table of FIG. 17 are experimentally set so that the optimal operation of the internal combustion engine 1 become an optimal operation state, in a normal operation state where the rotational frequency NE and the target torque Td are kept constant. In addition, the map of FIG. 16 and the table of FIG. 17 are examples, and the map and table generally vary depending on the kinds of a low-octane fuel and a high-octane fuel, the specification of the internal combustion engine 1, etc.

These are the specific control processing of the fuel injection timing control processing unit 51.

As described above, in the HCCI control processing unit 41, the fuel injection times Ti_Hih and Ti_Loh, and the fuel injection timings CA_inj_Hih and CA_inj_Loh are determined to be operational amounts which specify the operations of the fuel injectors 17 and 18 for every cylinder 3 in a case where the internal combustion engine 1 is operated in the HCCI mode. In addition, in a case where the internal combustion engine 1 is operated in the HCCI mode, the operation of the ignition plug 30 stops. Thus, it is not necessary to determine the operational amount relating to the operation of the ignition plug 30. Further, in this embodiment, the arithmetic processing of the HCCI control processing unit 41 is executed during the operation of the internal combustion engine 1, regardless of the operation mode. However, when the operation mode is the SI mode, or the second intermediate mode, the arithmetic processing of the HCCI control processing unit 41 may be stopped.

Figure 18:
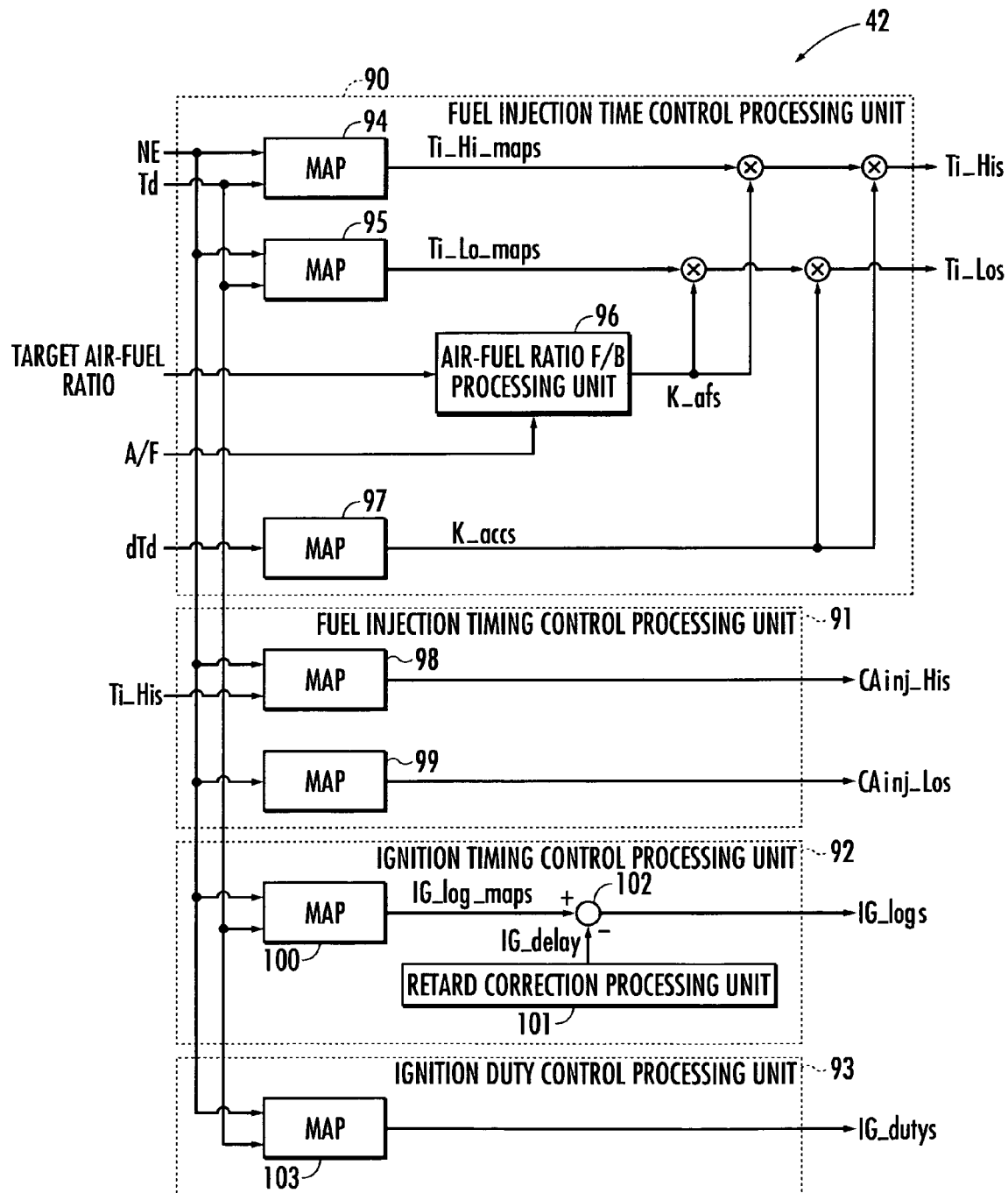
FIG. 18 is a functional block diagram showing a control processing function of an SI control processing unit shown in FIG. 2.

Next, FIG. 18 is a functional block diagram showing the control processing function of the SI control processing unit 42. Referring to this drawing, in this embodiment, the SI control processing unit 42 is constituted by a fuel injection time control processing unit 90 which determines respective fuel injection times Ti_Los and Ti_His of the fuel injector 17 for a low-octane fuel and the fuel injector 18 for a high-octane fuel for every cylinder 3, a fuel injection timing control processing unit 91 which determine respective fuel injection timings CA_inj_Los and CA_inj_His of the fuel injector 17 for a low-octane fuel and the fuel injector 18 for a high-octane fuel for every cylinder 3, an ignition timing control processing unit 92 which determines an ignition timing IG_logs of the ignition plug 30 for every cylinder 3, and an ignition duty control processing unit 93 which determines a duty IG_dutys which specifies the current application amount of the ignition plug 30. In addition, although the above respective processing units 90 to 93 are separately provided for every cylinder 3, only those relating to one arbitrary cylinder 3x are typically shown in FIG. 18, similarly to the HCCI control processing unit 41.

Here, the fuel injection times Ti_Los and Ti_His have a meaning as operational amounts (control inputs) which specify the supply amounts (injection amounts) of two kinds of fuels to the combustion chamber 6 of each cylinder 3 by the fuel injectors 17 and 18 for every cylinder 3 in a case where the operation of the internal combustion engine 1 is performed in the SI mode. Here, the fuel injection timings CA_inj_Los and CA_inj_His (these are timings at a crank angle) have a meaning as operational amounts (control inputs) which specify the supply timings (injection timings) of two kinds of fuels to the combustion chamber 6 of each cylinder 3 by the fuel injectors 17 and 18 for every cylinder 3 in a case where the operation of the internal combustion engine 1 is performed in the SI mode. Further, the ignition timing IG_logs has a meaning as an operational amount (control input) which specifies the ignition timing (generation timing of spark discharge) of the ignition plug 30 for every cylinder 3, in a case where the internal combustion engine 1 is operated in the SI mode. Further, the duty IG_dutys (hereinafter referred to as "ignition duty IG_dutys"), which is a command value of the duty of a pulse signal for applying an electric current to the ignition plug 30 by PWM control, has a meaning as an operational amount (control input) which specifies the current application amount to the ignition plug 30. The operational amount for an SI mode to be determined in SI control processing unit 42 is an operational amount composed of the fuel injection times Ti_Los and Ti_His, the fuel injection timings CA_inj_Los and CA_inj_His, the ignition timing IG_logs, and the ignition duty IG_dutys. In this case, Ti_Los, Ti_His, CA_inj_Los, and CA_inj_His of the operational amounts have a meaning as operational amounts which specify the operations of the fuel injectors 17 and 18 for every cylinder 3. Further, IG_logs and IG_dutys have a meaning as operational amounts which specify the operation of the ignition plug 30 for every cylinder 3.

In addition, the fuel supply amount (injection amount) may be determined instead of the fuel injection times Ti_Los and Ti_His. Further, the fuel injection timings CA_inj_Los and CA_inj_His are not necessarily determined in the dimension of the crank angle, and may be determined in the dimension of a time (time instant).

Additionally, the SI control processing unit 42 has a function as a control processing means for a spark ignition operation mode in the invention.

The control processing of the fuel injection time control processing unit 90 for every cylinder 3 is performed as follows with predetermined timing synchronized with the combustion cycle (two rotations of the crankshaft 8) of the cylinder 3 corresponding to the fuel injection time control processing unit 90.

The fuel injection time control processing unit 90 includes a processing unit 94 which determines a basic injection time Ti_Hi_maps of a high-octane fuel, a processing unit 95 which determines a basic injection time Ti_Lo_maps of a low-octane fuel, and an air-fuel ratio F/B processing unit 96 and an acceleration-and-deceleration correction processing unit 97 which determine a first corrective operational amount K_afs and a second corrective operational amount K_accs for correcting the basic injection time Ti_Hi_maps and Ti_Lo_maps, respectively.

Also, the fuel injection timing control processing unit 90 corrects the basic injection time Ti_Hi_maph of a high-octane fuel and the basic injection time Ti_Lo_maps of a low-octane fuel by the corrective operational amounts K_afs and K_accs, respectively, thereby determining the fuel injection times Ti_His and Ti_Los of a high-octane fuel and a low-octane fuel for every combustion cycle of the cylinder 3x. In this case, in this embodiment, the correction of the basic injection time Ti_Hi_maps of a high-octane fuel is performed by multiplying Ti_Hi_maps by K_afs and K_accs. Similarly, the correction of the basic injection time Ti_Lo_maps of a low-octane fuel is performed by multiplying Ti_Lo_maps by K_afs and K_accs.

In addition, the corrective operational amounts K_afs and K_accs function to increase the fuel injection times Ti_His and Ti_Los of a high-octane fuel and a low-octane fuel by the same ratio from the basic injection times Ti_Hi_maps and Ti_Lo_maps, respectively, when the value thereof is larger than "1." On the contrary, the corrective operational amounts K_afs of and K_accs function to reduce the fuel injection times Ti_His and Ti_Los of a high-octane fuel and a low-octane fuel by the same ratio from the basic injection times Ti_Hi_maps and Ti_Lo_maps, respectively, when the value thereof is smaller than "1." Accordingly, while the corrective operational amounts K_afs of and K_accs function to keep the mutual ratio of a high-octane fuel and a low-octane fuel to be supplied to the combustion chamber 6 of the cylinder 3x, at a ratio specified by the basic injection times Ti_Hi_maps and Ti_Lo_maps, they function to increase and decrease the total of the supply amounts of both the fuels.

Hereinafter, the processing of the processing units 94 to 97 will be concretely explained. First, the basic injection times Ti_Hi_maps and Ti_Lo_maps which are determined in the processing units 94 and 95, respectively, are basic operational amounts which specify the supply amounts (injection amounts) of fuels to the cylinder 3x in a normal operation state (normal operation state in the SI mode) where the operation state of the internal combustion engine 1 is kept constant. In this embodiment, the basic injection times Ti_Hi_maps and Ti_Lo_maps are feed-forward operational amounts that are obtained by the maps set in advance from the rotational frequency NE and the intake pressure PBA representing the operation state of the internal combustion engine 1 at the time of the operation of the internal combustion engine 1 in the SI mode.

Figure 19:
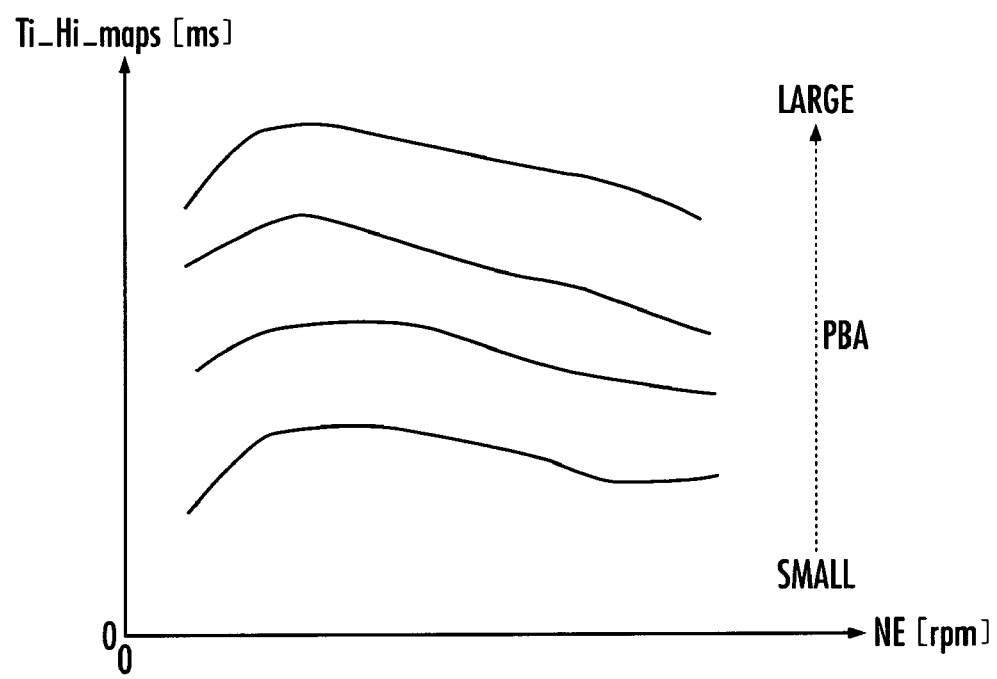
FIG. 19 is a view showing a map to be used in a processing unit 94 shown in FIG. 18.
Figure 20:
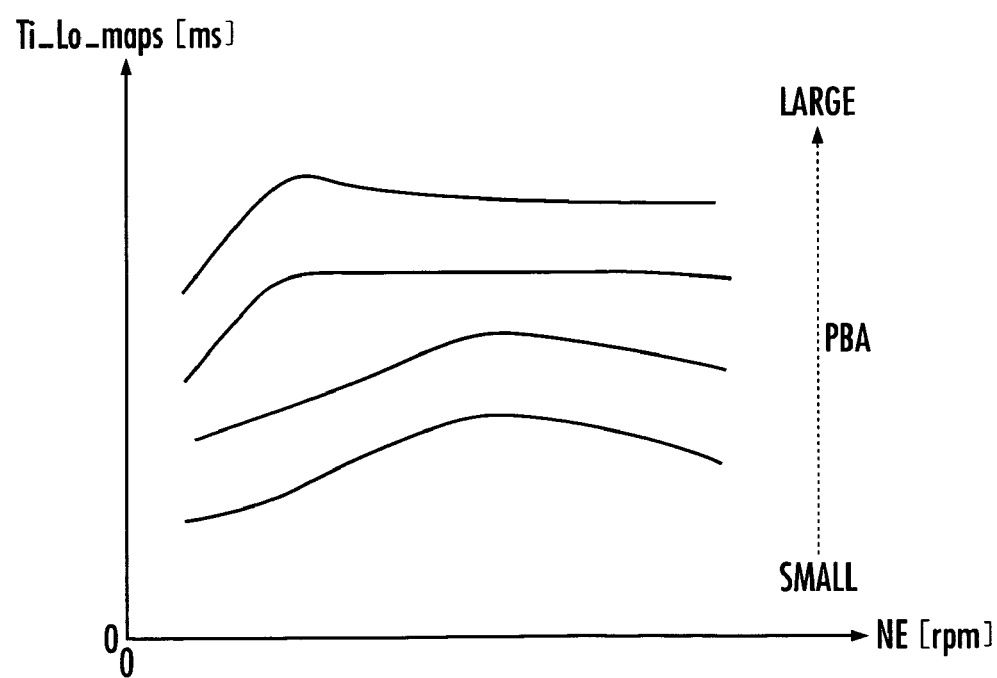
FIG. 20 is a view showing a map to be used in a processing unit 95 shown in FIG. 18.

More specifically, the detection value (latest value) of the rotational frequency NE of the internal combustion engine 1 and the detection value (latest value) of the intake pressure PBA by the intake pressure sensor 20 are input to the processing units 94 and 95, respectively. Also, the processing units 94 and 95 uses the input rotational frequency NE and intake pressure PBA as indexes showing the operation state of the internal combustion engine 1, and determine the basic injection times Ti_Hi_maps and Ti_Lo_maps, respectively, on the basis of the maps set in advance as shown in FIGS. 19 and 20, from them. These maps are those which are experimentally set so that the operation state of the internal combustion engine 1 becomes an optimal operation state, in a normal operation state where the rotational frequency NE and the intake pressure PBA are kept constant. In this embodiment, these maps are the same in all the cylinders 3. However, these maps may be separately provided for every cylinder 3. In addition, the maps of FIGS. 19 and 20 are examples, and those maps generally vary depending on the kinds of a low-octane fuel and a high-octane fuel, the specification of the internal combustion engine 1, etc.

Additionally, the ratio of the supply amount of a high-octane fuel to the supply amount of a low-octane fuel which is specified by Ti_Hi maps and Ti_Lo maps determined by the maps of FIGS. 19 and 20, respectively, becomes a larger ratio than the ratio of the supply amount of a high-octane fuel to the supply amount of a low-octane fuel which is specified by Ti_Hi_maph and Ti_Lo_maph determined by the maps of FIGS. 9 and 10. In other words, the ignition performance of a composite fuel specified by Ti_Hi_maps and Ti_Lo_maps becomes lower than the ignition performance of the composite fuel specified by Ti_Hi_maph and Ti_Lo_maph.

The first corrective operational amount K_afs which is determined in the air-fuel ratio F/B processing unit 96 is a feedback operational amount for adjusting the total (the total amount of a composite fuel combusted in the combustion chamber 6 of the cylinder 3x) of the supply amounts of a high-octane fuel and a low-octane fuel to the cylinder 3x so that the air-fuel ratio A/F detected by the air-fuel ratio sensor 31 is made to coincide with a required target value. In this case, the detection value (latest value) of an air-fuel ratio A/F which is represented by the output of the air-fuel ratio sensor 31, and a target air-fuel ratio are input to the air-fuel ratio F/B processing unit 96. The target air-fuel ratio is an air-fuel ratio near a theoretical air-fuel ratio. Also, the air-fuel ratio F/B processing unit 96 determines the air-fuel ratio operational amount K_afs by the deviation between the detection value of the air-fuel ratio A/F and the target air-fuel ratio which are input so as to bring the deviation close to "0" by feedback control processing. The feedback control processing has only need to be performed by a well-known air-fuel ratio control technique in an internal combustion engine using a spark ignition method.

The second corrective operational amount K_accs which is determined in the acceleration-and-deceleration correction processing unit 97 adjusts the total (total amount of a composite fuel) of the supply amounts of a high-octane fuel and a low-octane fuel to the cylinder 3x in order to prevent the change of an actual output torque from being delayed with respect to a request according to the operational amount of an accelerator pedal in a transient operation state where the output torque of the internal combustion engine 1 fluctuates.

In this embodiment, the estimated torque variation dTd described above in the description of the acceleration-and-deceleration processing unit 56 of the HCCI control processing unit 41 is input to the acceleration-and-deceleration correction processing unit 97. The estimated torque variation dTd is calculated from a current value and a past value of the target torque Td, similarly to the processing of the acceleration-and-deceleration correction processing unit 56 of the HCCI control processing unit 41.

Figure 21:
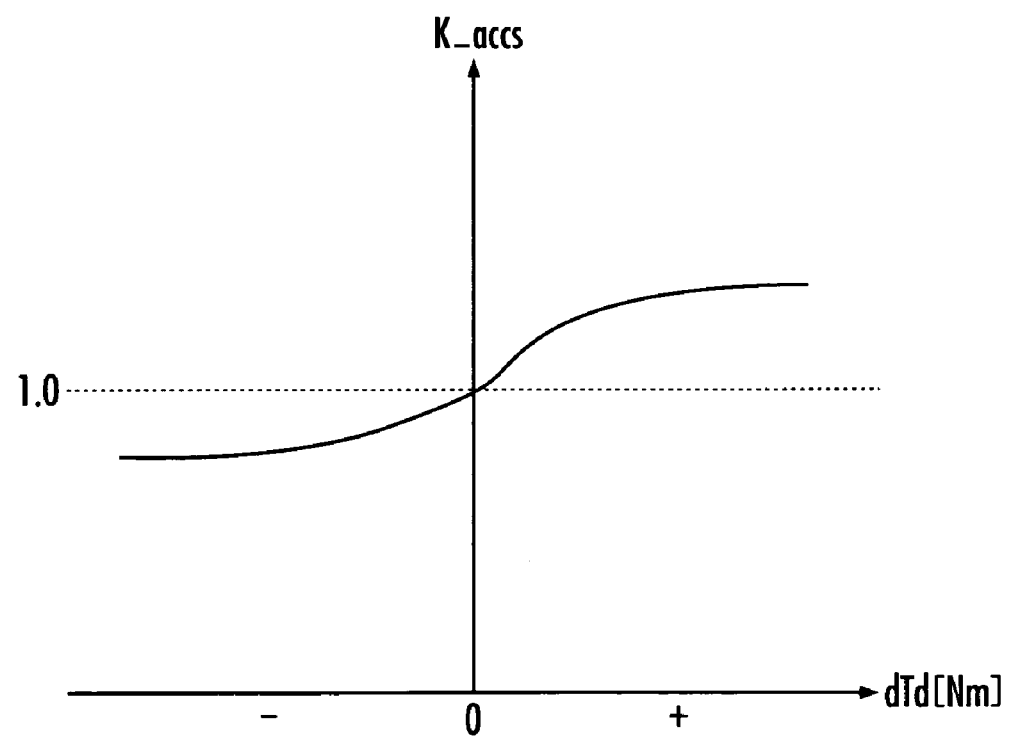
FIG. 21 is a view showing a map to be used in an acceleration-and-deceleration correction processing unit 97 shown in FIG. 18.

Also, the acceleration-and-deceleration correction processing unit 97 determines the second corrective operational amount K_accs on the basis of a table set in advance as illustrated in FIG. 21, from the input estimated torque variation dTd. The second corrective operational amount K_accs determined by this table is determined to be a value larger than "1" in the case of dTd>0, and is determined to be a value smaller than "1" in the case of dTd<0. Accordingly, in a situation where the target torque Td of the internal combustion engine 1 increases, the second corrective operational amount K_accs is determined so as to further increase the supply amounts of a high-octane fuel and a low-octane fuel to the cylinder 3x. Further, in a situation where the target torque Td of the internal combustion engine 1 decreases, the second corrective operational amount K_accs is determined so as to further reduce the supply amounts of a high-octane fuel and a low-octane fuel to the cylinder 3x.

These are the details of the control processing of the fuel injection time control processing unit 90.

Next, the control processing of the fuel injection timing control processing unit 91 will be explained with reference to FIG. 18. The control processing is performed as follows in synchronization with the combustion cycle of the cylinder 3x (every two rotations of the crankshaft 8). The fuel injection timing control processing unit 91 is composed of a processing unit 98 which determines a fuel injection timing CA_inj_His relating to the fuel injector 18 for a high-octane fuel, and a processing unit 99 which determines a fuel injection timing CA_inj_Los relating to the fuel injector 17 for a low-octane fuel.

In this case, CA_inj_His which is determined in the processing unit 98 is a feed-forward operational amount, and the detection value (latest value) of the rotational frequency NE of the internal combustion engine 1 is input to the processing unit 98 as an index showing the operation state of the internal combustion engine 1, and the fuel injection time Ti_His (latest value) of a high-octane fuel which is determined in the fuel injection timing control processing unit 90 is input to the processing unit. Also, the processing unit 98 determines CA_inj_His from the input NE and Ti_His on the basis of a map set in advance as shown in FIG. 22.

Figure 23:
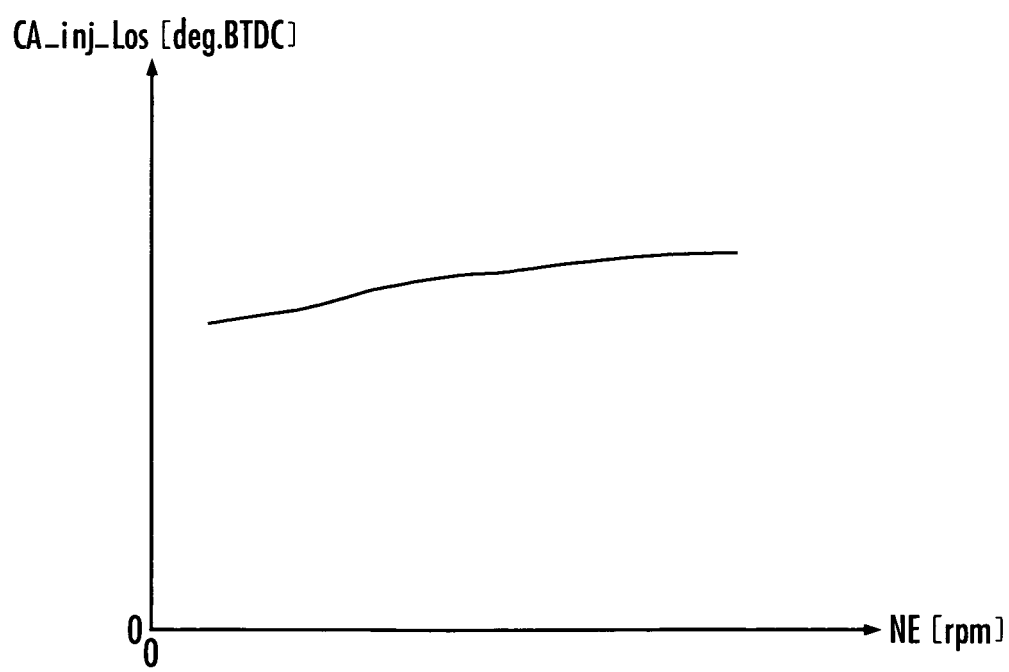
FIG. 23 is a view showing a table to be used in a processing unit 99 shown in FIG. 18.

Further, CA_inj_Los determined in the processing unit 99 is also a feed-forward operational amount, and the detection value (latest value) of the rotational frequency NE of the internal combustion engine 1 is input to the processing unit 99 as an index showing the operation state of the internal combustion engine 1. Also, the processing unit 99 determines CA_inj_Los from the input NE on the basis of a table set in advance as shown in FIG. 23. In this case, in this embodiment, the fuel injector 17 for a low-octane fuel is of a port-injection-type. Thus, CA_inj_Los is determined according to the rotational frequency NE only.

Figure 22:
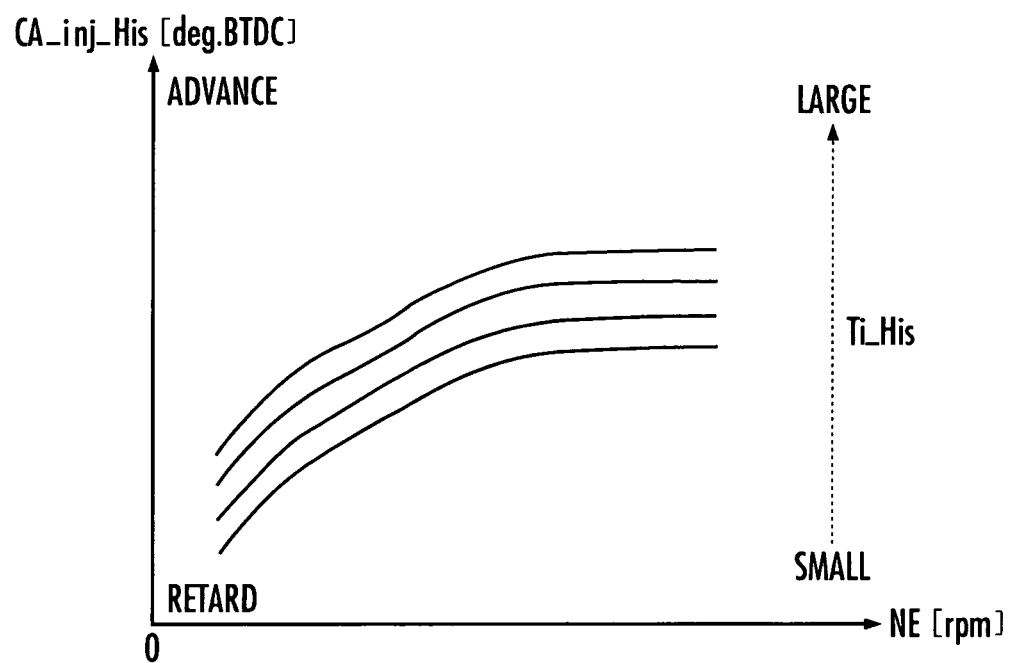
FIG. 22 is a view showing a map to be used in a processing unit 98 shown in FIG. 18.

Similarly to the maps of FIGS. 19 and 20, the map of FIG. 22 and the table of FIG. 23 are experimentally set so that the optimal operation of the internal combustion engine 1 become an optimal operation state, in a normal operation state (normal operation state in the SI mode) where the rotational frequency NE and the intake pressure PBA are kept constant. In addition, the map of FIG. 22 and the table of FIG. 23 are examples, and the map and table generally vary depending on the kinds of a low-octane fuel and a high-octane fuel, the specification of the internal combustion engine 1, etc.

These are the specific control processing of the fuel injection timing control processing unit 91.

Next, the control processing of the ignition timing control processing unit 92 will be explained. The control processing of the ignition timing control processing unit 92 corresponding to the cylinder 3x is performed as follows with predetermined timing synchronized with the combustion cycle (two rotations of the crankshaft 8) of the cylinder 3x.

As shown in FIG. 18, the ignition timing control processing unit 92 includes a processing unit 100 which determines the basic ignition timing IG_log_maps of the ignition plug 30 corresponding to the cylinder 3x, and a retard correction processing unit 101 which determines a corrective operational amount IG_delay which corrects the basic ignition timing IG_log_maps in a retard direction, and corrects the basic ignition timing IG_log_maps by the arithmetic unit 102 from the corrective operational amount IG_delay (subtracts IG_delay (>0) from IG_log_maps), thereby determining the ignition timing IG_logs. In addition, here, the advance direction of the ignition timing is defined as a positive direction.

In this case, the basic ignition timing IG_log_maps which is determined in the processing unit 100 is a feed-forward operational amount, and the detection value (latest value) of the rotational frequency NE of the internal combustion engine 1 and the detection value (latest value) of the intake pressure PBA are input to the processing unit 100 as indexes showing the operation state of the internal combustion engine 1. Also, the processing unit 100 determines CA_inj_Hih from the input NE and PBA on the basis of a map set in advance as shown in FIG. 24.

Figure 24:
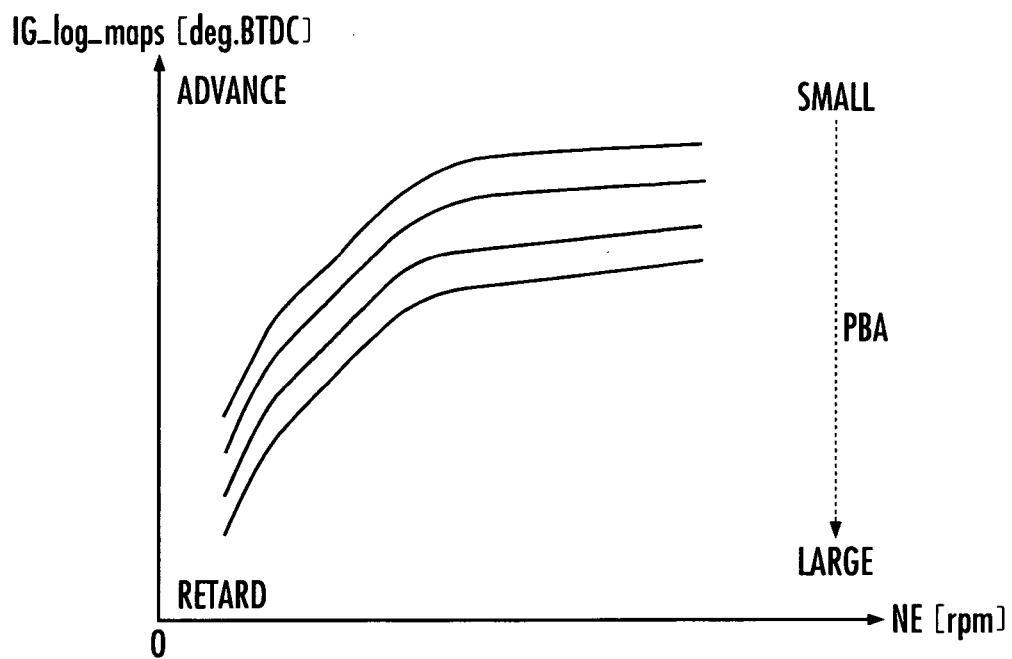
FIG. 24 is a view showing a map to be used in a processing unit 100 shown in FIG. 18.

The map shown in FIG. 24 is one which is experimentally set so that the operation state of the internal combustion engine 1 becomes an optimal operation state, in a normal operation state (normal operation state in the SI mode) where the rotational frequency NE and the intake pressure PBA are kept constant. In this embodiment, this map is the same in all the cylinders 3. However, the map may be separately provided for every cylinder 3. In addition, the map of FIG. 24 is an example, and this map generally varies depending on the kinds of a low-octane fuel and a high-octane fuel, the specification of the internal combustion engine 1, etc.

Further, the corrective operational amount IG_delay which is determined in the retard correction processing unit 101 corrects the ignition timing IG_logs, which is finally determined, so as to be nearer to the retard side than the basic ignition timing IG_log_maps, in a predetermined period ranging from immediately after switching from the HCCI mode to the first intermediate mode to the initial stage of the SI mode, when the operation mode of the internal combustion engine 1 shifts from the HCCI mode via the first intermediate mode to the SI mode.

Here, in a case where the operation mode shifts from the HCCI mode via the first intermediate mode to the SI mode, the air-fuel ratio of an air-fuel mixture within the combustion chamber 6 of the cylinder 3x tends to be biased nearer to the rich side than a theoretical air-fuel ratio immediately after the operation mode is switched to the SI mode, due to an influence which is exerted as a low-octane fuel injected into the intake port 10 of the cylinder 3x from the fuel supply system 17 during the operation of the internal combustion engine 1 in the HCCI mode adheres to the surface of a wall of the intake port 10. For this reason, if the ignition of the fuel of an air-fuel mixture by the ignition plug 30 is performed according to the basic ignition timing IG_log_maps immediately after the operation mode is switched to the SI mode, the output torque of the internal combustion engine 1 becomes excessively larger than the target torque Td. Thus, there is a possibility that the output torque may fluctuate.

Thus, in this embodiment, by correcting the ignition timing IG_logs so as to be nearer to the retard side than the basic ignition timing IG_log_maps by the corrective operational amount IG_delay, in a predetermined period ranging from immediately after switching from the HCCI mode to the first intermediate mode to the initial stage of the SI mode, the output torque of the internal combustion engine 1 generated by the combustion of the fuel (composite fuel) in the combustion chamber 6 of the cylinder 3x is controlled in a decreasing direction.

Figure 26:
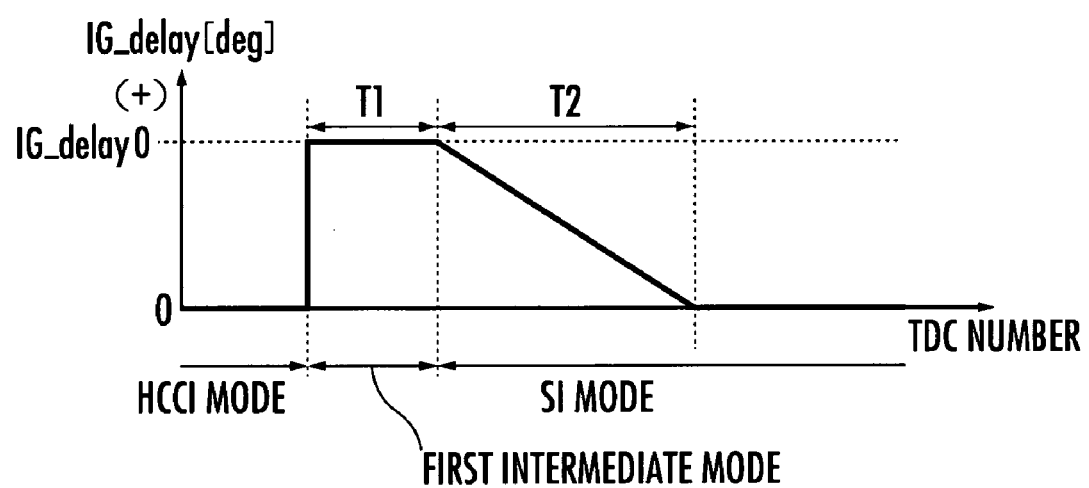
FIG. 26 is a graph showing a method of determining a corrective operational amount by a retard correction processing unit 101 shown in FIG. 18.

FIG. 26 is a graph showing a method of determining the corrective operational amount IG_delay by the retard correction processing unit 101. In addition, a TDC number on the abscissa axis of the graph of FIG. 26 is a number counted by the crank angle where any one cylinder 3 of the internal combustion engines 1 becomes TDC, and is proportional to the number of combustion cycles of each cylinder 3 (since the number of cylinders of the internal combustion engine 1 is four in this embodiment, the TDC number becomes four times the number of combustion cycles).

As shown in this drawing, in this embodiment, the corrective operational amount IG_delay is determined to be a predetermined value IG_delay0 (>0) with the timing (combustion cycle which is switched from the HCCI mode to the first intermediate mode) which is switched from the HCCI mode to the first intermediate mode. Also, IG_delay is kept at IG_delay0 in a period T1 in the first intermediate mode. Moreover, IG_delay is determined for every combustion cycle of the cylinder 3x so as to approach "0" gradually from IG_delay0, in a predetermined time or the period of a predetermined TDC number T2 (hereinafter referred to as "SI initial correction period T2"), from the timing (combustion cycle which is switched from the first intermediate mode to the SI mode) which is switched from the first intermediate mode to the SI mode. Also, the corrective operational amount IG_delay is held after the lapse of the SI initial correction period T2 "0."

In addition, although the SI initial correction period T2 may be a specified time or the period of a specified number of combustion cycles, it may be set according to the cylinder inside temperature of the cylinder $3x$, etc. Further, although the predetermined value IG_delay0 is a fixed value, it may be set according to the cylinder inside temperature of the cylinder $3x$, etc.

By determining the corrective operational amount IG_delay as described above, the ignition timing IG_logs is corrected so as to be nearer to the retard side than the basic ignition timing IG_log_maps, in the period T1 in the first intermediate mode, and the SI initial correction period T2 immediately after switching to SI mode, at the time of shifting from the HCCI mode to the SI mode. Further, the basic ignition timing IG_log_maps is determined to be the ignition timing IG_logs as it is after the lapse of the SI initial correction period T2.

These are the specific control processing of the ignition timing control processing unit 92.

Additionally, the ignition timing control processing unit 92 has a function as an ignition timing control means for a spark ignition operation mode in the invention. Here, in this embodiment, in a case where the operation mode of the internal combustion engine 1 is the SI mode, the ignition timing IG_logs (=IG_log_maps) that is finally determined by the ignition timing control processing unit 92 in a situation where the corrective operational amount IG_delay is set to "0", that is, at the time of the operation of the internal combustion engine 1 in the SI mode other than the SI initial correction period T2, corresponds to a normal ignition timing operational amount in the invention. That is, the basic ignition timing IG_log_maps which is determined in the processing unit 100 corresponds to a normal ignition timing operational amount. Accordingly, a second predetermined control rule in the invention is configured by the processing of the processing unit 100.

Further, the SI initial correction period T2 corresponds to a second predetermined period in the invention. Also, the ignition timing IG_logs (=IG_log_maps–IG_delay) which is finally determined by the ignition timing control processing unit 92 corresponds to a correction ignition timing operational amount in the invention, at the time of the operation of the internal combustion engine 1 in the SI mode in the second predetermined period. Accordingly, it can be said that the correction ignition timing operational amount is a amount which is determined by correcting the normal ignition timing operational amount which is the basic ignition timing IG_log_maps determined by the processing unit 100 by the corrective operational amount IG_delay determined in the retard correction processing unit 101.

Next, the ignition duty control processing unit 93 will be explained. The control processing of the ignition timing control processing unit 92 corresponding to the cylinder $3x$ is performed as follows with predetermined timing synchronized with the combustion cycle (two rotations of the crankshaft 8) of the cylinder $3x$.

The ignition duty control processing unit 93 is constituted by the processing unit 103 as shown in FIG. 8, and the ignition duty IG_dutys is determined by the processing unit 103. In this case, ignition duty IG_dutys is a feed-forward operational amount, and the detection value (latest value) of the rotational frequency NE of the internal combustion engine 1 and the detection value (latest value) of the intake pressure PBA are input to the processing unit 103 as indexes showing the operation state of the internal combustion engine 1. Also, the processing unit 103 determines IG_dutys from the input NE and PBA on the basis of a map set in advance as shown in FIG. 25.

Figure 25:
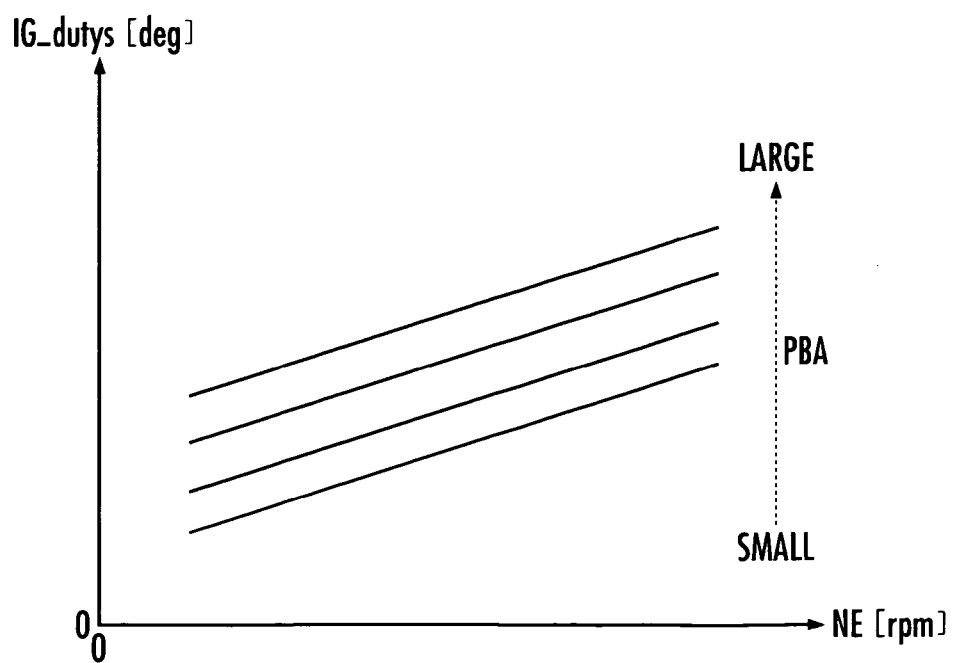
FIG. 25 is a view showing a map to be used in a processing unit 103 shown in FIG. 18.

The map shown in FIG. 25 is one which is experimentally set so that the operation state of the internal combustion engine 1 becomes an optimal operation state, in a normal operation state (normal operation state in the SI mode) where the rotational frequency NE and the intake pressure PBA are kept constant. In this embodiment, this map is the same in all the cylinders 3. However, the map may be separately provided for every cylinder 3. In addition, the map of FIG. 25 is an example, and this map generally varies depending on the kinds of a low-octane fuel and a high-octane fuel, the specification of the internal combustion engine 1, etc.

These are the specific control processing of the ignition duty control processing unit 93.

As described above, in the SI control processing unit 42, the fuel injection times Ti_His and Ti_Los, and the fuel injection timings CA_inj_His and CA_inj_Los are determined as operational amounts which specify the operations of the fuel injectors 17 and 18 for every cylinder 3 in a case where the internal combustion engine 1 is operated in the SI mode. Further, the ignition timing IG_logs and the ignition duty IG_dutys are determined as operational amounts which specify the operation of the ignition plug 30 for every cylinder 3. In addition, in this embodiment, the arithmetic processing of the SI control processing unit 42 is executed during the operation of the internal combustion engine 1, regardless of the operation mode. However, when the operation mode is the HCCI mode, the arithmetic processing of the SI control processing unit 42 may be stopped.

Next, the control processing of the output determination processing unit 43 will be explained.

When the operation mode is the HCCI mode, the output determination processing unit 43, the fuel injection times Ti_Hih and Ti_Loh and the fuel injection timings CA_inj_Hih and CA_inj_Loh which are determined by the HCCI control processing unit 41 as mentioned above are determined as controlling operational amounts which specify the actual operations of the fuel injectors 17 and 18 for every cylinder 3 as they are. Also, the operations of the fuel injectors 17 and 18 are controlled according to the controlling operational amounts. Thereby, the operation of the internal combustion engine 1 in the HCCI mode is performed.

Further, when the operation mode is the SI mode, the output determination processing unit 43 determines the fuel injection times Ti_His and Ti_Los and the fuel injection timings CA_inj_His and CA_inj_Los for every cylinder 3 determined as mentioned above by the SI control processing unit 42, as controlling operational amounts which specify the actual operations of the fuel injectors 17 and 18 for every cylinder 3 as they are. Also, the operations of the fuel injectors 17 and 18 are controlled according to the controlling operational amounts. Moreover, the output determination processing unit 43 determines the ignition timing IG_losg and the ignition duty IG_dutys for every cylinder 3 which are determined as mentioned above by the SI control processing unit 42, as controlling operational amounts which specifies the operation of the ignition plug 30 for every cylinder 3 as it is. Also, the ignition plug 30 is controlled according to the controlling operational amounts. Thereby, the operation of the internal combustion engine 1 in the SI mode is performed.

Meanwhile, the output determination processing unit 43 determines the fuel injection times Ti_Lo and Ti_Hi and the fuel injection timings CA_inj_Lo and CA_inj_Hi as controlling operational amounts which specify the actual operations of the fuel injectors 17 and 18 for every cylinder 3, according to the following Expressions (1) to (4), in the first intermediate mode in case where the operation mode shifts from the HCCI mode to the SI mode. In addition, Ti_Lo and CA_inj_Lo are controlling operational amounts which specify the operation of the fuel injector 17 for a low-octane fuel, and Ti_Hi and CA_inj_Hi are controlling operational amounts which specify the operation of the fuel injector 18 for a high-octane fuel. Further, in this first intermediate mode, the output determination processing unit 43 determines the ignition timing IG_log and the ignition duty IG_duty as controlling operational amounts which specifies the operation of the ignition plug 30 for every cylinder 3 according to the following Expressions (5) and (6).

$$Ti\_Lo = Ti\_Los + (Ti\_Loh(0) - Ti\_Los) * K\_Lo\_HS \quad (1)$$

$$Ti\_Hi = Ti\_His + (Ti\_Hih(0) - Ti\_His) * K\_Hi\_HS \quad (2)$$

$$CA\_inj\_Lo = CA\_inj\_Los \quad (3)$$

$$CA\_inj\_Hi = CA\_inj\_His \quad (4)$$

$$IG\_log = IG\_logs + IG\_add\_HS \quad (5)$$

$$IG\_duty = IG\_dutys \quad (6)$$

Here, Ti_Loh (0) in Expression (1) is the fuel injection time Ti_Loh for a low-octane fuel which is determined by the HCCI control processing unit 41 with the timing of switching from the HCCI mode to the first intermediate mode or immediately before the timing. Also, K_Lo_HS is a coefficient which specifies a change pattern of Ti_Lo in the first intermediate mode.

Similarly, Ti_Hih (0) in Expression (2) is the fuel injection time Ti_Hih for a high-octane fuel which is determined by the HCCI control processing unit 41 with the timing of switching from the HCCI mode to the first intermediate mode or immediately before the timing. Also, K_Hi_HS is a coefficient which specifies a change pattern of Ti_Hi in the first intermediate mode.

Further, IG_add_HS in Expression (5) is an ignition timing adjustment amount which specifies a change pattern of the ignition timing IG_log in the first intermediate mode.

As clear from the above Expressions (3), (4), and (6), in this embodiment, the fuel injection timings CA_inj_Lo and CA_inj_Hi which are controlling operational amounts which specify the fuel injection timings of individual kinds of fuels in the first intermediate mode are determined to be the fuel injection timings CA_inj_Los and CA_inj_His which are determined by the SI control processing unit 42, i.e., to be the fuel injection timings which are suitable for the operation of the internal combustion engine 1 in the SI mode which is an operation mode following the first intermediate mode. Further, the ignition duty IG_duty is determined to be the ignition duty IG_dutys determined by the SI control processing unit 42.

On the other hand, the fuel injection times Ti_Lo and Ti_Hi which are determined by Expressions (2) and (3), respectively, are determined so as to follow the fuel injection times Ti_Los and Ti_His which are determined for every combustion cycle of each cylinder 3 by the SI control processing unit 42 in the first intermediate mode (and finally so as to coincide with Ti_Los and Ti_His, respectively) in a change pattern (this corresponds to a first pattern in the invention) according to the values of the coefficients K_Lo_HS and K_Hi_HS. Further, the ignition timing IG_log which is determined by Expression (5) is determined so as to change with respect to the ignition timing IG_logs determined by the SI control processing unit 42 in the first intermediate mode, and finally so as to coincide with IG_logs, in a change pattern according to the value of the ignition timing adjustment amount IG_add_HS.

Figure 27:
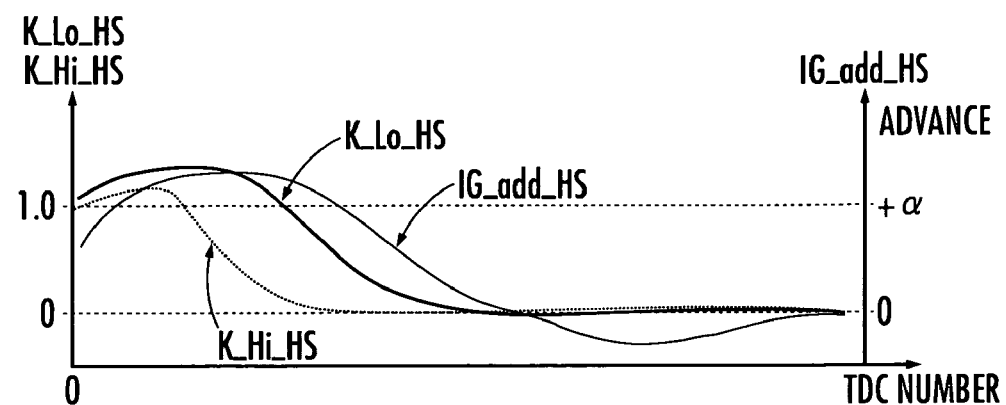
FIG. 27 is a view showing a table to be used in an output determination processing unit 43 of FIG. 2.

In this embodiment, the output determination processing unit 43 sequentially determines the coefficients K_Lo_HS and K_Hi_HS and the ignition timing adjustment amount IG_add_HS according to a TDC number counted from the start of the first intermediate mode, in a pattern as shown in the table of FIG. 27. Also, the output determination processing unit 43 performs the operation of Expressions (1), (2), and (5) using the determined coefficients K_Lo_HS and K_Hi_HS and the ignition timing adjustment amount IG_add_HS, thereby determining Ti_Lo, Ti_Hi, and IG_log, respectively.

In this case, in the first intermediate mode, the intake air amount (air supply amount) to the combustion chamber 6 of each cylinder 3 decreases gradually by the control processing of the throttle-valve control processing unit 44 mentioned above. Also, in the table of FIG. 27, K_Lo_HS and K_Hi_HS are set so that the air-fuel ratio of an air-fuel mixture within the combustion chamber 6 according to the decreasing form of the intake air amount to the combustion chamber 6, and the supply amounts of a low-octane fuel and a high-octane fuel to the combustion chamber 6 of each cylinder 3 specified by Ti_Lo and Ti_Hi determined by Expressions (1) and (2), respectively, becomes rich gradually, during the operation of the internal combustion engine 1 in the first intermediate mode. Simultaneously, in the table of FIG. 27, K_Lo_HS and K_Hi_HS are set so that the ratio (the ratio of the supply amount of a high-octane fuel to the total of the supply amounts of the fuels) of the supply amount of a high-octane fuel to the supply amount of a low-octane fuel, which is specified by Ti_Lo and Ti_Hi determined by Expressions (1) and (2), respectively, becomes high gradually, during the operation of the internal combustion engine 1 in the first intermediate mode.

In an example shown in FIG. 27, K_Lo_HS and K_Hi_HS first increase from a positive initial value near "1" to a larger value than "1" after the start of the first intermediate mode, then approach "0", and are finally kept at "0." Further, K_Hi_HS approaches "0" earlier than K_Lo_HS.

Further, in the table of FIG. 27, the ignition timing adjustment amount IG_add_HS is set so that the ignition timing IG_log determined by Expression (5) becomes an ignition timing suitable for the air-fuel ratio of an air-fuel mixture within the combustion chamber 6 of each cylinder 3, during the operation of the internal combustion engine 1 in the first intermediate mode. In the illustrated example, IG_add_Hs first changes in the advance direction (forward direction) from the initial value (positive value) on the advance side after the start of the first intermediate mode, and then, gradually changes to a value (negative value) nearer to the retard side than "0." Thereafter, IG_add_Hs changes again in the advance direction (positive direction), approaches "0," and is finally kept at "0."

These coefficients K_Lo_HS and K_Hi_HS, and the ignition timing adjustment amount IG_add_HS are experimentally set so that the air-fuel ratio of an air-fuel mixture to be charged into the combustion chamber 6, the ignition performance of a composite fuel, etc. are smoothly shifted from a state suitable for the operation of the internal combustion engine 1 in the HCCI mode to a state suitable for the operation of the internal combustion engine 1 in the SI mode, while combustion of a composite fuel in the combustion chamber 6 of each cylinder 3 is properly performed at the time of the operation of the internal combustion engine 1 in the first intermediate mode.

In the first intermediate mode, the output determination processing unit 43 adopts the fuel injection timings Ti_Hi and Ti_Lo and the fuel injection timings CA_inj_Hi and CA_inj_Lo for every cylinder 3, which are determined as described above, as controlling operational amounts which specify the actual operations of the fuel injectors 17 and 18, and controls the operations of the fuel injectors 17 and 18 according to the controlling operational amounts.

Further, the output determination processing unit 43 adopts the ignition timing IG_log and the ignition duty IG_duty for every cylinder 3, which are determined described above, as controlling operational amounts which specify the actual operation of the ignition plug 30, and controls the operation of the ignition plug 30 according to the controlling operational amounts. Further, the output determination processing unit 43 determines the fuel injection times Ti_Lo and Ti_Hi and the fuel injection timings CA_inj_Lo and CA_inj_Hi by following Expressions (11) to (14), in the second intermediate mode in a case where the operation mode shifts from the SI mode to the HCCI mode. Further, in the second intermediate mode, the output determination processing unit 43 determines the ignition timing IG_log and the ignition duty IG_duty by the following Expressions (15) and (16).

$$Ti\_Lo = Ti\_Loh + (Ti\_Los(0) - Ti\_Loh) * K\_Lo\_SH \quad (11)$$

$$Ti\_Hi = Ti\_Hih + (Ti\_His(0) - Ti\_Hih) * K\_Hi\_SH \quad (12)$$

$$CA\_inj\_Lo = CA\_inj\_Loh \quad (13)$$

$$CA\_inj\_Hi = CA\_inj\_Hih \quad (14)$$

$$IG\_log = IG\_logs + IG\_add\_SH \quad (15)$$

$$IG\_duty = IG\_dutys \quad (16)$$

Here, Ti_Los (0) in Expression (11) is the fuel injection time Ti_Los for a low-octane fuel which is determined by the SI control processing unit 42 with the timing of switching from the SI mode to the second intermediate mode or immediately before the timing. Also, K_Lo_SH is a coefficient which specifies a change pattern of Ti_Lo in the second intermediate mode.

Similarly, Ti_His (0) in Expression (12) is the fuel injection time Ti_His for a high-octane fuel which is determined by the SI control processing unit 42 with the timing of switching from the SI mode to the second intermediate mode or immediately before the timing. Also, K_Hi_SH is a coefficient which specifies a change pattern of Ti_Lo in the second intermediate mode.

Further, IG_add_SH in Expression (15) is an ignition timing adjustment amount which specifies a change pattern of the ignition timing IG_log in the second intermediate mode.

As clear from the above Expressions (13), (14), and (16), in this embodiment, the fuel injection timings CA_inj_Lo and CA_inj_Hi which are controlling operational amounts which specify the fuel injection timings of individual kinds of fuels in the first intermediate mode are determined to be the fuel injection timings CA_inj_Loh and CA_inj_Hih which are determined by the HCCI control processing unit 41, i.e., to be the fuel injection timings which are suitable for the operation of the internal combustion engine 1 in the HCCI mode which is an operation mode after the completion of the second intermediate mode. Further, the ignition duty IG_duty is determined to be the ignition duty IG_dutys determined by the SI control processing unit 42.

On the other hand, the fuel injection times Ti_Lo and Ti_Hi which are determined by Expressions (12) and (13), respectively, are determined so as to follow the fuel injection times Ti_Loh and Ti_Hih which are determined for every combustion cycle of each cylinder 3 by the HCCI control processing unit 41 in the second intermediate mode (and finally so as to coincide with Ti_Loh and Ti_Hih, respectively) in a change pattern (this corresponds to a second pattern in the invention) according to the values of the coefficients K_Lo_SH and K_Hi_SH. Further, the ignition timing IG_log which is determined by Expression (15) is determined so as to change with respect to the ignition timing IG_logs determined by the SI control processing unit 42 in the second intermediate mode, and finally so as to coincide with IG_logs, in a change pattern according to the value of the ignition timing adjustment amount IG_add_SH.

Figure 28:
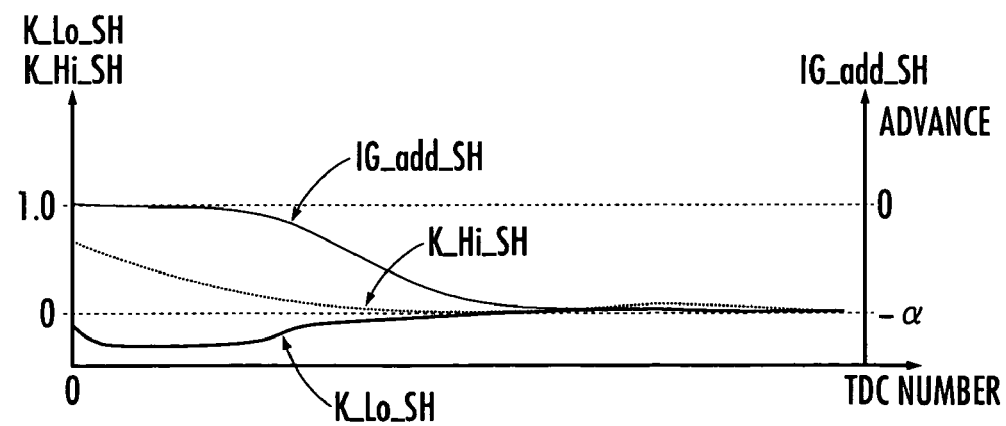
FIG. 28 is a view showing a table to be used in the output determination processing unit 43 of FIG. 2.

In this embodiment, the output determination processing unit 43 sequentially determines the coefficients K_Lo_SH and K_Hi_SH and the ignition timing adjustment amount IG_add_SH according to a TDC number counted from the start of the second intermediate mode, in a pattern as shown in the table of FIG. 28. Also, the output determination processing unit 43 performs the operation of Expressions (11), (12), and (15) using the determined coefficients K_Lo_SH and K_Hi_SH and the ignition timing adjustment amount IG_add_SH, thereby determining Ti_Lo, Ti_Hi, and IG_log, respectively.

In this case, in the second intermediate mode, the intake air amount (air supply amount) to the combustion chamber 6 of each cylinder 3 increases gradually by the control processing of the throttle-valve control processing unit 44 mentioned above. Also, in the table of FIG. 28, K_Lo_SH and K_Hi_SH are set so that the air-fuel ratio of an air-fuel mixture within the combustion chamber 6 according to the increasing form of the intake air amount to the combustion chamber 6, and the supply amounts of a low-octane fuel and a high-octane fuel to the combustion chamber 6 of each cylinder 3 specified by Ti_Lo and Ti_Hi determined by Expressions (11) and (12), respectively, becomes lean gradually, during the operation of the internal combustion engine 1 in the second intermediate mode. Simultaneously, in the table of FIG. 28, K_Lo_SH and K_Hi_SH are set so that the ratio (the ratio of the supply amount of a low-octane fuel to the total of the supply amounts of the fuels) of the supply amount of a high-octane fuel to the supply amount of a low-octane fuel specified by Ti_Lo and Ti_Hi determined by Expressions (11) and (12), respectively, becomes high gradually, during the operation of the internal combustion engine 1 in the second intermediate mode.

In an example shown in FIG. 28, K_Lo_SH first increases in a negative direction from a negative value after the start of the first intermediate mode, then approaches "0", and is finally kept at "0."

Further, K_Lo_SH first increases in a negative direction from a positive initial value after the start of the first intermediate mode, then approaches "0", and is finally kept at "0."

Further, in the table of FIG. 28, the ignition timing adjustment amount IG_add_SH is set so that the ignition timing IG_log determined by Expression (15) becomes an ignition timing suitable for the air-fuel ratio of an air-fuel mixture within the combustion chamber 6 of each cylinder 3, during the operation of the internal combustion engine 1 in the second intermediate mode. In the illustrated example, IG_add_SH changes in the retard direction gradually from an initial value which is "0" after the start of the second intermediate mode, and is finally kept at a predetermined value $(-\alpha)$ on the retard side.

These coefficients K_Lo_SH and K_Hi_SH, and the ignition timing adjustment amount IG_add_HS are experimentally set so that the air-fuel ratio of an air-fuel mixture to be charged into the combustion chamber 6, the ignition performance of a composite fuel, etc. are smoothly shifted from a state suitable for the operation of the internal combustion engine 1 in the SI mode to a state suitable for the operation of the internal combustion engine 1 in the HCCI mode, while combustion of a composite fuel in the combustion chamber 6 of each cylinder 3 is properly performed at the time of the operation of the internal combustion engine 1 in the second intermediate mode.

In the second intermediate mode, the output determination processing unit 43 adopts the fuel injection timings Ti_Hi and Ti_Lo and the fuel injection timings CA_inj_Hi and CA_inj_Lo for every cylinder 3, which are determined as described above, as controlling operational amounts which specify the actual operations of the fuel injectors 17 and 18, and controls the operations of the fuel injectors 17 and 18 according to the controlling operational amounts. Further, the output determination processing unit 43 adopts the ignition timing IG_log and the ignition duty IG_duty for every cylinder 3, which are determined described above, as controlling operational amounts which specify the actual operation of the ignition plug 30, and controls the operation of the ignition plug 30 according to the controlling operational amounts.

These are the details of the control processing of the output determination processing unit 43. Additionally, this output determination processing unit 43 constitutes an intermediate mode control means in the invention, in conjunction with the throttle control processing unit 44.

Figure 29:
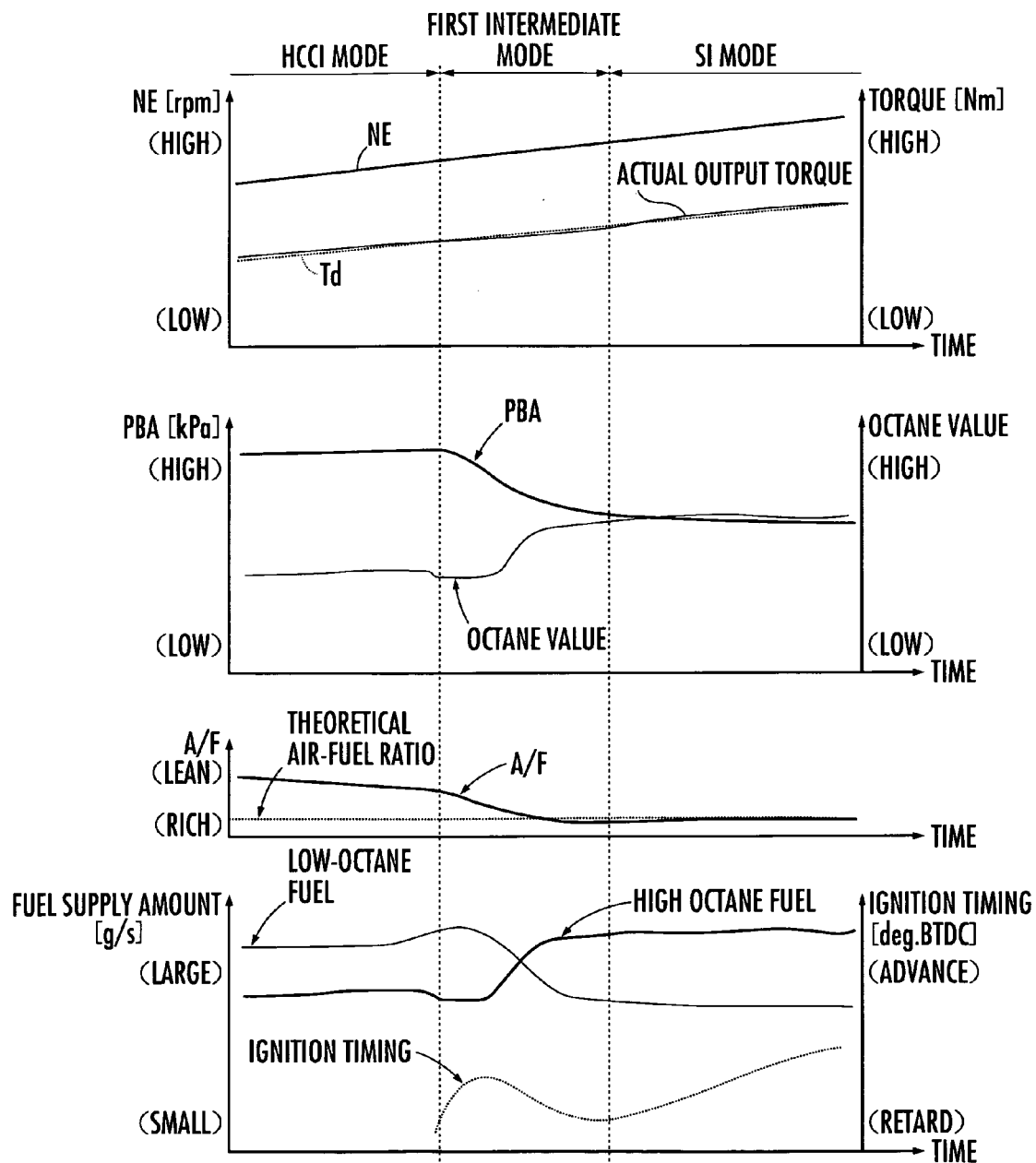
FIG. 29 is a graph illustrating the operation of an internal combustion engine at the time of shifting from a compression ignition operation mode to a spark ignition operation mode.
Figure 30:
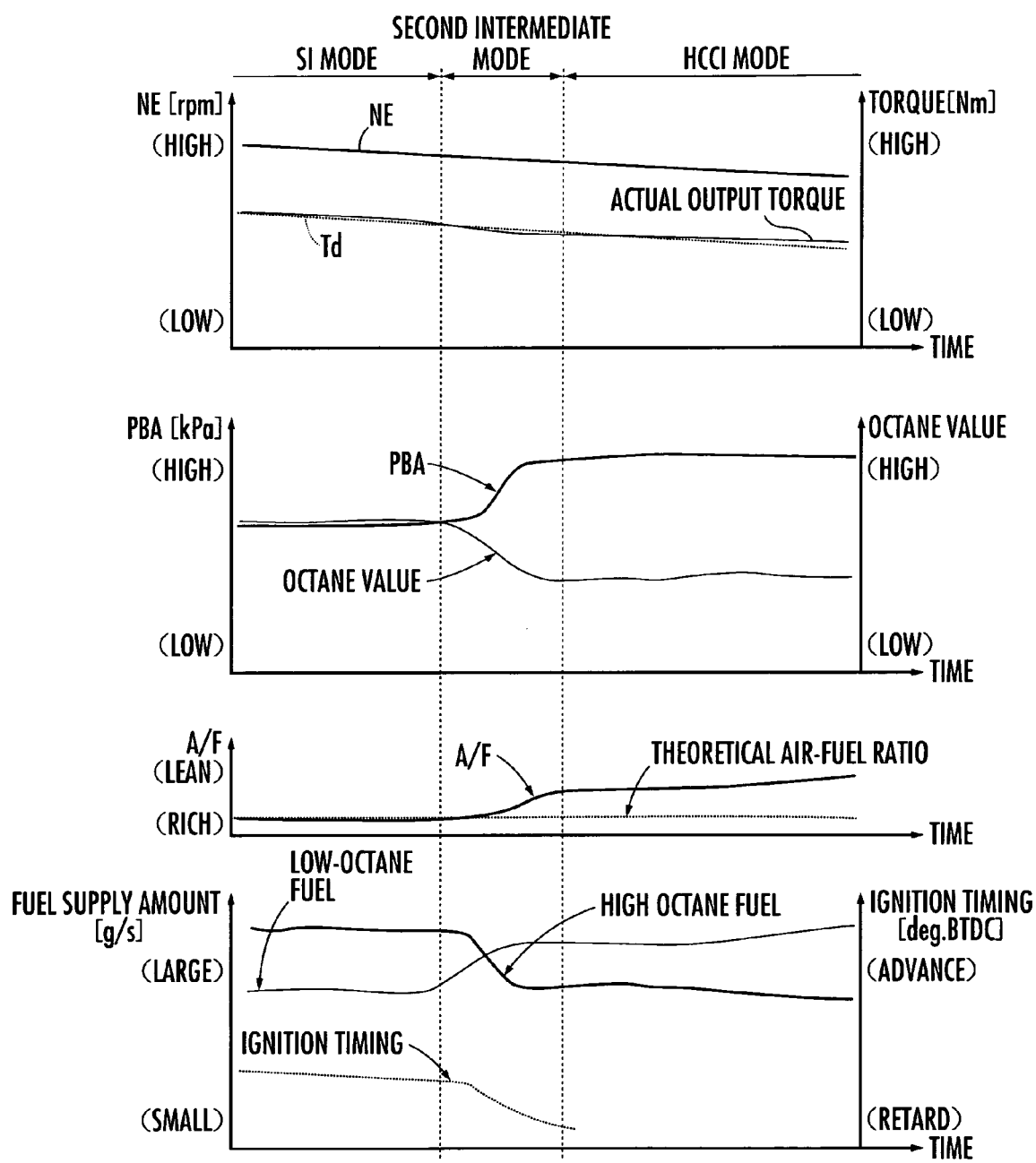
FIG. 30 is a graph illustrating the operation of an internal combustion engine at the time of shifting from a spark ignition operation mode to a compression ignition operation mode.

Next, the effects by the apparatus of this embodiment will be explained with reference to FIGS. 29 and 30. FIG. 29 is a graph illustrating variations with time, such as the rotational frequency NE of the internal combustion engine 1 in a case where the operation mode shifts from the HCCI mode to the SI mode. Further, FIG. 30 is a graph illustrating variations with time, such as the rotational frequency NE of the internal combustion engine 1 in a case where the operation mode shifts from the SI mode to the HCCI mode.

First, the situation shown in FIG. 29 is a situation where the operation mode is switched from the HCCI mode via the first intermediate mode to the SI mode, while the target torque Td increases, as indicated by a broken line in a graph at a first stage from the top of FIG. 29. In this situation, by the control processing of the throttle-valve control processing unit 44, and the control of the opening degree of the throttle valve 16 according thereto, the intake pressure PBA detected by the intake pressure sensor 20 decreases gradually in the first intermediate mode, as shown in a graph at a second stage of FIG. 29. Furthermore, in the first intermediate mode, the intake air amount (air supply amount) to the combustion chamber 6 of each cylinder 3 decreases gradually.

Further, at this time, the fuel injection times Ti_Lo and Ti_Hi are respectively determined by the aforementioned Expressions (1) and (2) in the output determination processing unit 43, whereby the supply amount of a low-octane fuel and the supply amount of a high-octane fuel to the combustion chamber 6 of each cylinder 3 change as shown in a graph at a fourth stage of FIG. 29, in the first intermediate mode. For this reason, the air-fuel ratio of an air-fuel mixture to be charged into the combustion chamber 6 of each cylinder 3 (air-fuel ratio A/F which is detected by the air-fuel ratio sensor 31) becomes rich gradually in the first intermediate mode, as shown in a graph at a third stage of FIG. 29. Further, the octane value of a composite fuel composed of a low-octane fuel and a high-octane fuel becomes high gradually in the first intermediate mode, as shown in the graph at the second stage of FIG. 29. Furthermore, the ignition performance of the composite fuel is gradually degraded in the first intermediate mode. Additionally, the octane value shown in FIG. 29, more specifically, is an octane value, i.e., the average octane value of a composite fuel which is defined as a value obtained by adding together a value obtained by multiplying the octane value of a low-octane fuel by the ratio of the supply amount of the low-octane fuel to the total amount of the composite fuel which is a total of the supply amount of the low-octane fuel and the supply amount of a high-octane fuel, and a value obtained by multiplying the octane value of the high-octane fuel by the ratio of the supply amount of the high-octane fuel to the total amount of the composite fuel.

Further, as shown in the graph at the fourth stage of FIG. 29, the actual ignition timing of an air-fuel mixture by the ignition plug 30 changes in the same pattern as the ignition timing adjustment amount IG_add_HS shown in FIG. 27, in the first intermediate mode. In this case, since the ignition timing IG_log which is determined by the aforementioned ignition timing control processing unit 92 immediately after switching from the first intermediate mode to the SI mode is corrected toward the retard side, the ignition timing shown in FIG. 29 is biased toward the retard side immediately after the switching from the first intermediate mode to the SI mode. Also, with the lapse f time in the SI mode, ignition timing gradually advances toward an original ignition timing (IG_log_maps).

At the time of shifting from the HCCI mode to the SI mode, an air-fuel ratio, the supply amounts of individual kinds of fuels, etc. are controlled as described above. Therefore, as shown in the graph at the first stage of FIG. 29, the actual output torque (detection value) of the internal combustion engine 1 smoothly follows the target torque Td with high stability. Further, the rotational frequency NE (detection value) of the internal combustion engine 1 also changes smoothly.

Next, the situation shown in FIG. 30 is a situation where the operation mode is switched from the SI mode via the second intermediate mode to the HCCI mode, while the target torque Td decreases, as indicated by a broken line in the graph at the first stage from the top of FIG. 30. In this situation, by the control processing of the throttle-valve control processing unit 44, and the control of the opening degree of the throttle valve 16 according thereto, the intake pressure PBA detected by the intake pressure sensor 20 increase gradually in the second intermediate mode, as shown in the graph at the second stage of FIG. 30. Furthermore, in the second intermediate mode, the intake air amount (air supply amount) to the combustion chamber 6 of each cylinder 3 increases gradually.

Further, at this time, the fuel injection times Ti_Lo and Ti_Hi are respectively determined by the aforementioned Expressions (11) and (12) in the output determination processing unit 43, whereby the supply amount of a low-octane fuel and the supply amount of a high-octane fuel to the combustion chamber 6 of each cylinder 3 change as shown in the graph at the fourth stage of FIG. 30, in the second intermediate mode. For this reason, the air-fuel ratio of an air-fuel mixture to be charged into the combustion chamber 6 of each cylinder 3 (air-fuel ratio A/F which is detected by the air-fuel ratio sensor 31) becomes lean gradually in the second intermediate mode, as shown in the graph at the third stage of FIG. 30. Further, the octane value of a composite fuel composed of a low-octane fuel and a high-octane fuel becomes low gradually in the second intermediate mode, as shown in the graph at the second stage of FIG. 30. Furthermore, the ignition performance of the composite fuel is gradually enhanced in the first intermediate mode. Additionally, the octane value shown in FIG. 30 is an octane value which is defined similarly to the octane value shown in FIG. 29.

In addition, immediately after switching from the second intermediate mode to the HCCI mode, the octane value of a composite fuel is biased toward the high-octane side by the third corrective operational amounts K_SH_Loh and K_SH_Hih which are determined by the SH correction processing unit 57, and the octane value of the composite fuel falls to an original octane value gradually with the lapse of time in the HCCI mode.

Further, as shown in the graph at the fourth stage of FIG. 30, the actual ignition timing of an air-fuel mixture by the ignition plug 30 changes in the same pattern as the ignition timing adjustment amount IG_add_SH shown in FIG. 28, in the second intermediate mode.

At the time of shifting from the SI mode to the HCCI mode, an air-fuel ratio, the supply amounts of individual kinds of fuels, etc. are controlled as described above. Therefore, as shown in the graph at the first stage of FIG. 30, the actual output torque (detection value) of the internal combustion engine 1 smoothly follows the target torque Td with high stability. Further, the rotational frequency NE (detection value) of the internal combustion engine 1 also changes smoothly.

As described above, the operation mode between the SI mode and the HCCI mode can be smoothly shifted without causing fluctuations in the output torque of the internal combustion engine 1, etc, by interposing the first intermediate mode or the second intermediate mode at the time of shifting of the operation mode between SI mode and HCCI mode according to this embodiment. Further, combustion of a fuel (composite fuel) in each intermediate mode can be stably performed with suitable combustion timing, and an excessive combustion noise can be prevented from being generated at the time of shifting of the operation mode between the SI mode and HCCI mode, or knocking can be prevented from occurring.

In addition, in this embodiment, the ion current F/B processing unit and the acceleration-and-deceleration correction processing unit 56 are provided in the fuel injection time control processing unit 50 of the HCCI control processing unit 41, but both or any one of them may be omitted. Further, the acceleration-and-deceleration correction processing unit 97 is provided in the combustion injection timing control processing unit 50 of the SI control processing unit 42, but it may be omitted.

Further, in the above embodiment, the number of kinds of fuels to be used in the internal combustion engine 1 is two. However, three or more kinds of fuels from whose octane values are different may be used.

What is claimed is:

1. A controller of an internal combustion engine which is operable in a compression ignition operation mode in which an air-fuel mixture charged into a combustion chamber of a cylinder is compressed, and thereby, the fuel of the air-fuel mixture is self-ignited and combusted, and in a spark ignition operation mode in which the fuel of the air-fuel mixture is ignited and combusted by spark ignition, the controller comprising a first intermediate mode which, in a case where the operation mode of the internal combustion engine is shifted from the compression ignition operation mode to the spark ignition operation mode, is interposed between both the operation modes, and a second intermediate mode which, in a case where the operation mode of the internal combustion engine is shifted from the spark ignition operation mode to the compression ignition operation mode, is interposed between both the operation modes, and the controller comprising an intermediate mode control means which controls an air supply amount and a fuel supply amount to the combustion chamber so that the air-fuel ratio of the air-fuel mixture becomes rich gradually in the first intermediate mode, and which controls the air supply amount and the fuel supply amount to the combustion chamber so that the air-fuel ratio of the air-fuel mixture becomes lean gradually in the second intermediate mode.

2. The controller of an internal combustion engine according to claim 1, comprising:

an intake-air controlling means which has a first target intake state quantity determining means which determines a first target value of an intake state quantity as a state quantity which specifies, according to the operation state of the internal combustion engine, an air supply amount required in a case where the internal combustion engine is operated in the compression ignition operation mode, a second target intake state quantity determining means which determines, according to the operation state of the internal combustion engine, a second target value of an intake state quantity required in a case where the internal combustion engine is operated in the spark ignition operation mode, and an intake state quantity detecting means which detects the intake state quantity, and which controls the opening degree of a throttle valve provided in an intake passage of the internal combustion engine according to a deviation between this first target value or the second target value, and the detected intake state quantity, so that the detected intake state quantity is brought close to the first target value at the time of the operation of the internal combustion engine in the compression ignition operation mode and the second intermediate mode, and so that the detected intake state quantity is brought close to the second target value at the time of the operation of the internal combustion engine in the spark ignition operation mode and the first intermediate mode;

a control processing means for a compression ignition operation mode which determines, at least according to the operation state of the internal combustion engine, operational amounts for a compression ignition operation mode including at least operational amounts which specify the fuel supply amount and fuel supply timing to the combustion chamber in a case where the internal combustion engine is operated in the compression ignition operation mode; and a control processing means for a spark ignition operation mode which determines, at least according to the operation state of the internal combustion engine, operational amounts for a spark ignition operation mode including at least operational amounts which specify the fuel supply amount and fuel supply timing to the combustion chamber in a case where the internal combustion engine is operated in the spark ignition operation mode, wherein the first target intake state quantity determining means and the second target intake state quantity determining means are means which respectively determine the first target value and the second target value so that an air supply amount specified by the first target value becomes larger than an air supply amount specified by the second target value, at least in the operation state of the internal combustion engine where the operation mode is to be shifted between the compression ignition operation mode and the spark ignition compression ignition operation mode, and wherein the intermediate mode control means includes the intake-air controlling means as a means which controls the air supply amount at the time of the operation of the internal combustion engine in the first intermediate mode and the second intermediate mode, the means which controls the fuel supply amount at the time of the operation of the internal combustion engine in the first intermediate mode includes a means which determines a controlling operational amount which specifies an actual fuel supply amount to the combustion chamber, from an operational amount relating to the fuel supply amount among the operational amounts for a compression ignition operation mode determined by the control processing means for a compression ignition operation mode at the time of the completion of the compression ignition operation mode so that the controlling operational amount follows an operational amount relating to the fuel supply amount among the operational amounts for a spark ignition operation mode determined by the control processing means for a spark ignition operation mode during the operation of the internal combustion engine in the first intermediate mode while being changed in a first predetermined pattern, and which controls a fuel supply system provided in the internal combustion engine according to the determined controlling operational amount, and the means which controls the fuel supply amount at the time of the operation of the internal combustion engine in the second intermediate mode includes a means which determines a controlling operational amount which specifies an actual fuel supply amount to the combustion chamber, from an operational amount relating to the fuel supply amount among the operational amounts for a spark ignition operation mode determined by the control processing means for a spark ignition operation mode at the time of the completion of the spark ignition operation mode so that the controlling operational amount follows an operational amount relating to the fuel supply amount among the operational amounts for a compression ignition operation mode determined by the control processing means for a compression ignition operation mode during the operation of the internal combustion engine in the second intermediate mode while being changed in a second predetermined pattern, and which controls the fuel supply system according to the determined controlling operational amount.

3. The controller according to claim 1, wherein the fuel supplied to the combustion chamber is composed of a plurality of kinds of fuels whose octane values are different from each other and whose supply amounts are adjustable, and wherein the intermediate mode control means further includes a means which adjusts the mutual ratio of the supply amounts of the plurality of kinds of fuels so that the ratio of the supply amount of a higher-octane fuel increases gradually with respect to the total amount of the plurality of kinds of fuels supplied to the combustion chamber in the first intermediate mode, and adjusts the mutual ratio of the supply amounts of the plurality of kinds of fuels so that the ratio of the supply amount of a lower-octane fuel increases gradually with respect to the total amount of the plurality of kinds of fuels supplied to the combustion chamber in the second intermediate mode.

4. The controller of an internal combustion engine according to claim 2, wherein the fuel supply system is capable of supplying a plurality of kinds of fuels whose octane values are different from each other to the combustion chamber, and is capable of adjusting the supply amounts of the plurality of kinds of fuels, wherein an operational amount relating to the fuel supply amount among the operational amounts for a compression ignition operation mode determined by the control processing means for a compression ignition operation mode, an operational amount relating to the fuel supply amount among the operational amounts for a spark ignition operation mode determined by the control processing means for a spark ignition operation mode, and a controlling operational amount relating to the fuel supply amount determined by the intermediate mode control means are respectively composed of an operational amount which specifies the supply amount of each kind of the fuel, wherein the first predetermined pattern at the time of the operation of the internal combustion engine in the first intermediate mode is composed of a pattern separately set in advance for each kind of the fuel so that the ratio of a fuel supply amount specified by a controlling operational amount relating to a higher-octane fuel increases gradually with respect to the total amount of the plurality of kinds of fuels specified by the controlling operational amounts relating to the fuel supply amounts of the plurality of kinds of fuels, respectively, and wherein the second predetermined pattern at the time of the operation of the internal combustion engine in the second intermediate mode is composed of a pattern separately set in advance for each kind of the fuel so that the ratio of a fuel supply amount specified by a controlling operational amount relating to a lower-octane fuel increases gradually with respect to the total amount of the plurality of kinds of fuels specified by the controlling operational amounts relating to the fuel supply amounts of the plurality of kinds of fuels, respectively.

5. The controller of an internal combustion engine according to claim 4, wherein the control processing means for a compression ignition operation mode includes:

the control processing means for a compression ignition operation mode includes:

a means which determines an operational amount group which is a set of the operational amounts relating to the plurality of kinds of fuels, among the operational amounts which specify the supply amounts of the plurality of kinds of fuels to the combustion chamber, at least by a first predetermined control rule according to the operation state of the internal combustion engine, at the time of the operation of the internal combustion engine in the compression ignition operation mode excluding a first predetermined period immediately after the switching from the second intermediate mode to the compression ignition operation mode, and a means which determines an operational amount group which is obtained by correcting at least one operational amount, among a normal operational amount group that is the operational amount group which is determined by the first predetermined control rule, at the time of the operation of the internal combustion engine in the compression ignition operation mode in the first predetermined period, wherein the means which determines the correction operational amount group is a means which corrects the correction operational amount group so that the ratio of the supply amount of a higher-octane fuel increases more than a ratio specified by a normal operational amount group determined by the first predetermined control value, with respect to the total amount of the plurality of kinds of fuels specified by the correction operational amount group, and wherein the fuel supply system is controlled according to the correction operational amount group determined by the control processing means for a compression ignition operation mode at the time of the operation of the internal combustion engine in the compression ignition operation mode in the first predetermined period, and the fuel supply system is controlled according to a normal operational amount group determined by the control processing means for a compression ignition operation mode at the time of the operation of the internal combustion engine in the compression ignition operation mode excluding the first predetermined period.

6. The controller of an internal combustion engine according to claim 1, comprising an ignition timing control means for a spark ignition operation mode which determines an ignition timing operational amount which specifies the ignition timing of the air-fuel mixture within the combustion chamber, by a second predetermined control rule at least according to the operation state of the internal combustion engine, thereby controlling an ignition plug provided in the internal combustion engine according to the correction ignition timing operational amount, at the time of the operation of the internal combustion engine in the spark ignition operation mode excluding a second predetermined period immediately after the switching from the first intermediate mode to the spark ignition operation mode, and which determines a correction ignition timing operational amount which is obtained by correcting a normal ignition timing operational amount which is an ignition timing operational amount determined by the second predetermined control rule, thereby control the ignition plug according to the ignition timing operational amount, at the time of the operation of the internal combustion engine in the spark ignition operation mode in the second predetermined period, wherein the ignition timing control means for a spark ignition operation mode determines the correction ignition timing operational amount so that an ignition timing specified by the correction ignition timing operational amount becomes an ignition timing nearer to the retard side than an ignition timing specified by the normal ignition timing operational amount, at the time of the operation of the internal combustion engine in the spark ignition operation mode in the second predetermined period.

7. A controller of an internal combustion engine which is operable in a compression ignition operation mode in which an air-fuel mixture charged into a combustion chamber of a cylinder is compressed, and thereby, the fuel of the air-fuel mixture is self-ignited and combusted, and in a spark ignition operation mode in which the fuel of the air-fuel mixture is ignited and combusted by spark ignition, and is capable of supplying a plurality of kinds of fuels whose octane values are different from each other to the combustion chamber, the controller comprising a first intermediate mode which, in a case where the operation mode of the internal combustion engine is shifted from the compression ignition operation mode to the spark ignition operation mode, is interposed between both the operation modes, and a second intermediate mode which, in a case where the operation mode of the internal combustion engine is shifted from the spark ignition operation mode to the compression ignition operation mode, is interposed between both the operation modes, the controller comprising an intermediate mode control means which adjusts the mutual ratio of the supply amounts of the plurality of kinds of fuels so that the ratio of the supply amount of a higher-octane fuel increases gradually with respect to the total amount of the plurality of kinds of fuels supplied to the combustion chamber in the first intermediate mode, and adjusts the mutual ratio of the supply amounts of the plurality of kinds of fuels so that the ratio of the supply amount of a lower-octane fuel increases gradually with respect to the total amount of the plurality of kinds of fuels supplied to the combustion chamber in the second intermediate mode.

8. The controller of an internal combustion engine according to claim 7, comprising:

a control processing means for a compression ignition operation mode which determines, at least according to the operation state of the internal combustion engine, operational amounts for a compression ignition operation mode including at least operational amounts which respectively specify the fuel supply amounts and fuel supply timings of the plurality of kinds of fuels to the combustion chamber in a case where the internal combustion engine is operated in the compression ignition operation mode; and a control processing means for a spark ignition operation mode which determines, at least according to the operation state of the internal combustion engine, operational amounts for a spark ignition operation mode including at least operational amounts which respectively specify the fuel supply amounts and fuel supply timings of the plurality of kinds of fuels to the combustion chamber in a case where the internal combustion engine is operated in the spark ignition operation mode, wherein the intermediate mode control means includes a means which, at the time of the internal combustion engine in the first intermediate mode, controls a controlling operational amount which specify each of the actual fuel supply amounts of the plurality of kinds of fuels to the combustion chamber, separately for each kind of the fuel, from an operational amount relating to the fuel supply amount of each kind of the fuel among the operational amounts for a compression ignition operation mode determined by the control processing means for a compression ignition operation mode at the time of the completion of the compression ignition operation mode so that the controlling operational amount follows an operational amount relating to the fuel supply amount of each kind of the fuel among the operational amounts for a spark ignition operation mode determined by the control processing means for a spark ignition operation mode during the operation of the internal combustion engine in the first intermediate mode while being changed in a first predetermined pattern, and which controls a fuel supply system provided in the internal combustion engine according to the determined controlling operational amount, and a means which, at the time of the internal combustion engine in the second intermediate mode, controls a controlling operational amount which specify each of the actual fuel supply amounts of the plurality of kinds of fuels to the combustion chamber, separately for each kind of the fuel, from an operational amount relating to the fuel supply amount of each kind of the fuel among the operational amounts for a spark ignition operation mode determined by the control processing means for a spark ignition operation mode at the completion of the spark ignition operation mode so that the controlling operational amount follows an operational amount relating to the fuel supply amount of each kind of the fuel among the operational amounts for a compression ignition operation mode determined by the control processing means for a compression ignition operation mode during the operation of the internal combustion engine in the second intermediate mode while being changed in a second predetermined pattern, and which controls a fuel supply system provided in the internal combustion engine according to the determined controlling operational amount, and wherein the first predetermined pattern at the time of the operation of the internal combustion engine in the first intermediate mode is composed of a pattern separately set in advance for each kind of the fuel so that the ratio of a fuel supply amount specified by a controlling operational amount relating to a higher-octane fuel increases gradually with respect to the total amount of the plurality of kinds of fuels specified by the controlling operational amounts relating to the fuel supply amounts of the plurality of kinds of fuels, respectively, and the second predetermined pattern at the time of the operation of the internal combustion engine in the second intermediate mode is composed of a pattern separately set in advance for each kind of the fuel so that the ratio of a fuel supply amount specified by a controlling operational amount relating to a lower-octane fuel increases gradually with respect to the total amount of the plurality of kinds of fuels specified by the controlling operational amounts relating to the fuel supply amounts of the plurality of kinds of fuels, respectively.

9. The controller of an internal combustion engine according to claim 8,
  wherein the control processing means for a compression ignition operation mode includes:
  a means which determines an operational amount group which is a set of the operational amounts relating to the plurality of kinds of fuels, among the operational amounts which specify the supply amounts of the plurality of kinds of fuels to the combustion chamber, at least by a first predetermined control rule according to the operation state of the internal combustion engine, at the time of the operation of the internal combustion engine in the compression ignition operation mode excluding a first predetermined period immediately after the switching from the second intermediate mode to the compression ignition operation mode,
  a means which determines an operational amount group which is obtained by correcting at least one operational amount, among a normal operational amount group that is the operational amount group which is determined by the first predetermined control rule, at the time of the operation of the internal combustion engine in the compression ignition operation mode in the first predetermined period,
  wherein the means which determines the correction operational amount group is a means which corrects the correction operational amount group so that the ratio of the supply amount of a higher-octane fuel increases more than a ratio specified by a normal operational amount group determined by the first predetermined control value, with respect to the total amount of the plurality of kinds of fuels specified by the correction operational amount group, and
  wherein the fuel supply system is controlled according to the correction operational amount group determined by the control processing means for a compression ignition operation mode at the time of the operation of the internal combustion engine in the compression ignition operation mode in the first predetermined period, and the fuel supply system is controlled according to a normal operational amount group determined by the control processing means for a compression ignition operation mode at the time of the operation of the internal combustion engine in the compression ignition operation mode excluding the first predetermined period.

10. The controller of an internal combustion engine according to claim 7, comprising
  an ignition timing control means for a spark ignition operation mode which determines an ignition timing operational amount which specifies the ignition timing of the air-fuel mixture within the combustion chamber, by a second predetermined control rule at least according to the operation state of the internal combustion engine, thereby controlling an ignition plug provided in the internal combustion engine according to the correction ignition timing operational amount, at the time of the operation of the internal combustion engine in the spark ignition operation mode excluding a second predetermined period immediately after the switching from the first intermediate mode to the spark ignition operation mode, and which determines a correction ignition timing operational amount which is obtained by correcting a normal ignition timing operational amount which is an ignition timing operational amount determined by the second predetermined control rule, thereby control the ignition plug according to the ignition timing operational amount, at the time of the operation of the internal combustion engine in the spark ignition operation mode in the second predetermined period,
  wherein the ignition timing control means determines the correction ignition timing operational amount so that an ignition timing specified by the correction ignition timing operational amount becomes an ignition timing nearer to the retard side than an ignition timing specified by the normal ignition timing operational amount, at the time of the operation of the internal combustion engine in the spark ignition operation mode in the second predetermined period.

\* \* \* \* \*